US006041491A

United States Patent [19]

Ishikawa et al.

[11] Patent Number: 6,041,491

[45] Date of Patent: Mar. 28, 2000

[54] ROD ATTACHING/DETACHING DEVICE FOR A LIFTING JACK AND METHOD OF COUPLING SUSPENDING RODS

[75] Inventors: Yusuke Ishikawa; Shigeyoshi Kawaguchi; Shigeru Fukushima; Hideo Koide, all of Chiyoda-ku, Japan

[73] Assignee: Hitachi Plant Engineering Construction Co., Ltd., Tokyo, Japan

[21] Appl. No.: 09/068,965

[22] PCT Filed: Apr. 14, 1997

[86] PCT No.: PCT/JP97/01284

§ 371 Date: Jul. 22, 1998

§ 102(e) Date: Jul. 22, 1998

[87] PCT Pub. No.: WO97/38933

PCT Pub. Date: Oct. 23, 1997

[30] Foreign Application Priority Data

Apr. 12, 1996 [JP] Japan .................................... 8-115318
Apr. 12, 1996 [JP] Japan .................................... 8-115319
Apr. 12, 1996 [JP] Japan .................................... 8-115321

[51] Int. Cl.[7] ...................................................... B23P 21/00

[52] U.S. Cl. ................................. 29/709; 29/714; 29/240

[58] Field of Search ........................... 29/407.01, 407.03, 29/456, 525.11, 714, 240, 709

[56] References Cited

FOREIGN PATENT DOCUMENTS 62-140999 6/1987 Japan .
3-166199 7/1991 Japan .
7-137994 5/1995 Japan .
7-309594 11/1995 Japan .
7-315774 12/1995 Japan .

*Primary Examiner*—P. W. Echols
*Assistant Examiner*—John C. Hong
*Attorney, Agent, or Firm*—Oliff & Berridge, PLC

[57] ABSTRACT

A rod constituting a suspending rod is automatically connected or detached, and a rod is easily conveyed between a position where the rod is delivered to rod attaching/detaching means and a position where the rod is contained. A plurality of jacks are operated in synchronism. In the upper part of a boiler-side steel structure (58) is provided a boiler jack (60) for moving a boiler module (56) up and down via a suspending rod (52). Above the boiler jack is provided a device (68) for automatically attaching/detaching a rod. The device (68) is movable horizontally. The rod attaching/detaching device (68) grips a rod (52S) at the end of the suspending rod pushed up by the boiler jack, rotates it to remove, and transfer it to a rod conveyor device (70). Upon receiving the rod from the rod attaching/detaching device, the rod conveyor device conveys it ro a rod container (54) provided on a working floor (42). A plurality of jacks (60) are driven by synchronous output operation, the displacements of stroke of all the jacks are measured to find the differences between the minimum displacement and the other displacements, and the output of the jacks (60) of which the differences are larger than a set value are decreased so that the displacements are equalized to the minimum dieplacement.

7 Claims, 48 Drawing Sheets

ROD ATTACHING/DETACHING DEVICE FOR A LIFTING JACK AND METHOD OF COUPLING SUSPENDING RODS

TECHNICAL FIELD

This invention relates to a lifting jack, a method of coupling suspending rods and a lift control method, more particularly, to: a lifting jack having means for continuously attaching and detaching the end rod in order to adjust the length of the suspending rod which is elongated by the screwed coupling, and means for continuously removing and depositing the rod in accordance with attaching and detaching the rod, when the suspending rod, which is used in a lifting operation for a boiler module of a large scale electric-power plant or the like, is lifted up and down by the jack; a method of coupling suspending rods; and a lift control method for lifting up and down the boiler module or the like while the lifting jacks are controlled in synchronism.

BACKGROUND ART

FIGS. 47 show a conventional suspending rod, used for lifting up a massive body, for example, when power-generation facilities are set up. A suspending rod 10, elongated by screwing plural rods 10S to each other in the axis direction, is suspended from a beam portion, located at high elevations, of a steel structure to be used when a module of a boiler, associated with piping installation on the ground, is moved upward step by step in response to the associating stages on the ground and moved down as necessary. The rod 10S as a component of the suspending rod 10, which has a configuration continuously linked with plural top-shaped supported portions 12 in the axis direction, has a male screw part 14 at the end thereof and a female screw part 16 at the other end which engages with the male screw portion of another rod. Each rod of the suspending rod 10 is made to have the length of about 5 m in consideration of a storage space of rods, convenience or handling properties for transferring them between workplaces, workability in the lifting operations for the massive body, and so on. In the use of the suspending rod 10, the plural rods 10S are coupled by screwing each other in the axis direction, and the massive body is lifted up by a jack while being suspended at the lower portion of the suspending rod 10.

More specifically, as shown in FIG. 48, steel columns 22 are stood up around a heavy steel structure 20. A temporary beam 24 is horizontally mounted on the top of the steel column 22 to project from the top of the steel column 22. A center hole type jack 26 is placed on the temporary beam 24 and supports the suspending rod 10 attached with the heavy steel structure 20, such as a module of a boiler, at the lower portion thereof. The suspending rod 10 is structured by coupling the rods 10S shown in FIG. 47 so that the length of the suspending rod 10 corresponds to the height up to which the structure 20 is lifted. As shown in FIG. 49, the center hole type jack 26 lifts up the structure 20 by pushing up the suspending rod 10 with using the supporting part 12 formed in the rod 10.

The lifting steps are as follows. As shown in FIG. 49(1), the suspending rod 10, suspending the structure 20, is supported by an upper chuck 34, and the load of the structure 20 is received by the upper chuck 34, and a lower chuck 36 is released. In this state, a ram 32 is worked and pushes up the suspending rod 10 for a rod (one of the supported portions 12) so as to lift up the structure 20 through the suspending rod 10. The lower chuck 36 is closed when the suspending rod 10 is moved up for one rod, and the ram 32 is moved down so that the lower chuck 36 receives the lifting load (the suspending load) through the supporting part 12. When the lower chuck 36 supports the suspending rod 10, the upper chuck 34 is opened to move further down the ram 32. When the upper chuck 34 comes under the next supported portion, located beneath the supported portion supported previously by the upper chuck 34, the upper chuck 34 is closed again to support the suspending rod 10, and the lower chuck 36 is opened, and the above steps are repeated. When the coupling point of the rod 10 reaches above the center hole type jack 26, the lifting operations are intermitted in order to remove the top rod 10S.

Concerning the removing steps for the suspending rod 10, after the rod 10S to be removed is held firm by equipment, such as a crane, not to fall or overturn, the top rod 10S, coupled and screwed, is rotated in a direction to release the coupling manually with the use of a tool, such as a chain wrench, and then the top rod 10S is removed from its connecting rod 10S. The removed rod 10S is carried to a temporary storage place on the temporary beam 24, on which the center hole type jack 26 is placed, by a device, such as a crane, or alternatively, it is brought down on the ground for storing.

In the aforementioned method, the removed rod 10S should be moved down to the rod storage place positioned lower than the attaching/detaching position of the rods, or conversely, the rod 10S which is placed in the rod storage place should be moved up to the coupling position, therefore the rod 10S is not effortlessly transferred. Moreover, conventionally, the rod is transferred by hand, so that a large amount of manual efforts is required in addition to the possible occurrence of a rod being dropped.

The aforementioned lifting operations, using the hydraulic-actuated center hole type jack 26 and the suspending rod 10, are applied in a lifting operations for a large massive body, so that the coupling force between the rods 10 should be large and a large force is needed to rotate the suspending rod 10 in order to release the coupling. Additionally, the structure 20 must be lifted up while being horizontally balanced, so that plural center hole type jacks 26 are used simultaneously, and an operator takes charge of each center hole type jack 26, therefore workers are required in large numbers. Moreover, the operations are carried out on the temporary beam 24 at high elevations, so that there is a disadvantage of the safety of workers.

When the heavy steel structure 20 is lifted up and down by using plural jacks 26, the jacks 26 should be synchronously driven to lift up and down and the stroke displacement of the ram 32 of each jack 26 should be equalised so that the heavy steel structure 20 is not inclined. A controlling method for equalising strokes of plural jacks is proposed, in which a pressure regulating valve is provided in the returning side of a hydraulic jack and the stroke is equalised by adjusting the degree of opening of the valve (Japanese Patent Laid-open No. Hei7-315774). In the adjustment of the degree of opening of the pressure regulating valve, when any one of the jacks produces stroke, the feed of oil is stopped and the pressure regulating valves of the other jacks are adjusted in order so that each jack produces stroke.

In the controlling method for equalising strokes of the jacks as described in the above Patent Bulletin, the degrees of opening the pressure-adjusting valves of plural jacks are adjusted in order, so that when a number of jacks are used, it takes time to adjust the degree of opening of the valves, and additionally, a difference of the stroke displacement between the jacks easily occurs for reasons of a change of temperature in oil pressure during use, differences in time property of each device, and so on. Although the pressure regulating valves are adjusted in early stages, it is greatly difficult to equalise the strokes of the jacks. Therefore, the massive body is laboriously lifted up and down in parallel, so that a bending force acts on the suspending rod, and the valves must be adjusted again.

When the structure 20 is lifted, the plural center hole jacks 26 are synchronized to be worked uniformly in order that the structure 20 is lifted up not to incline, so that the removing operation for the suspending rod 10 should be carried out invariably after the actions of all center hole type jacks 26 are stopped. However, the number of cranes used for removing the rod 10S is limited, so that the plural rods 10S are sequentially removed in order by plural cranes, therefore the entire operating time period, including a time for lifting up the structure 20 and a time for removing the rods 10S, is longer and the working efficiencies are decreased. In addition, the safety of workers should be further considered for reasons of a drawn-out operation. In order to set the removed rod 10S on the temporary beam 24 or the ground, equipment, such as a crane, is required. The number of cranes or the like should be corresponded to the number of center hole type jacks 26. Therefore, as the number of equipment used is increased, the number of operators for the equipment is increased, resulting in expanding work schedules and complications for management.

DISCLOSURE OF THE INVENTION

In order to resolve the aforementioned disadvantages of the conventional art, it is the first object of the present invention to provide a lifting jack and a method of coupling suspending rods, which has a suspending rod attaching/detaching means capable of automatically separating or coupling rods constituting the suspending rod.

It is the second object to improve the efficiency of work by automatically separating and coupling the rod, constituting the suspending rod, with the suspending rod attaching/detaching means, and by carrying out the smooth convey of the rods between a rod delivery position to the rod attaching/detaching means and a rod storing position. At this time, the convey of the rods between the rod delivery position and the rod storing position can be properly carried out by reducing the efforts required in the conveying process for the rods, and additionally, a means for easily changing a distance of a convey route of the rod convey means is provided.

It is the third object of the present invention to provide a lifting jack and a lift control method, which has a means for carrying out a synchronizing control for a group of lifting jacks which is capable of simply controlling in synchronism the group of jacks suspending the suspending rod not to produce the tilt of a module lifted, and horizontally lifting up and down the lifted body.

In order to achieve the aforementioned objects, the lifting jack according to the present invention has a means for automatically attaching/detaching the suspending rod. The suspending rod attaching/detaching means, which is a device for attaching and detaching a rod to and from an end of a suspending rod when the suspending rod for lifting is formed by screwing and coupling the rods in the axis direction and the top end portion of the suspending rod is lifted up and down by the jack, has a chucking means for chucking a head part of the rod; a rotation unit having a shaft driven to be rotated by a rotating motor and connected with the chucking means, and having a displacement absorbing means on a path of linking an output shaft of the rotating motor to the chucking means; an elevating means for vertically moving the rotation unit in response to screw pitch of the rods; a rotation sensor detecting the rotation of the chuck means; and a controlling means for finding the amount of the vertical movement of the chuck means from an output signal of the rotation sensor, and for vertically moving the rotation unit through the elevating means in response to the amount of the vertical movement. It is advisable that the displacement absorbing means, placed on the path of linking the output shaft of the rotating motor to the chuck means, has a shaft direction displacement absorbing means and a rotation shaft run-out displacement absorbing means.

The operation of the attaching/detaching means as described above has the steps of: opposing a screw part of the rod to a screw part of the top rod of the suspending rod while gripping the rod with the rotation chuck means; detecting a predetermined shaft direction displacement of the chuck means, caused by rotating the chuck means at a low speed at the opposing position; and rotating the chuck means at a high speed while moving down a rotation unit, driving to rotate the chuck means, in response to screw pitch of the rod to couple the rods by screwing. The predetermined amount of the shaft direction displacement of the chuck means can be defined to be a value corresponding to a pitch of a rod coupling screw. When the rod is coupled to an end of a suspending rod for lifting which is formed by screwing and coupling the rods in the axis direction, it is carried out by the steps of: gripping the rod in a suspending state with the rotation chuck means; rotating the rotation chuck means at a low speed while the rod is being centered on a screw part of the top rod of the suspending rod; inserting a screw portion of the gripped rod by moving down a rotation chuck; detecting a predetermined shaft direction displacement of the chuck means with the engagement in the rotation at a low speed by using back-lash of a screw face; and rotating the rotation chuck means at a high speed while moving down a rotation unit, driving to rotate the chuck means, in response to screw pitch of the rod to couple the rods by screwing.

In consequence, when the rod is separated and removed, a difference between an ascending speed of the chuck means and an ascending speed of the rotation unit is absorbed by the displacement absorbing means, so that the rod is automatically removed smoothly and swiftly to avoid increase of torque, caused by the difference of speed. When the rods are coupled, a difference of a descending speed of the chuck means and a descending speed of the rotation unit is also absorbed by the displacement absorbing means. The rotation shaft run-out, caused by the deviated axes in screwing the rods or the like, is absorbed by the shaft run-out displacement absorbing means, so that the rods are smoothly and effortlessly screwed to each other.

The lifting jack according to the present invention has a means for depositing and removing the rod onto and from the aforementioned rod attaching/detaching means. The means has a rod attaching/detaching means, which is positioned above the jack placed on a supporting frame, and provided to move from the attaching/detaching position; and a rod convey means for continuously conveying the rods while circulating between a position to deliver the rod through a gripping position, which is provided on a moving route of the rod attaching/detaching means, and a rod storing position. The rod convey means has a frame assembled with modules and having a direction changing portion of a sprocket or the like to change directions of a conveyed body, and is changed in a circulating distances thereof according to changing of working positions of the deliver position for delivering the rod to the attaching/detaching means and the rod storing position, thereby the distance of the convey route of the rod convey means is easily changed and the rod deliver position and the rod storing position can be selectively set up.

In consequence, when the operations for separating and coupling the rods constituting the suspending rod is carried out automatically, the convey of the rod between the rod deliver position for delivering the rod to the rod attaching/detaching means and the rod storing position can be easily carried out. The convey of the rod between the rod delivery position and the rod storing position is carried out by the rod convey means, not by hand, so that the efforts required for conveying the rod is reduced and the convey of the rod is dependably performed.

The lifting jack supports the boiler module as a lifted body, and plural jacks are used for supporting it. The module as the lifted body should be lifted up and down not to tilt, so that the synchronizing control for a group of the lifting jacks is carried out. A lift control method, according to the present invention, of a synchronizing control for a group of lifting jacks, in which a massive body is lifted up and down by plural lifting jacks, has the steps: driving the lifting jacks to lift in an operation with equal output, and finding a deviation with respect to the minimum displacement by detecting stroke displacement of each jack; and decreasing the output of the jack, having the deviation exceeding a predetermined value, to equate to the stroke displacement of the jack having the minimum displacement. When the output of the jack having the deviation exceeding the predetermined value is decreased, the output can be decreased at a predetermined rate with respect to the initial output. When the deviation does not result in zero within a predetermined time although the output has decreased, the output can be decreased at a predetermined rate at several times. The jack, decreased with the output thereof, retrieves the original output when the stroke displacement equates to the stroke displacement of the jack having the minimum displacement.

The method of the synchronizing control can be achieved by the lift jack having the following synchronizing control unit for the group of the lifting jacks. It has a sensor to detect each stroke displacement of the lifting jacks; a flow regulating valve provided at each hydraulic circuit of the jacks; and a controlling means for reading each detecting signal from sensors, and for selecting the jack, having the minimum stroke displacement, as a reference jack when each jack is operated with an equal output, and for equating the stroke displacement of the jack, having the deviation to stroke displacement of the reference jack exceeding a predetermined value, to the stroke displacement of the reference jack by decreasing the output of the jack through the flow regulating valve.

According to the above structure, a jack having the minimum displacement of stroke is found, and each output of the other jacks may be decreased to be coordinated to the reference jack, so that the synchronizing control can be relatively easily carried out and the lifted body can be lifted in approximately horizontal. Especially, when the output of the jack is decreased, the output may be decreased to be an output defined at a predetermined rate with respect to the initial output, thereby simply carrying out the synchronizing control. When the deviation does not result in zero within the predetermined time after the output has been decreased, the output of the above jack can be decreased step by step at a predetermined rate, thereby the overshooting, in which the stroke displacement of the jack, being controlled, is decreased under the stroke displacement of the reference jack by reason of the over-decreased output, can be avoided. When the deviation is zero, by controlling to recover the output of the jack which has been decreased, the complicated and accurate output control is not needed and the control without complication and the simplification of apparatus can be achieved.

In the above description, the lifted body is the boiler module, but the lifted body is not limited to the boiler module, so that the present invention can be applied when the lifted body is supported with the suspending rod and lifted up and down by the jack.

BEST MODE FOR CARRYING OUT THE INVENTION

Specific embodiments of a lifting jack, a method of coupling suspending rods and a lift control method according to the present invention will be described below in detail with reference to the accompanying drawings.

Figure 1:
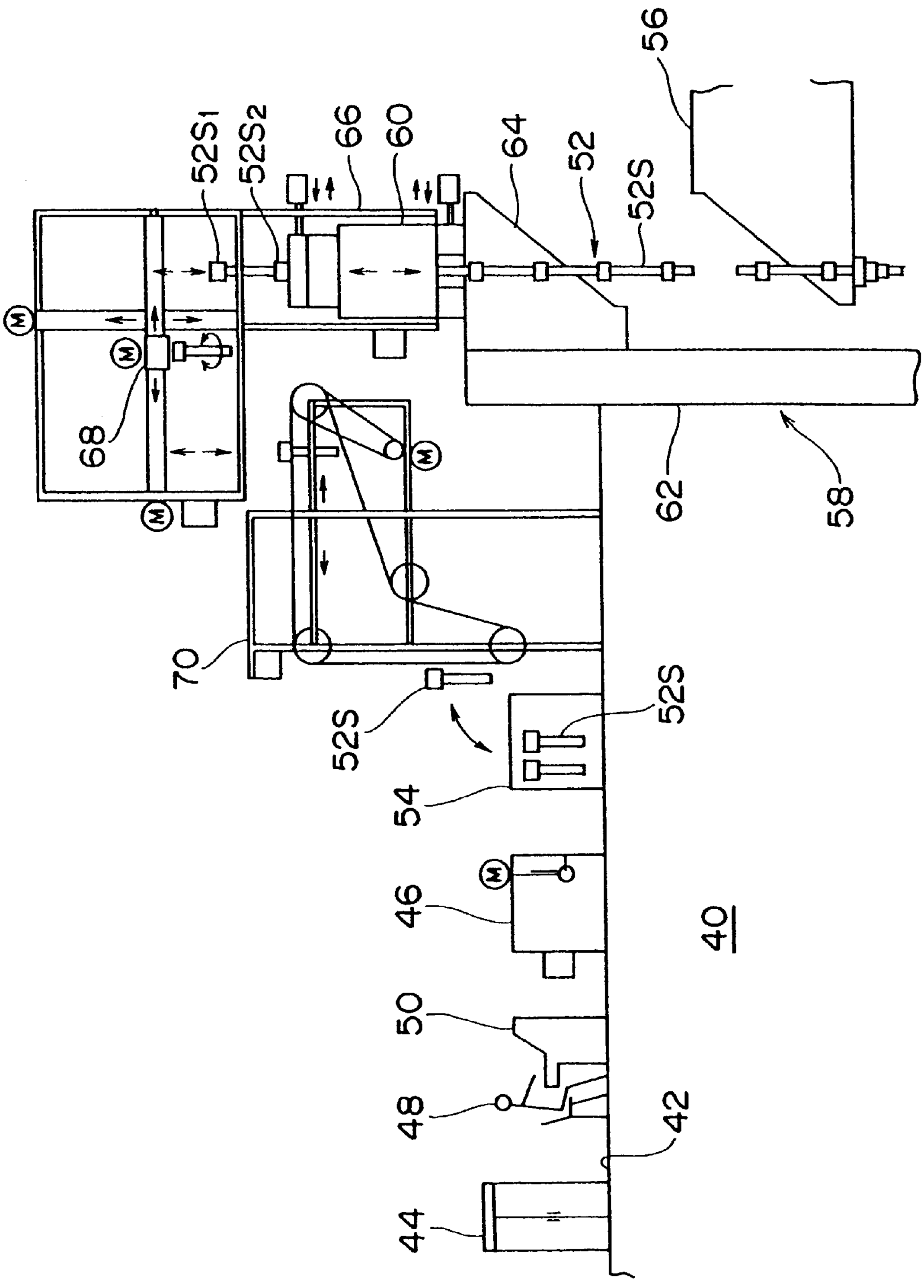
FIG. 1 is a diagrammatic view of an entire lifting jack apparatus according to the preferred embodiment of the present invention.

FIG. 1 is a diagrammatic view showing an entire jack system for a boiler as lifting jack apparatus of the present invention. In FIG. 1, a working floor 42 is constructed on a boiler steel frame 40 composing a boiler chamber. On the working floor 42, a control panel 44; a hydraulic unit 46 for driving a boiler jack or the like, which will be described later; and an operation panel 50 operated by an operator 48 are provided. In addition, a rod container 54 for storing rods 52S used for composing a suspending rod 52 is provided on the working floor 42. Contiguous to the boiler steel frame 40, a boiler-side steel frame 58 for lifting up and down a boiler module 56, as a lifted body, is constructed.

The boiler module 56 is supported and suspended by a boiler jack 60 as a center hole type hydraulic jack, which will be described later, through the suspending rod 52 of which the plural rods 52S are coupled by being screwed in the axis direction. More specifically, an upper frame 64 is constructed in the upper portion of a column 62 of the boiler-side steel frame 58. The boiler jack 60 is placed on the upper frame 64. The boiler module 56 is supported through the suspending rod 52 and lifted up and down by alternately working chucks, each located in the upper portion and the lower portion of the boiler jack 60.

Above the boiler jack 60, a rod attaching/detaching device 68 as a rod attaching/detaching means which will be described later is placed on a frame 66, in which the top (end) rod 52S1 located above the boiler jack 60 is uncoupled from and coupled to a rod 52S2, located directly beneath the rod 52S1. Under the rod attaching/detaching device 68 and adjacent to the boiler jack 60, a rod conveyor device 70 as a rod convey means is provided in order to convey and store the rod 52S, removed by the attaching/detaching device 68, into the rod container 54 provided on the working floor 42, in likewise to deliver the rod 52S, stored in the rod container 54, to the rod attaching/detaching device 68.

Figure 2:
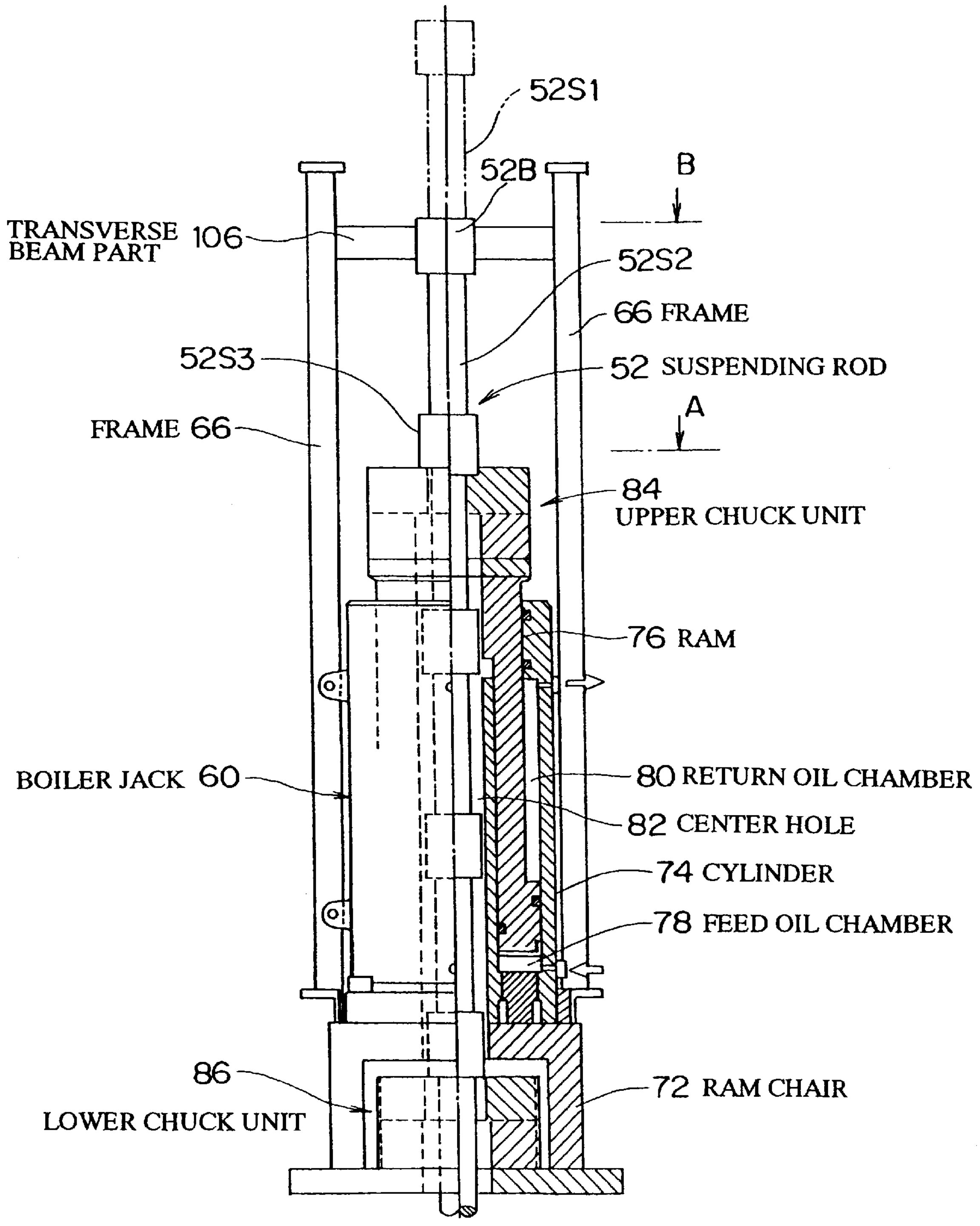
FIG. 2 is a fragmentary sectional side view of a jack device for a boiler, according to the preferred embodiment.

As shown in FIG. 2, the boiler jack 60 is composed of a cylinder 74 as a fixed outer cylinder member, standing up on the upper face of a box-shaped ram chair 72 placed on a temporary beam, and a ram 76 inserted in the cylinder 74. The cylinder 74 has a double-wall structure and accommodates the ram 76 in the wall thereof to allow the ram 76 to move up and down. An oil pressure chamber has a feed oil chamber 78, placed on the inserting end portion under the bottom face of the ram 76, and a return oil chamber 80 which is placed on a side wall portion of the ram 76, partitioned by the lower end portion of the ram, above the feed oil chamber 78. The ram 76 is moved up by feeding working oil into the feed oil chamber 78 and moved down by opening the feed oil chamber 78 to feed the working oil into the return oil chamber 80.

Figure 3:
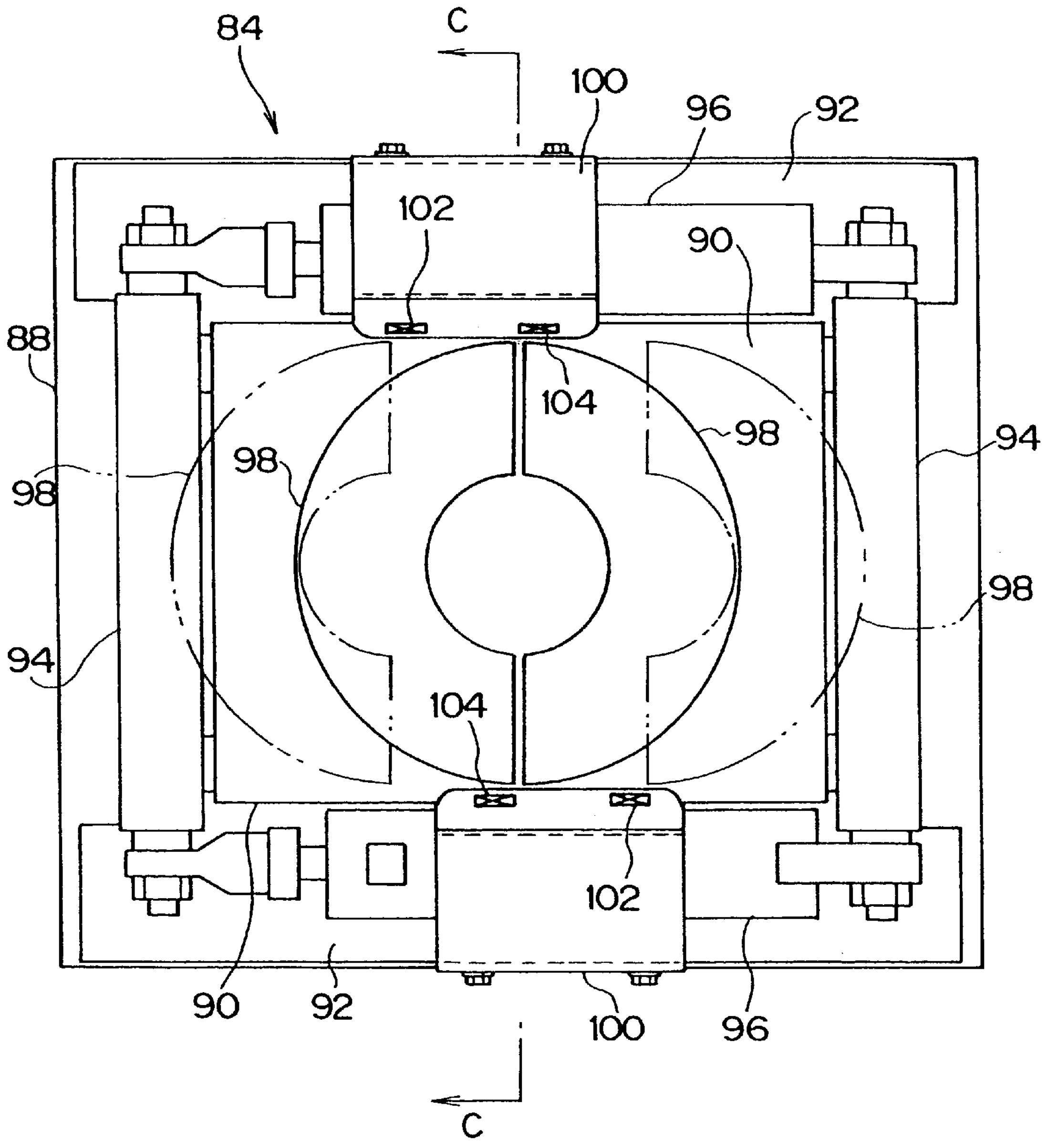
FIG. 3 is a sectional view indicated by arrow A in FIG. 2, and also a plane view of an upper chuck unit according to the preferred embodiment.
Figure 4:
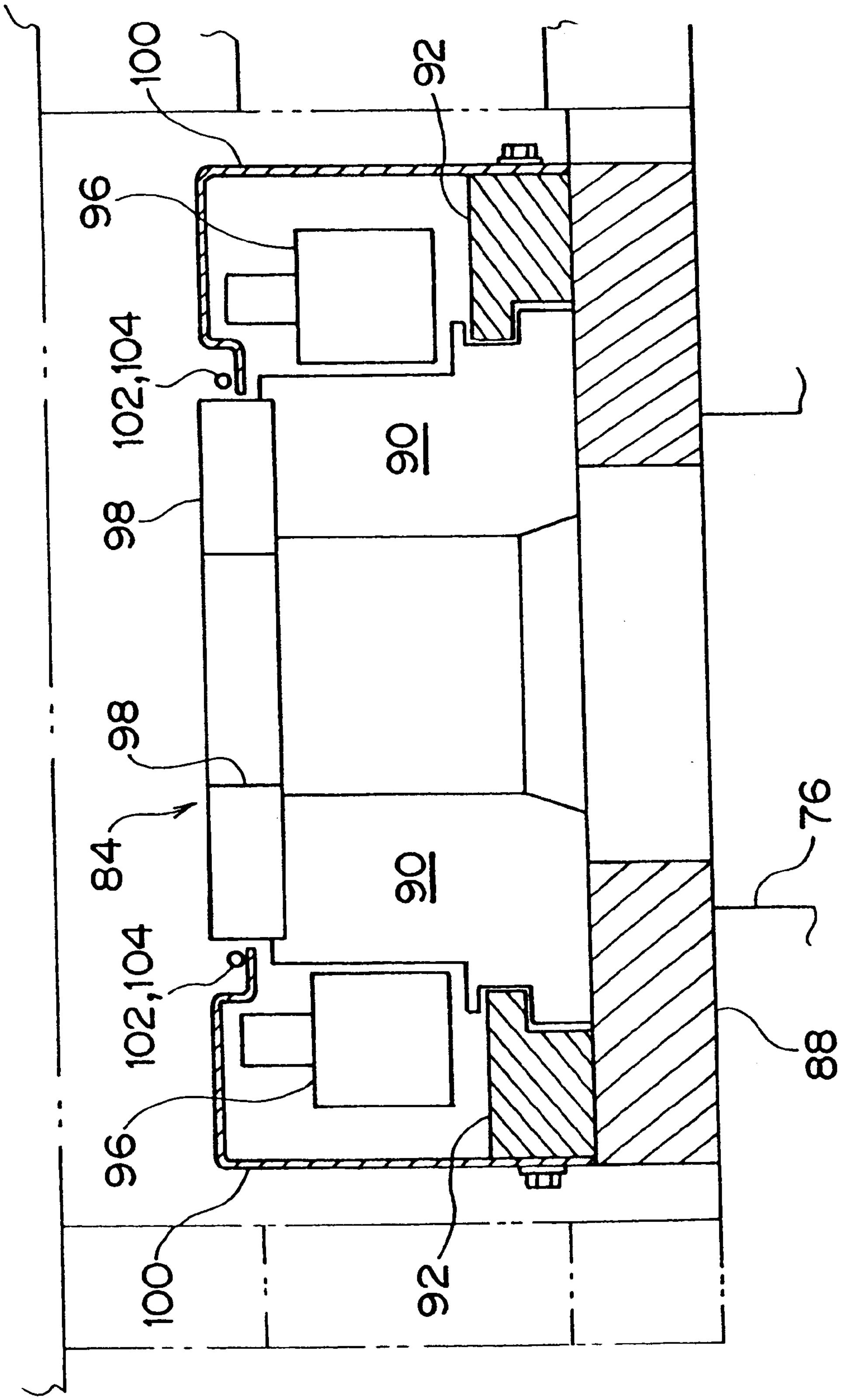
FIG. 4 is a sectional view taken along the C—C line in FIG. 3.
Figure 5:
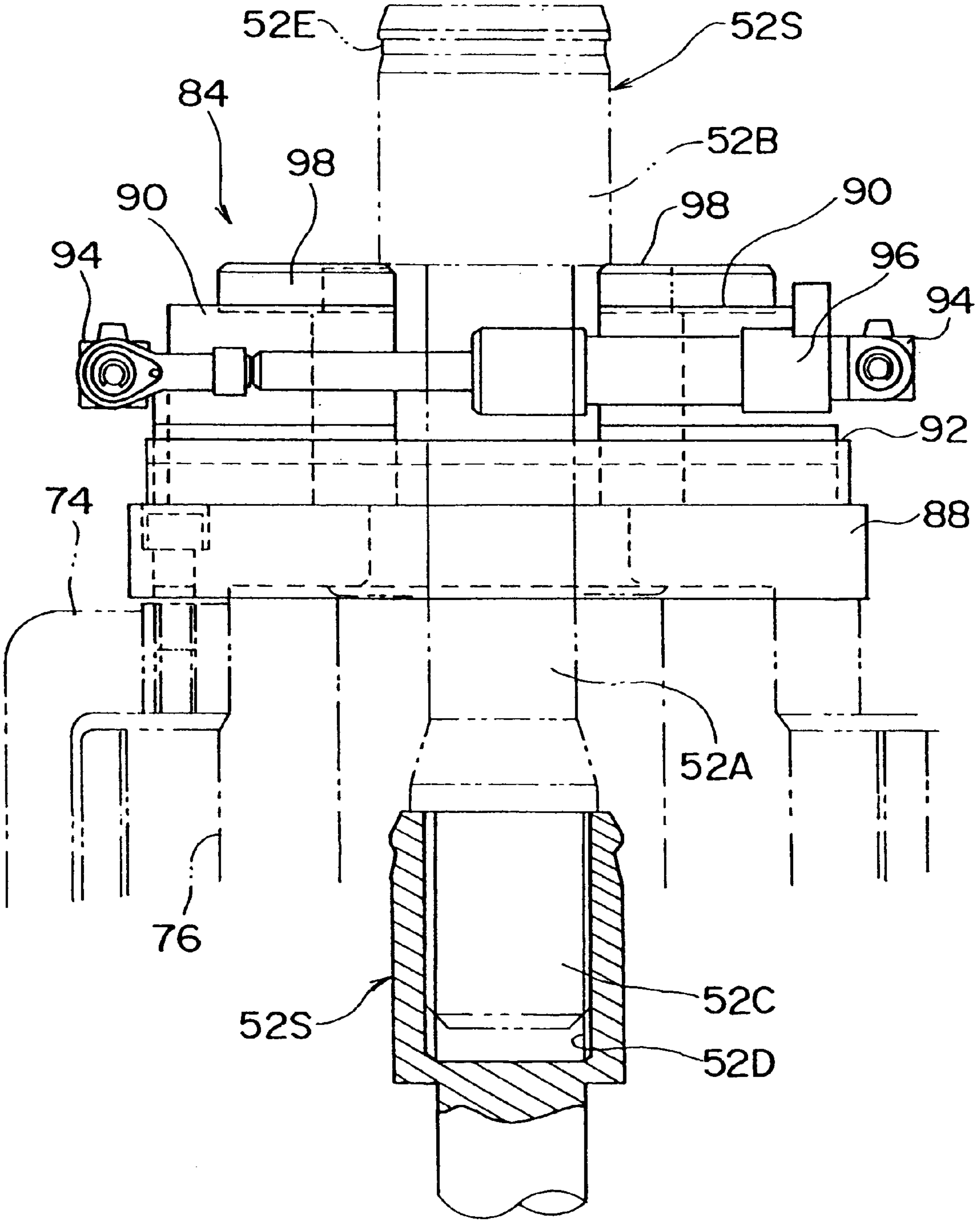
FIG. 5 is a side elevational view of the upper chuck unit of which sensor bracket is removed, according to the preferred embodiment.

The boiler jack 60 is provided with a center hole 82 at the central portion thereof to pass the suspending rod 52. The boiler jack 60 keeps hold of a neck portion -formed in the suspending rod 52 to support the boiler module 56 connected to the suspending rod 52, while allowing the boiler module 56 to lift up with the driving of the ram 76. In order to support the neck portion of the rod, an upper chuck unit 84 is provided on the top end of the ram of the jack 60, and a lower chuck unit 86 is provided in the ram chair 72 placed in the lower portion of the cylinder 74. FIGS. 3 to 5 show the above structure in detail with the upper chuck unit 84.

FIG. 3 is a sectional view indicated by arrow A in FIG. 2. FIG. 4 is a sectional view taken along the C—C line in FIG. 3. FIG. 5 is a side elevational view when a sensor bracket 100 (see FIG. 3) is removed. As shown in the drawings, the upper chuck unit 84 is provided with an opening at the central portion thereof and a rectangular-shaped chuck base 88 which is secured on the top face of the ram 76. On the upper face of the chuck base 88, a pair of chucks 90, divided into halves, are mounted to slide horizontally. The chucks 90 are opened and closed at the divided portion. In order to control the opening and closing direction of the chucks 90, inverted L-shaped slide guides 92 are arranged along a pair of opposed edges of the chuck base 88, and engaged with both of the side edge portions of each chuck 90. On the rear edge portion of each chuck 90, a bracket 94 is secured. Both of the end portions of the bracket 94 are connected to a hydraulic cylinder 96 for driving the pair of right and left chucks 90 to open and close. The hydraulic cylinder 96 is positioned above the upper face portion of the slide guide 92, and is expanded and contracted along the guiding direction to open and close the chucks 90 with the action of expanding and contracting.

The upper chuck unit 84 has two semi-circular top plates 98 which engage with the neck portion in the suspending rod 52 when the chucks 90 are closed. More specifically, the chuck 90 is formed to have a half-round recess, having a larger diameter than that of the neck in the suspending rod 52, on the half-divided portion. The chuck 90 is firmly provided with the top plate 98 having the half-round recess so that a circular opening approximately corresponding to the diameter of the neck is formed on the top face portion when the chucks are closed.

On each outer side face of the slide guides 92, an inverted L-shaped sensor bracket 100 is secured. The end of the sensor bracket 100 is bent downward in L-shape to form a lower step portion than the upper face of the top plate 98. On the lower step portion, an open sensor 102 detecting that the chucks 90 are opened and a close sensor 104 detecting that the chucks 90 are closed are arranged. Note that the lower chuck unit 86 has a similar structure to that of the aforementioned upper chuck unit 84, but the lower chuck unit 86 is provided in the ram chair 72 to chuck the suspending rod 52 under the cylinder 74.

The boiler jack 60 according to the embodiment is adjusted to allow the length of the rod 52S, composing the suspending rod 52, to equal a unit of an up-down stroke, therefore, the boiler jack 60 is structured to have the up-down stroke longer than the length of the rod 52S. As shown in FIG. 2 and FIG. 5, the suspending rod 52 is elongated by coupling the plural rods 52S in the axis direction. In each rod 52S, a rod head 52B of a larger diameter is formed on an upper portion of a rod part 52A. A male screw part 52C is formed on a lower portion of the rod part 52A. A female screw part 52D is formed on the side face formed in the central portion of the rod head 52B. The plural rods 52S are screwed and coupled in the axis direction by screwing the female screw part 52D with the male screw part 52C of another rod 52S. The rod 52S has a groove 52E for preventing itself from falling, which engages with a projection placed an engaging claw of the rod attaching/detaching device 68, on the periphery of the top of the rod head 52B.

The suspending rod 52 as described above is enabled to support a load by being chucked by the chuck unit. In the boiler jack 60, the upper chuck unit 84 and the lower chuck unit 86 simultaneously chuck the rod 52S and the rod 52S positioning under the previous rod 52S, and additionally, the state that the upper chuck unit 84 supports a load can be shifted to the state that the lower chuck unit 86 supports a load. When the ram 76 is changed from the descending position to the ascending position, the state that the lower chuck unit 86 supports a load can be moved to the state that the upper chuck unit 84 supports a load. This is made possible by defining the up-down stroke of the ram 76 to be slightly longer than the length of the rod 52S.

When the lower chuck unit 86 is assigned to support the load of the suspending rod 52, the ram 76 can be moved up by opening the upper chuck unit 84, and the rod 52S can be coupled or uncoupled at the top end of the suspending rod 52. The plural rods 52S are coupled between the supported position by the lower chuck unit 86 and the top end of the suspending rod 52, so that, especially when the screwing of the top rod 52S is released and the top rod 52S is separated, unscrewing of the screwing portions positioned under the top rod 52 in the center hole 82 might occur. For this reason, a detent mechanism is provided for stopping the rotation caused between the rod 52S2, lifted up by moving up the ram 76, and the rod 52S3, projected from the upper portion of the cylinder 74 and is to be lifted up after the rod 52S2 (see FIG. 2), in an ascending mode for lifting up the boiler module 56 and detaching the rod 52S.

The frame 66 as a rigid-frame construction, constructed for stably supporting the upright standing jack 60, is provided on the periphery of the boiler jack 60 (see FIG. 2), so that the strategic points of the jack 60 are supported by the frame 66. In the frame 66, defining the rod 52S2 as an object that is stopped rotating, which is directly coupled to the top of the rod 52S3 which is to be chucked by the upper chuck unit 84 at the upper portion of the ram 76 moved down, the detent mechanism 110 is provided in a transverse beam portion 106 placed at a position of the height of the larger-diametrical rod head 52B of the rod 52S2 (see FIG. 6).

Figure 6:
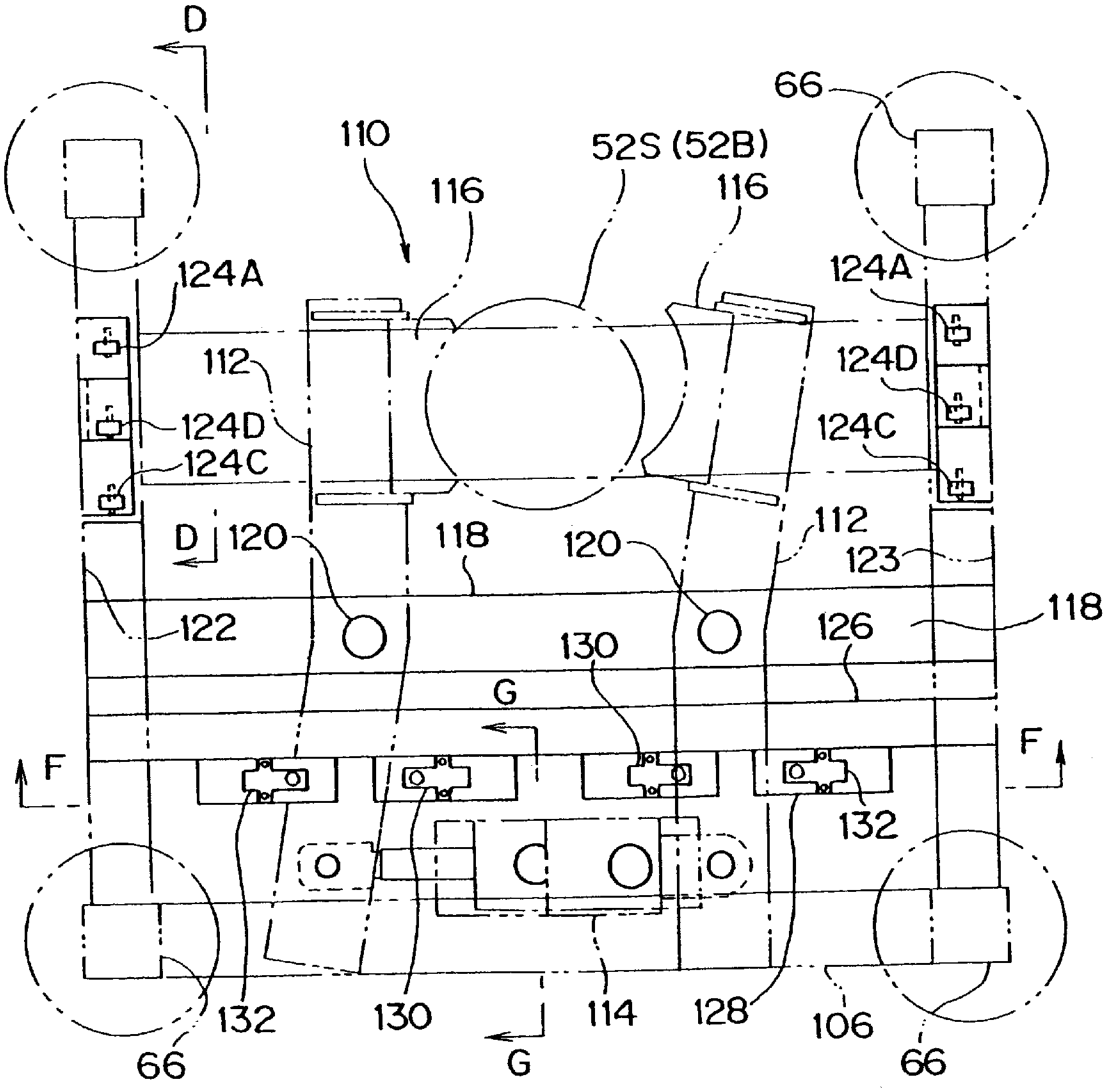
FIG. 6 is a sectional view indicated by arrow B in FIG. 2, and also a plane view of a detent mechanism.

As shown in FIG. 6 of the sectional view indicated with arrow B in FIG. 2, the detent mechanism 110 has a pair of turnable arms 112. The end portions of the arms 112 are opened and closed by a hydraulic cylinder 114 linking the arms, and pressuring blocks 116, provided at the end portions opening or closing, clamp the larger-diametrical rod head 52B of the rod 52S2 with pressure. For the purpose of opening and closing the pressuring blocks 116 at the center line on the axis of the boiler jack 60, the turnable arm 112 is attached onto a mounting beam 118, arranged parallel to the transverse beam portion 106, with a turning shaft 120 at some midpoint thereof, and the end portion of the arm 112, which is in the vicinity of the hydraulic cylinder 114, is slidably turned in the horizontal in the transverse beam portion 106. Thereby, a pair of turnable arms 112 clamp the larger-diametrical rod head 52B with the driving force caused by the hydraulic cylinder 114 while being guided to turn horizontally by the mounting beam 118 and the transverse beam portion 106, and then stops the whirl.

Figure 7:
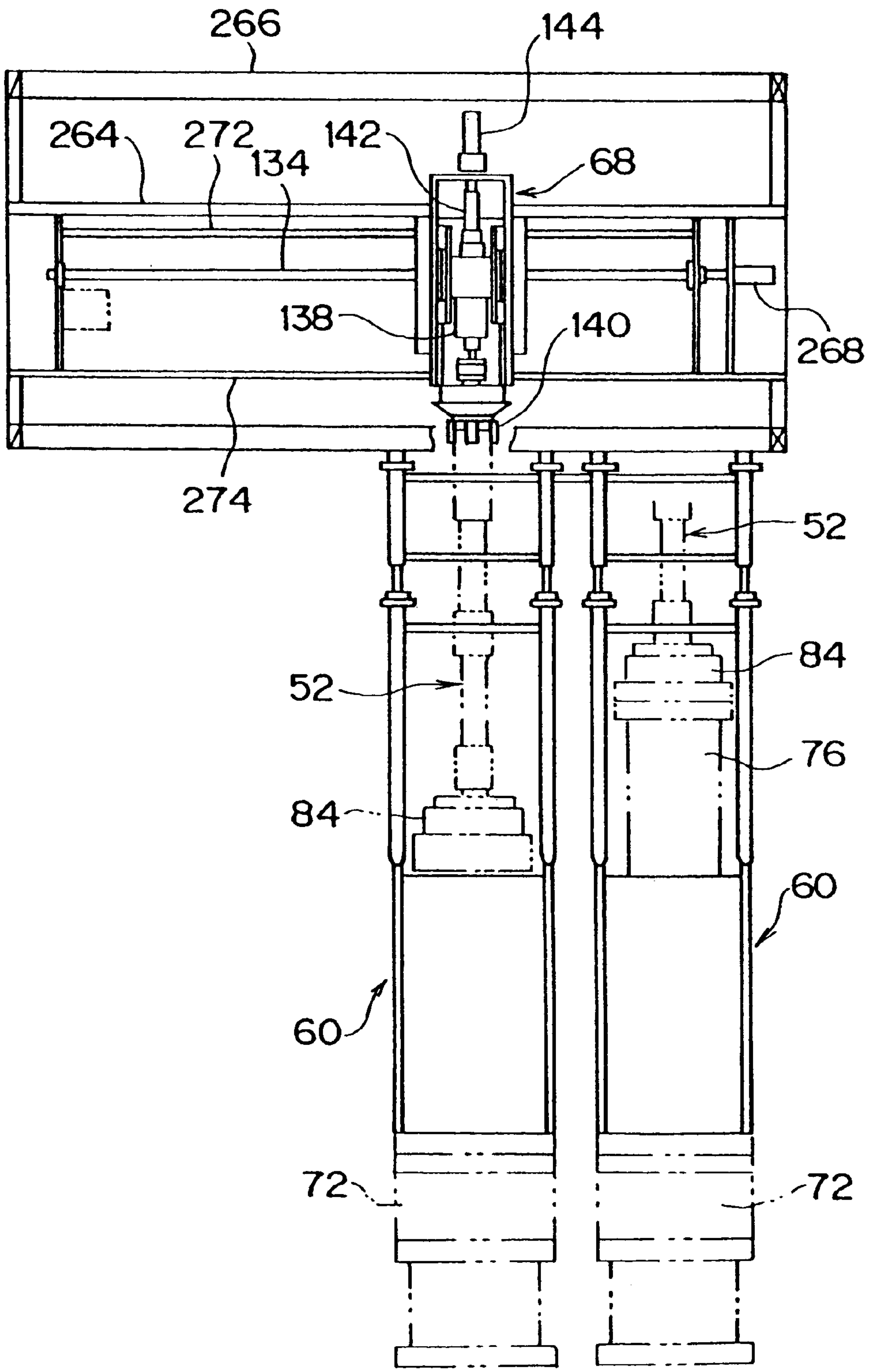
FIG. 7 is an exploded block components view of the jack device for a boiler and a rod attaching/detaching device of the embodiment.

The top rod 52S1 can be automatically coupled and uncoupled by providing the aforementioned detent mechanism 110. The structural example is shown in FIG. 7. As shown in the drawing, a transverse drive shaft 134 constituted of a screw shaft is placed above the boiler jack devices arranged in two rows. The rod attaching/detaching device 68 is provided to move to a position above any one of the adjacent boiler jack devices with the guide of the transverse drive shaft 134. In the rod attaching/detaching device 68, an attaching/detaching chuck (chucking means) 140 located under a rotation unit 138 which will be described in detail later is rotated by a rotating motor 142 provided with a servo-motor. Additionally, the rotation unit 138 is moved up and down by an elevating motor 144 provided with a servo-motor as an elevating means. After the attaching/detaching device 68 is moved to and stopped at a position directly above one of the boiler jack devices, the attaching/detaching device 68 is moved downward to grip the rod head 52B of the top rod 52S1 which is located directly on the rod 52S2 stopped whirling, and rotationally driven to release the screwing of the rods, whereby the top rod 52S1 is detached. On the other hand, in a descending mode in which the rod 52S is coupled to the suspending rod 52, the rod attaching/detaching device 68 delivers the rod 52S1 being to be coupled, and is rotationally driven to screw the rod 52S1 to the rod 52S2 stopped whirling, whereby the rods are coupled.

Figure 8:
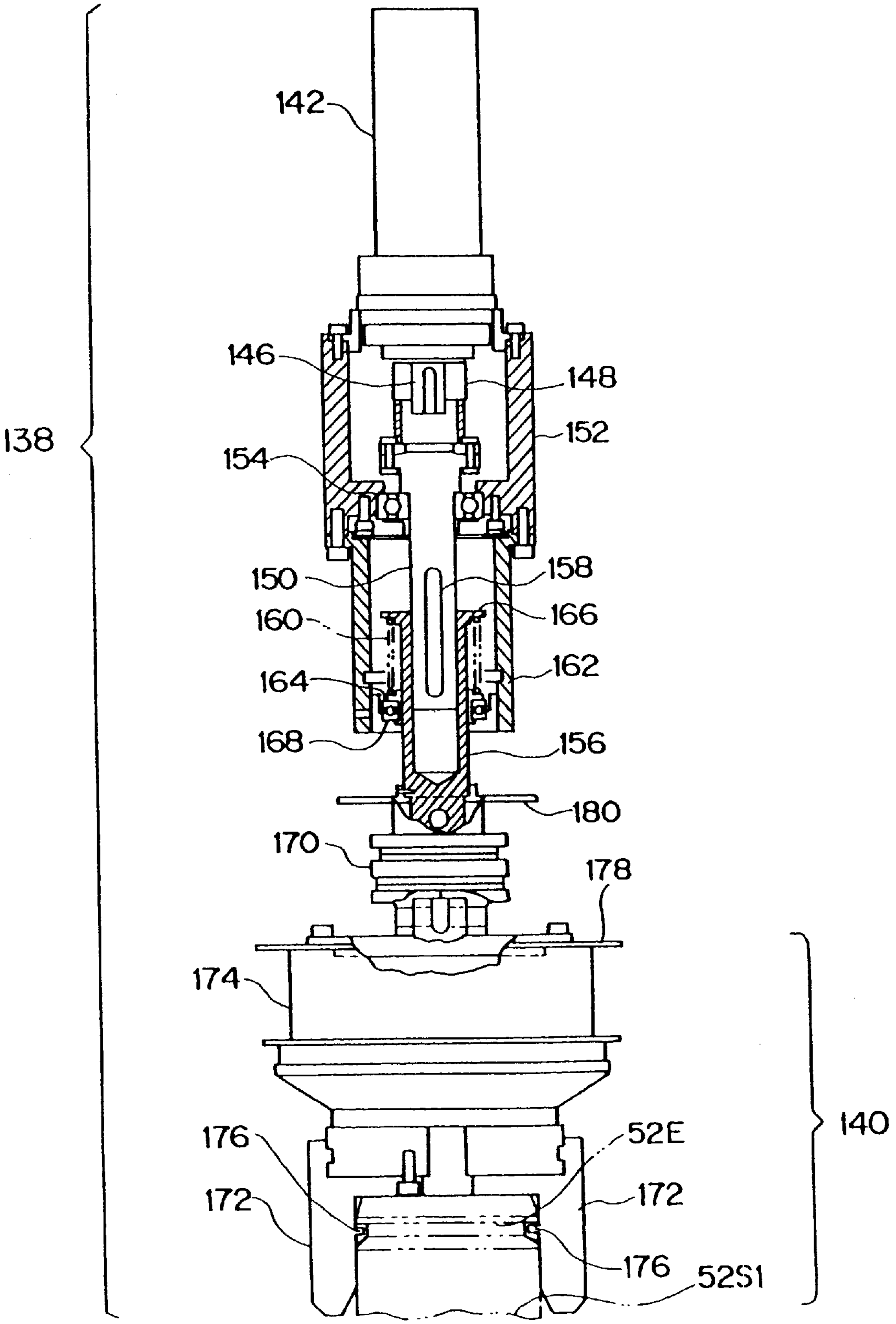
FIG. 8 is a sectional view of a rotation unit of the rod attaching/detaching device according to the preferred embodiment of the present invention.

As shown in FIG. 8, in the rotation unit 138, a guide shaft 150 is secured onto an output shaft 146 of the rotating motor 142 via a coupling 148. Under the rotating motor 142, a casing 152 covering the surrounding of the coupling 148 is fixed and rotatably supports the guide shaft 150 via a bearing 154. To the lower portion of the guide shaft 150, a cylindrical slide shaft 156, having the bottom face and constituting a shaft direction displacement absorbing means, is movably connected in the axis direction, so that the displacement of the shaft direction of the attaching/detaching chuck 140 to the guide shaft 150 is absorbed. A sliding key 158 is provided to the guide shaft 150 to avoid the rotation of the slide shaft 156 about the guide shaft 150. On the upper circumferential portion of the slide shaft 156, a compression springs 160 is arranged to forcibly push up the slide shaft 156 to carry out a floating support.

More specifically, on the periphery of the compression spring 160, a spring holder 162 secured on the bottom of the casing 152 is placed. In the lower portion of the spring holder 162, a spring seat 164 passed through the slide shaft 156 is placed. The compression spring 160 is located between the spring seat 164 and a flange-shaped spring shoe 166 formed on the upper portion of the slide shaft 156. In the lower portion of the spring holder 162, a bearing 168 is placed on the periphery of the spring seat 164 to rotatably support the slide shaft 156 via the spring seat 164.

On the bottom end of the slide shaft 156, the attaching/detaching chuck 140 is attached via a spring coupling 170 as a rotation shaft run-out displacement absorbing means. The attaching/detaching chuck 140 is an air chuck, and has three grip claws 172 in the lower portion thereof for grasping the head 52B of the rod 52S, and a pneumatic driven part 174 driving the opening and closing of the grip claws 172. On each inner face of the grip claws 172, a projection 176 is formed to engage the groove 52E, formed on the rod head 52B of the rod 52S and prevent the grasped rod 52S from falling. On the top face of the pneumatic driven part 174, a rotation detecting plate 178 for a rotation sensor detecting the rotation of the attaching/detaching chuck 140, which will be described in detail later, is placed in order to lift up and down the rotation unit 138 in synchronization with the rotation of the attaching/detaching chuck 140.

Above the spring coupling 170, a distance detecting plate 180 for detecting the amount of deflection of the compression spring 160 is secured to the slide shaft 156. On the lower outer circumferential face of the spring holder 162, a ring support 182 is fixed (see FIG. 9), on which four spring expansion sensors 184, 186, 188 and 190 are attached to be opposite the distance detecting plate 180. The spring expansion sensors 184, 186, 188 and 190 consist of a limit switch, a working transformer, a linear encoder, a photosensor or the like, and are positioned at a distance from one another in a diagonal arrangement in the axis direction of the slide shaft 156. Each of the spring expansion sensors detects the distance to the distance detecting plate 180 therefrom and inputs the detection signal into a control system for controlling the attaching/detaching device (not shown). Each of the spring expansion sensors 184 to 190 change to ON when the distance to the distance detecting plate 180 becomes less than a predetermined value, and OFF when the distance exceeds the determined value.

The spring expansion sensor 184 is for detecting the contracting limit of the compression spring 160, and is activated and turns ON when the distance between the distance detecting plate 180 and the sensor 184 is less than a predetermined value $d_{MIN}$, whereupon the control system stops the rotation of the attaching/detaching chuck 140 and raises an alarm. When the attaching/detaching chuck 140 does not suspend the rod 52S, the distance between the spring expansion sensor 186 and the distance detecting plate 180 is defined to be less than a value $d_0$. The spring expansion sensor 186 changes into the ON position when the distance between the distance detecting plate 180 and the sensor 186 is less than a value $d_0$. The spring expansion sensor 188 changes into the OFF position when the distance between the distance detecting plate 180 and the sensor 188 further drops less than a predetermined value $d_1$, for example more than $d_1$+5 mm, in consequence whereof the compression spring 160 is stretched out by the weight produced when the attaching/detaching chuck 140 grasps and suspends the rod 52S. As will be described later, the control system decreases the ascending speed of the rotation unit 138 when the spring expansion sensor 188 is in the OFF position in the uncoupling step of the rod 52S, whereas the control system increases the descending speed of the rotation unit 138 in the coupling step of the rod 52S. And, the spring expansion sensor 190 is for detecting the expanding limit of the compression spring 160, and changes into the OFF position when the distance between the distance detecting plate 180 and the sensor 190 exceeds a predetermined value $d_{MAX}$, whereupon the control system stops the rotation of the attaching/detaching chuck 140 and raises an alarm.

Figure 9:
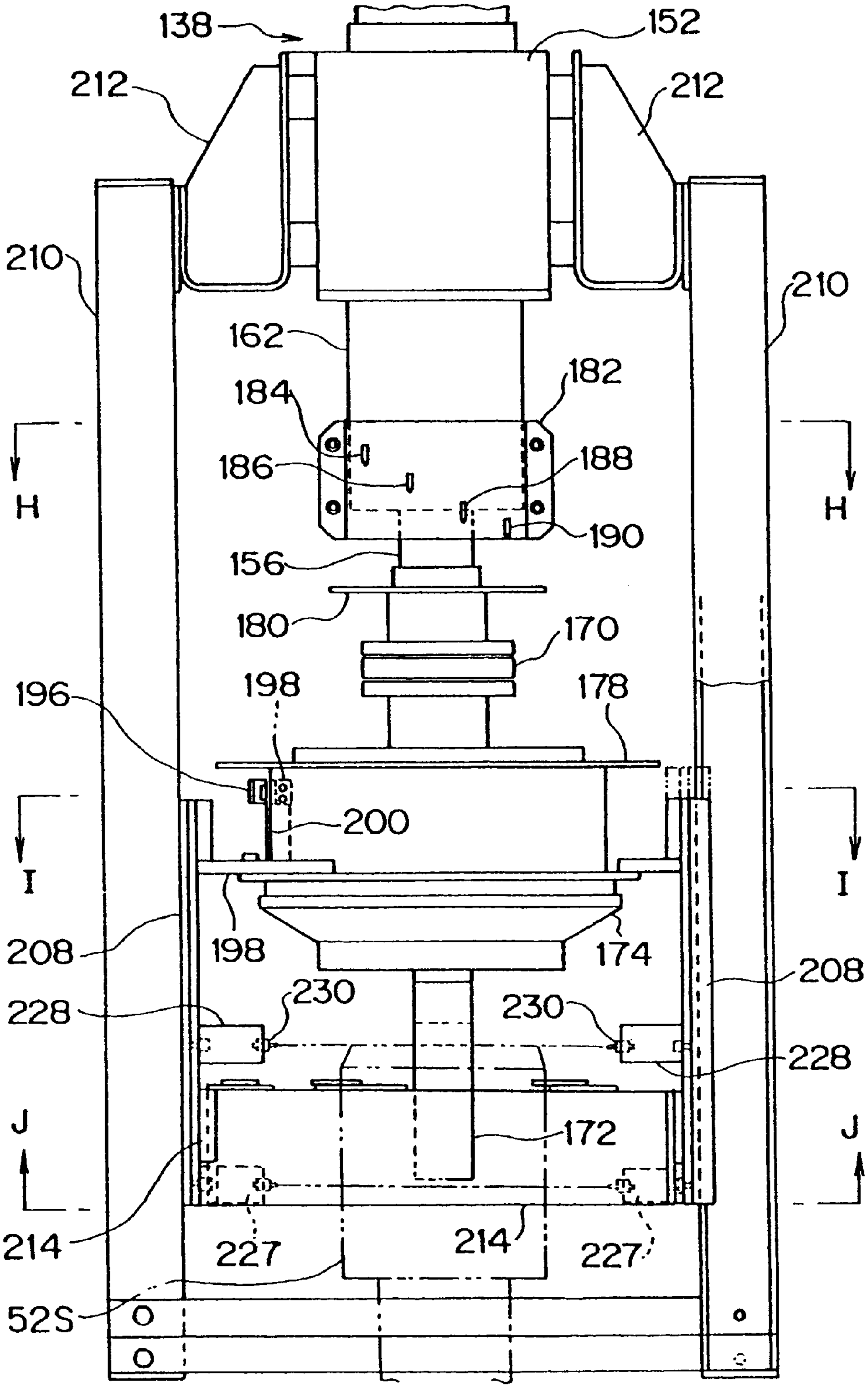
FIG. 9 is a front view of the rotation unit of the rod attaching/detaching device of the preferred embodiment.
Figure 10:
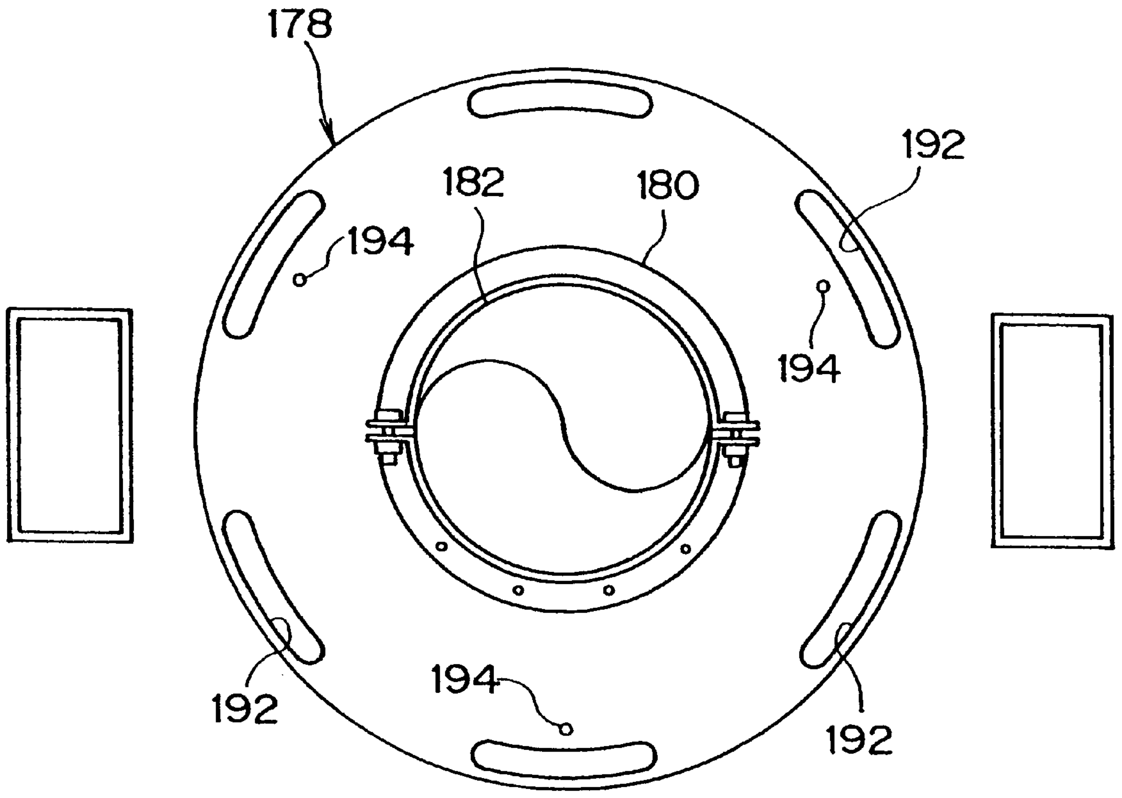
FIG. 10 is a sectional view taken along the H—H line in FIG. 9.

The rotation detecting plate 178 is structured as shown in FIG. 10, in which plural (six in the embodiment) rotation detecting slots 192 are opened to be spaced 60 degrees from each other about the center of the plate 178 on the margin of the plate 178. The rotation detecting plate 178 is shaped in an arc-shaped oval along the circumferential edge of the rotation detecting plate 178. In addition, plural (three in the embodiment) basic point holes 194 are formed on the rotation detecting plate 178. The basic point holes 194 are arranged to be spaced 120 degrees from each other about the center of the rotation detecting plate 178, each of the holes 194 being formed at a position closer to the center of the rotation detecting plate 178 than the rotation detecting slots 192 and at a position corresponding to the middle point of the rotation detecting slot 192 in the longitudinal direction. Under the rotation detecting plate 178, a rotation detecting sensor 196 and a home position detecting sensor 198, consisting of a photosensor, for respectively detecting the rotation detecting slot 192 and the reference hole for home position 194, are placed (see FIG. 9). The length of the rotation detecting slot 192 along the circumference of the rotation detecting plate 178 corresponds to the length of the space between the rotation detecting plates 178 along the circumference of the rotation detecting plate 178. A duty rate of an ON ("H") signal and an OFF ("L") signal, outputted from the rotation detecting sensor 196 when the rotation detecting plate 178 rotates a turn at a fixed speed, is defined as 50%.

Figure 11:
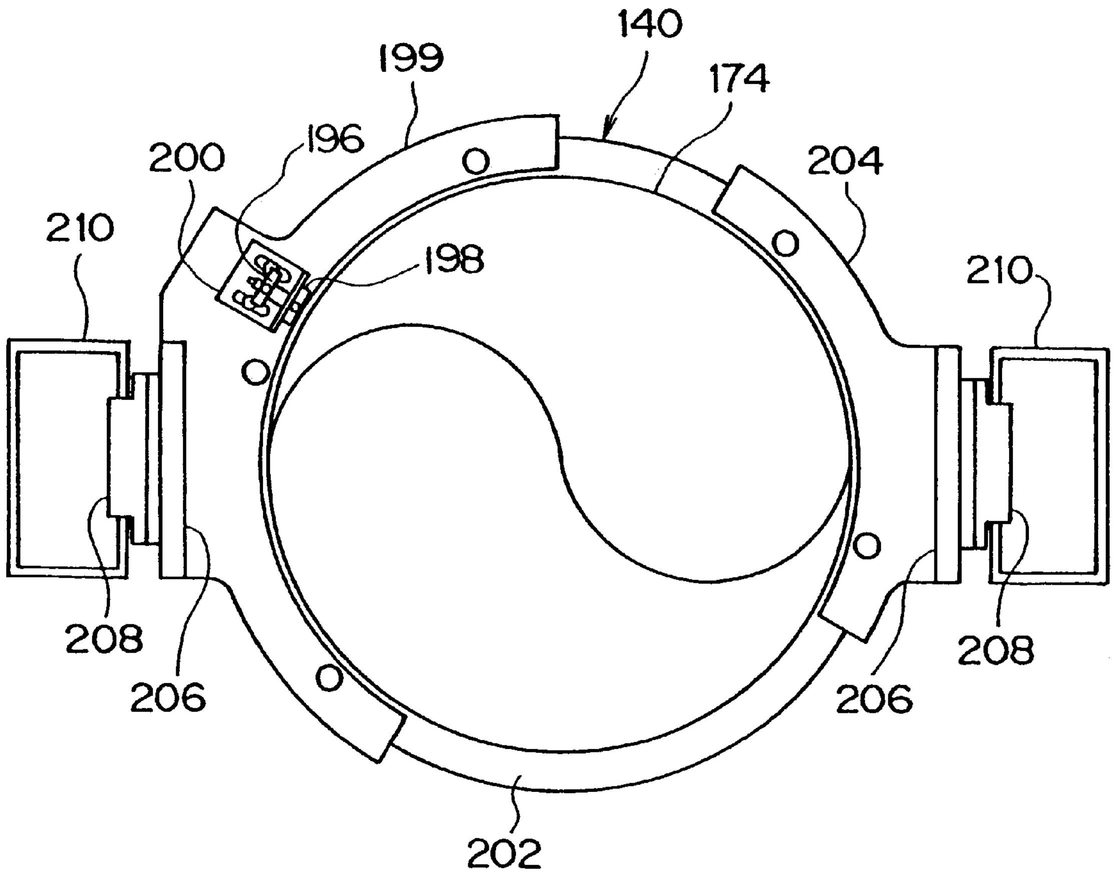
FIG. 11 is a sectional view taken along the I—I line in FIG. 9.

As shown in FIG. 11, the rotation detecting sensor 196 and the basic point sensor 198 are attached on an mounting bracket 200 secured on the upper face of a steady plate 199. The steady plate 199 has an arc shape shorter than a semicircle and is secured on the upper face of a flange portion 202 of the pneumatic driven part 174 to avoid the vibration, caused by the rotation of the attaching/detaching chuck 140, in cooperation with a steady plate 204 secured on the flange portion 202 opposite the steady plate 199.

On the outer edge portions of the steady plates 199 and 204, mounting plates 206 stand at both sides of the attaching/detaching chuck 140 in the diameter direction. Steady guides 208 are respectively attached to the mounting plates 206 to orient toward the outside, and engaged with guiding grooves formed on rectangular cylinder-shaped guide supports 210 located at the both sides of the attaching/detaching chuck 140 to avoid the vibration of the attaching/detaching chuck 140 and guide the vertical movement of the attaching/detaching chuck 140 along the guide support 210. As shown in FIG. 9, a pair of the guide supports 210 are secured to the side portion of the casing 152 via a fixing bracket 212 at the upper end portion thereof.

Figure 12:
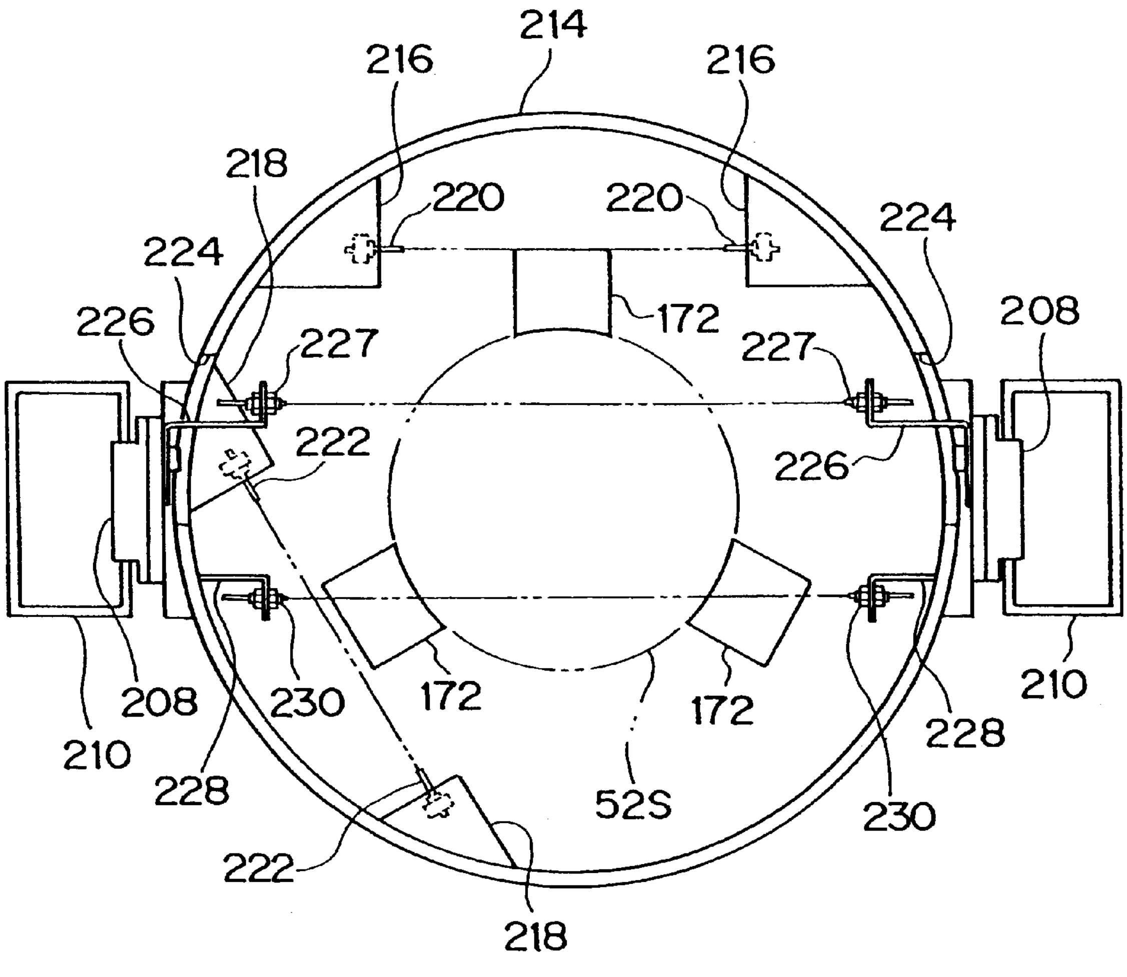
FIG. 12 is a sectional view taken along the J—J line in FIG. 9.

On the lower end portion of a pair of the steady guide 208, a sensor mounting ring 214 shown in detail in FIG. 12 is secured. On the upper end of the sensor mounting ring 214, two pairs of support plates 216 and 218 are secured to overhang into the sensor mounting ring 214 (see FIG. 12). In a pair of the support plate 216, a grip sensor 220, consisting of a light emitting portion and a light receiving portion for detecting that the grip claws 172 of the attaching/detaching chuck 140 close to grip the rod 52S, is attached to confront each other to detect the gripping by means of changing into the ON position when the grip claws 172 grip the rod 52S. In the other pair of the support plate 218, a grip release sensor 222 consisting or a light emitting portion and a light receiving portion is attached to confront each other to detect the release of the gripping of the rod 52S by the attaching/detaching chuck 140 by means of changing into the OFF position when the grip claws 172 move backward between the light emitting portion and the light receiving portion.

In the lower end portion of the sensor mounting ring 214, a pair of notches 224 are formed. A bracket 226 secured to the steady guide 208 via the notch 224 is projected inside the sensor mounting ring 214. At the ends of the brackets 226, a head detecting sensor 227 for detecting the movement of the head 52B of the rod 52S into the grip claws 172 of the attaching/detaching chuck 140 is attached to confront each other. The head detecting sensor 227, consisting of a light emitting portion and a light receiving portion, is placed away from the center to either side of the attaching/detaching chuck 140 as seen from the top. Above the sensor mounting ring 214, a tight sensor 230 is secured to each of the steady guides 208 via a bracket 228 to confront each other (see FIG. 9). The tight sensor 230 consists of a light emitting portion and a light receiving portion, and is placed parallel to the head detecting sensor 227 along a linearly symmetrical position to the head detecting sensor 227 with respect to the center of the attaching/detaching chuck 140 as seen from the top. And additionally, the tight sensor 230 detects that the upper end of the grip claw 172 of the attaching/detaching chuck 140, namely, the slide face of the grip claw 172 gets in contact with the top face of the rod heat 52B of the rod 52S. The contact between the slide face of the grip claw 172 and the rod head 152B is detected, whereby the down-movement of the attaching/detaching chuck 140 is finished and the closing operation of the grip claws 172 is permitted.

Figure 13:
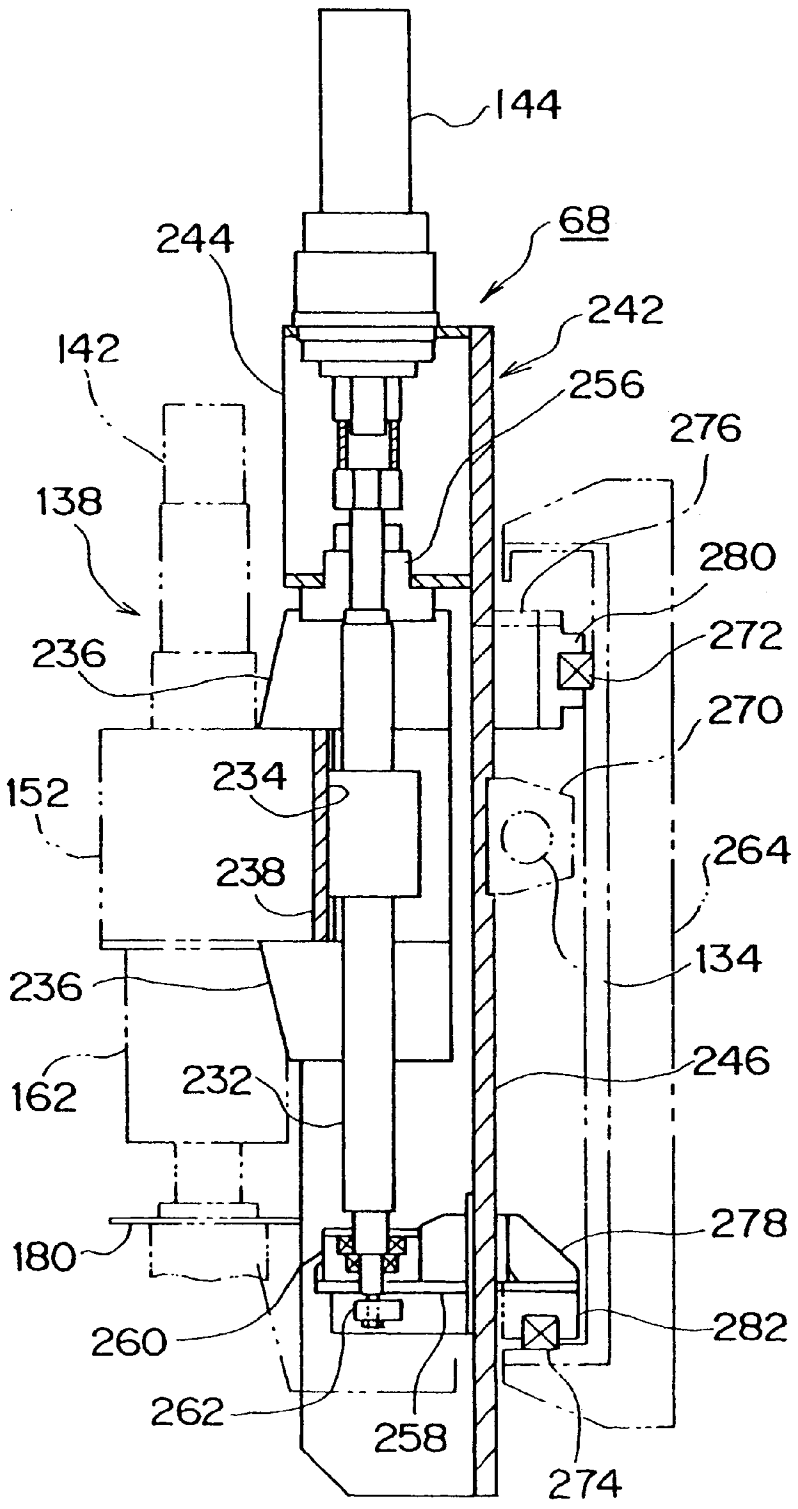
FIG. 13 is a vertically sectional view of the rod attaching/detaching device of the preferred embodiment.
Figure 14:
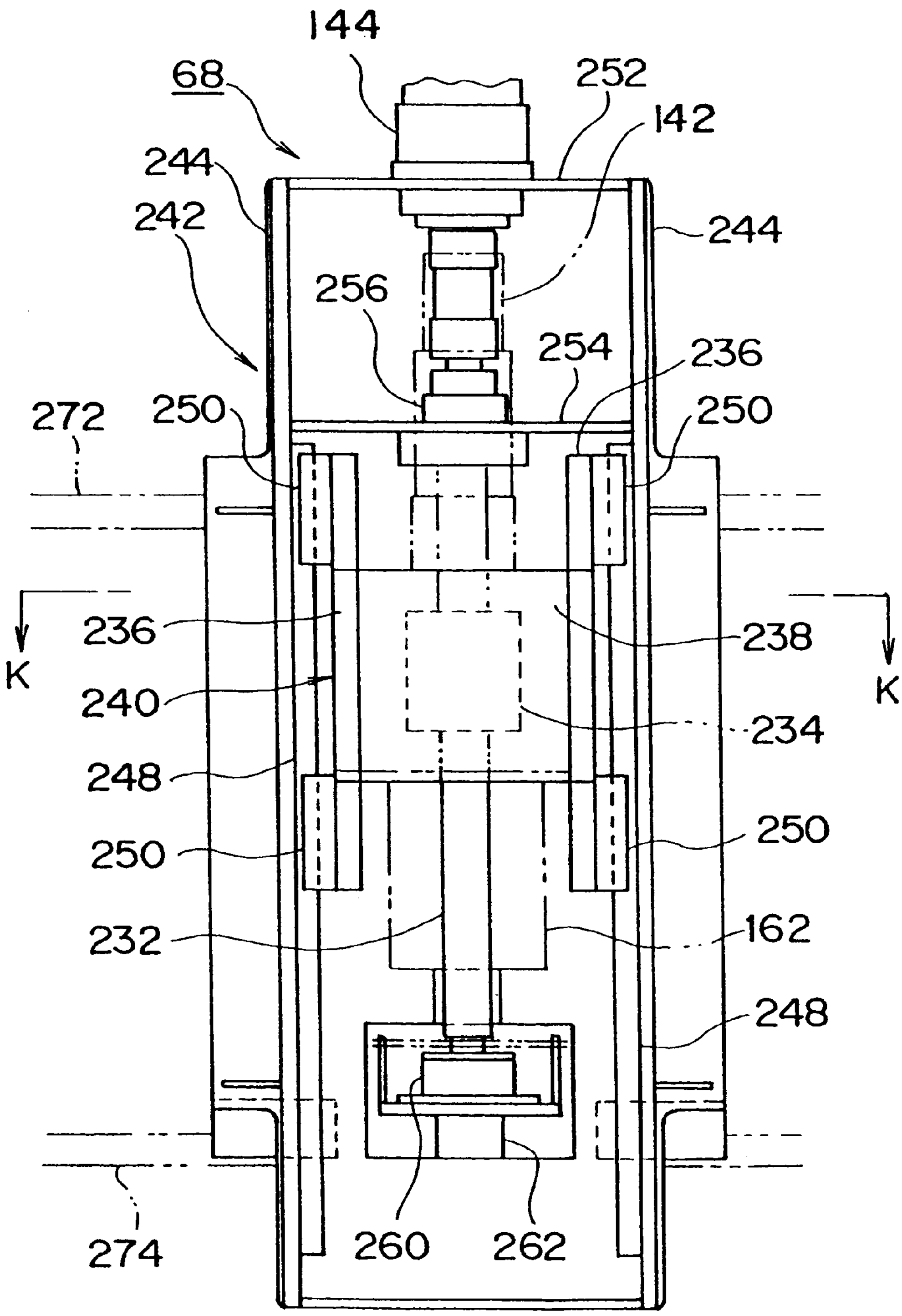
FIG. 14 is a front view of the rod attaching/detaching device of when the rotation unit is removed, according to the preferred embodiment.
Figure 15:
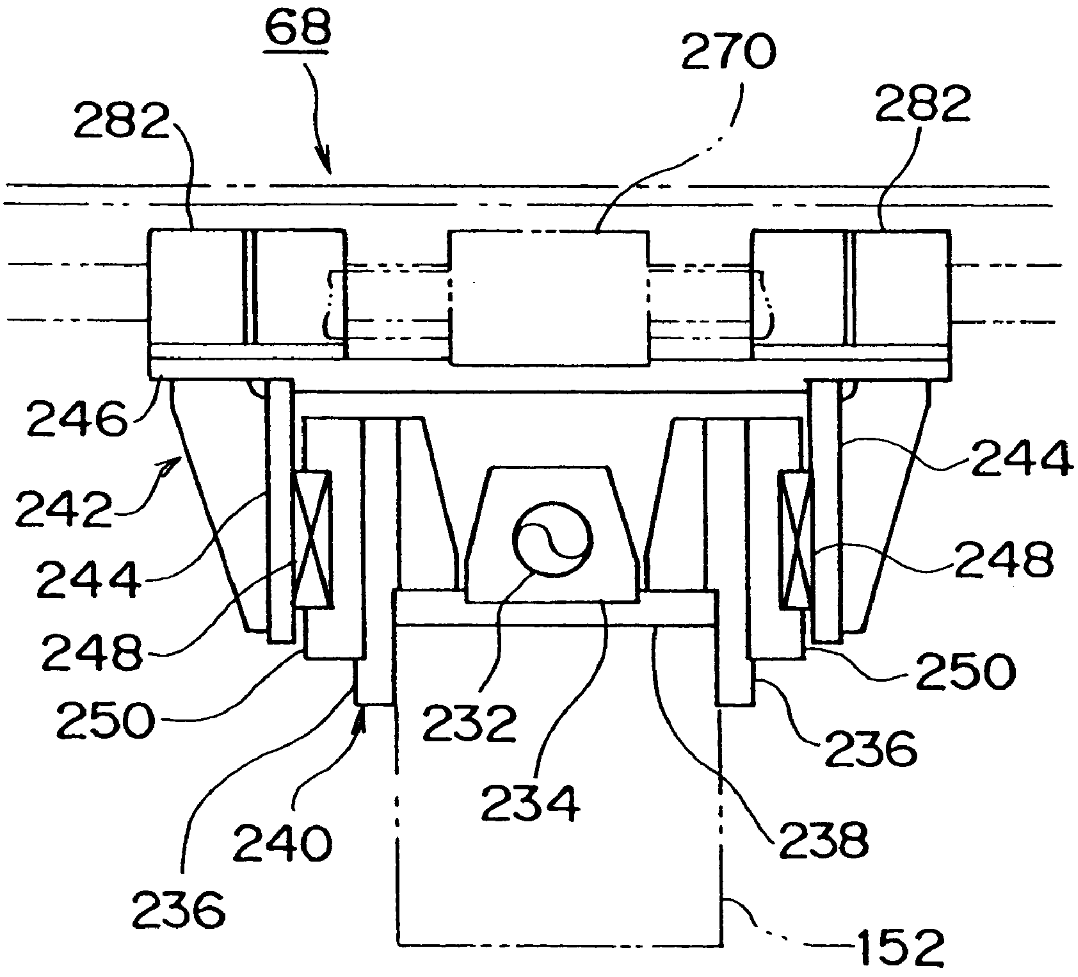
FIG. 15 is a sectional view taken along the K—K line in FIG. 14.

As shown in FIG. 13, the rotation unit 138 is attached to a nut 234 screwed with a screw shaft 232 rotated by the elevating motor 144. More specifically, as shown in FIG. 14 and FIG. 15, a cross-sectional C-shaped elevating frame 240 composed of a pair of side plates 236 and a back plate 238 is attached to the nut 234. The back side of the casing 152 of the rotation unit 138 is secured to the elevating frame 240. The elevating frame 240 is vertically movable with respect to a cross-sectional C-shaped guide frame 242.

The guide frame 242 has a pair of side plates 244 and a connection plate 246 joining the side plates 244. Guide rails 248 are oriented in the vertical direction of the opposed inner faces of the side faces 244. Each guide rail 248 engages guide bearings 250, attached on the upper and lower portions of the outer face of each side plate 236 of the elevating frame 240. The guide bearing 250 is guided by the guide rail 248, whereby the rotation unit 138 is vertically movable along the guide frame 242 through the elevating frame 240.

The guide frame 242 has a motor mounting plate 252 at the upper end thereof, the elevating motor 144 being secured on the motor mounting plate 252 (see FIG. 14). Under the motor mounting plate 252, a supporting plate 254 is placed. A support unit 256 passed with a screw shaft 132 there-through is attached on the supporting plate 254 to rotatably support the upper portion of the screw shaft 232. The lower portion of the screw shaft 232 is rotatably supported in a bearing unit 260, consisting of a thrust bearing and a radial bearing, attached in a bearing bracket 258 provided on the connection plate 246 of the guide frame 242. The lower portion of the screw shaft 232 is passed through the bearing bracket 258 and attached thereto with a rotary encoder 262 for detecting the rotational speed of the screw shaft 232. An output signal of the rotary encoder 262 is sent to the control system for feedback.

As shown in FIG. 13, the guide frame 242 is supported to move on a cross-sectional C-shaped transverse frame 264 in the horizontal direction. The transverse frame 264 is secured to a main frame 266 as shown in FIG. 7. The transverse frame 264 rotatably supports the transverse drive shaft 134, consisting of a screw shaft, through a bracket. A transverse drive motor 268 is connected to the end of the transverse drive shaft 134. The transverse drive shaft 134 is rotated by rotationally driving the motor 268, so that the rod attaching/detaching device 68 is moved in the horizontal direction.

More specifically, a transverse nut 270, secured on the back face of the guide frame 242 of the rod attaching/detaching device 68, is screwed to the transverse drive shaft 134 (see FIG. 13), and moves in the axis direction with the rotation of the transverse drive shaft 134, so that the rod attaching/detaching device 68 is lateraled in the horizontal direction. In the upper portion and the lower portion of the front face of the transverse frame 264, guide rails 272 and 274 parallel to the transverse drive shaft 134 are provided respectively. Guide bearings 280 and 282, placed on the back face of the guide frame 242 with a upper bracket 276 and a lower bracket 278, are respectively engaged with the guide rails 272 and 274. The load of the attaching/detaching device 68 is supported by the guide bearings 280 and 282. In addition, the lateral movement of the attaching/detaching device 68 can be smoothly carried out.

Figure 16:
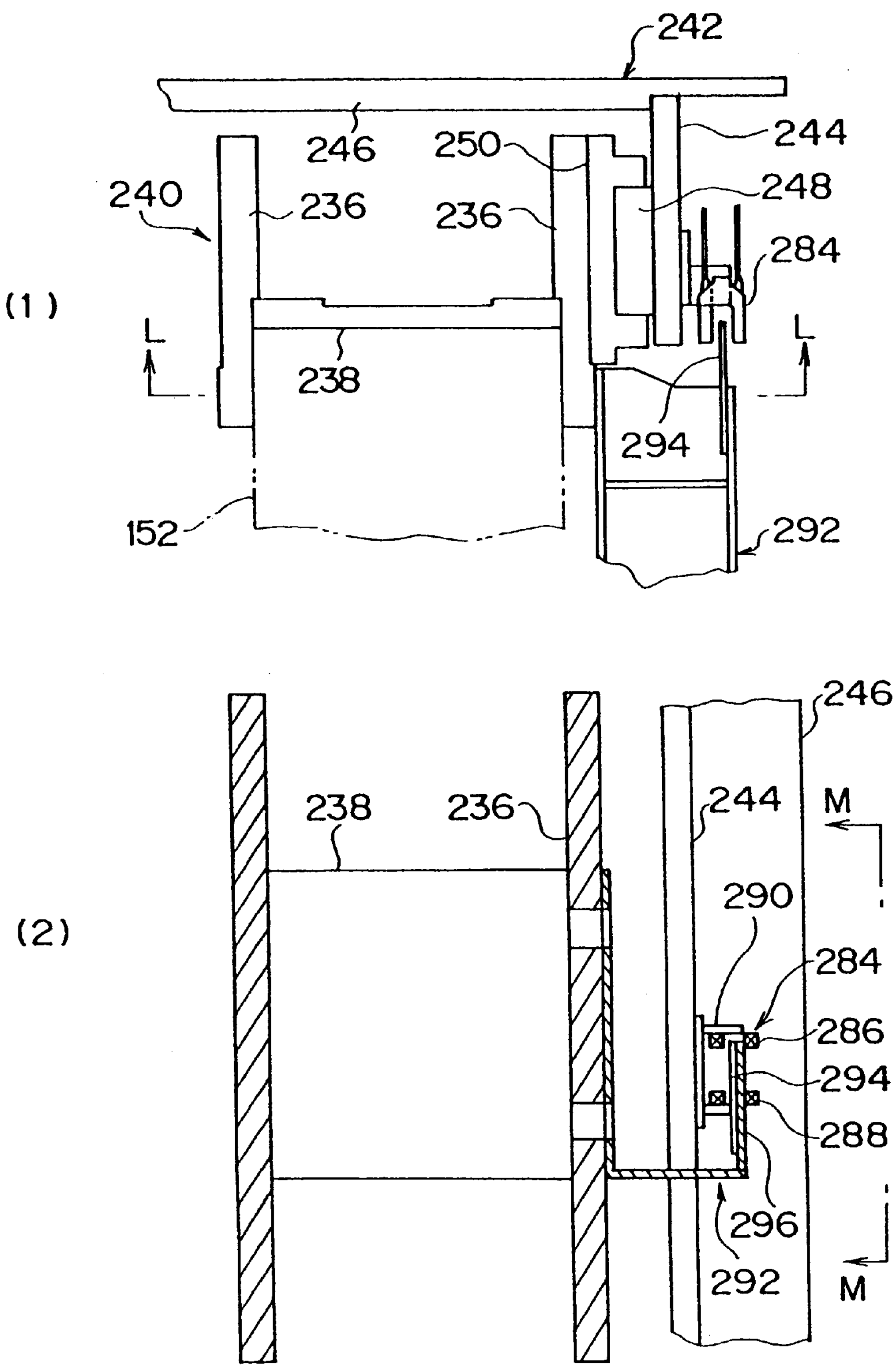
FIG. 16 are a plane view showing an attaching state of a sensor for detecting the vertical position of the rotation unit of the rod attaching/detaching device of the preferred embodiment, and a sectional view (the L—L line)
Figure 17:
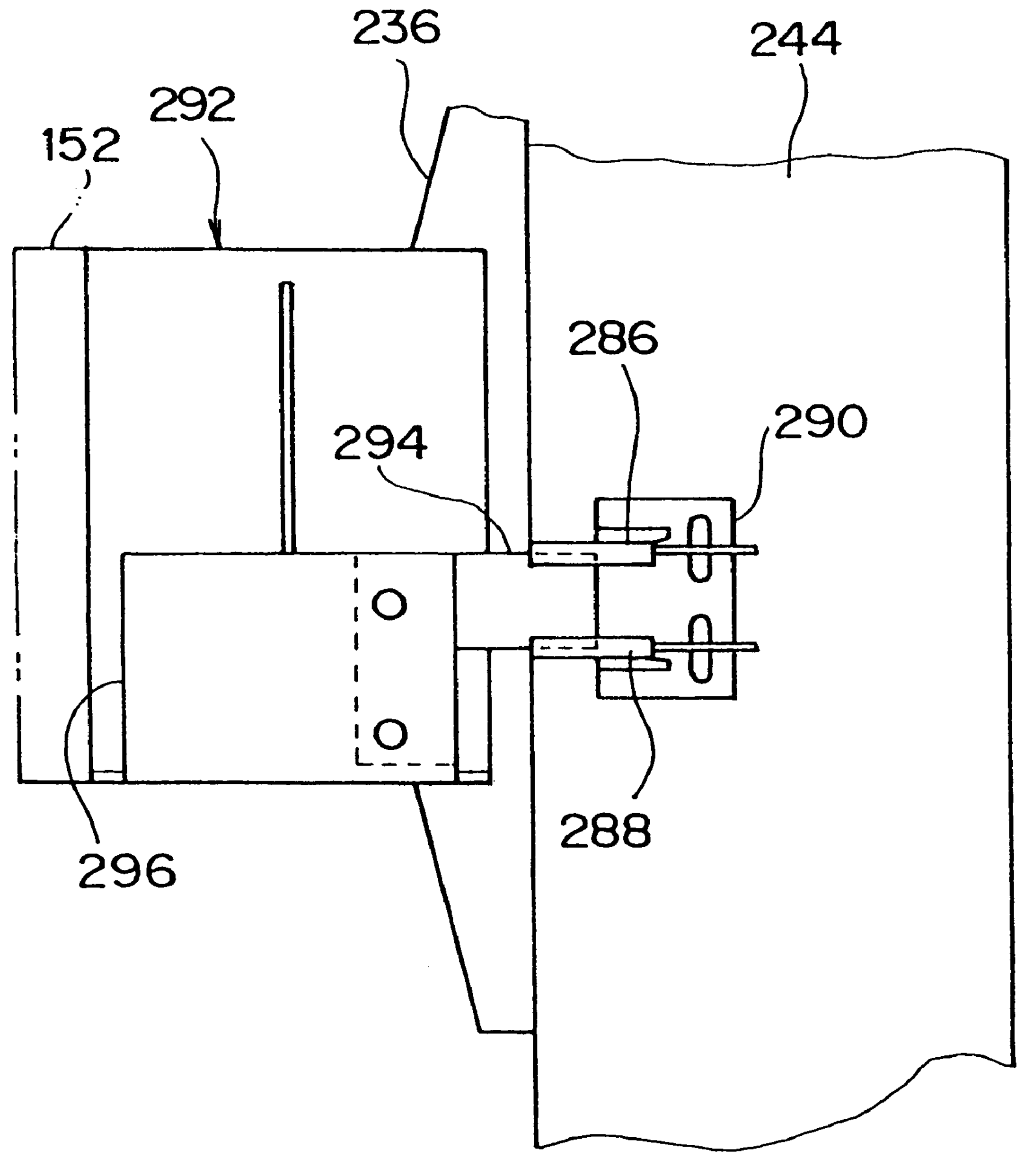
FIG. 17 is a sectional view taken along the M—M line in FIG. 16.

As shown in FIG. 16(1), an elevating position sensor 284 for detecting the elevating position of the rotation unit 138 is placed on the side portion of the guide frame 242. As shown in FIG. 16(2), the elevating position sensor 284 is composed of a pair of photo-couplers 286 and 288 which are arranged in the vertical direction. The photo-couplers 286 and 288 are respectively secured on the outer face of the side plate 244 of the guide frame 242 with sensor brackets 290. The photo-couplers 286 and 288 are activated by a striker 294 which is secured on the outer side face of the side plate 236 of the elevating frame 240 with mounting brackets 292. Each mounting bracket 292 of depressed cross-section is attached to the striker 294 on the inner face of a side wall part 296 thereof which is located toward the outside. As shown in FIG. 17, the end of the inverted L-shaped striker 294 is inserted between a light emitting portion and a light receiving portion of the photo-couplers 286 and 288. The width of the end of the striker 294 is similar to the width between a pair of the photo-couplers 286 and 288 which are arranged in the vertically direction. When the striker 294 moves to above the photo-coupler 286 or when the striker 294 moves to under the photo-coupler 288, the control system stops the lifting movement of the rotation unit 138 and raises an alarm.

Figure 18:
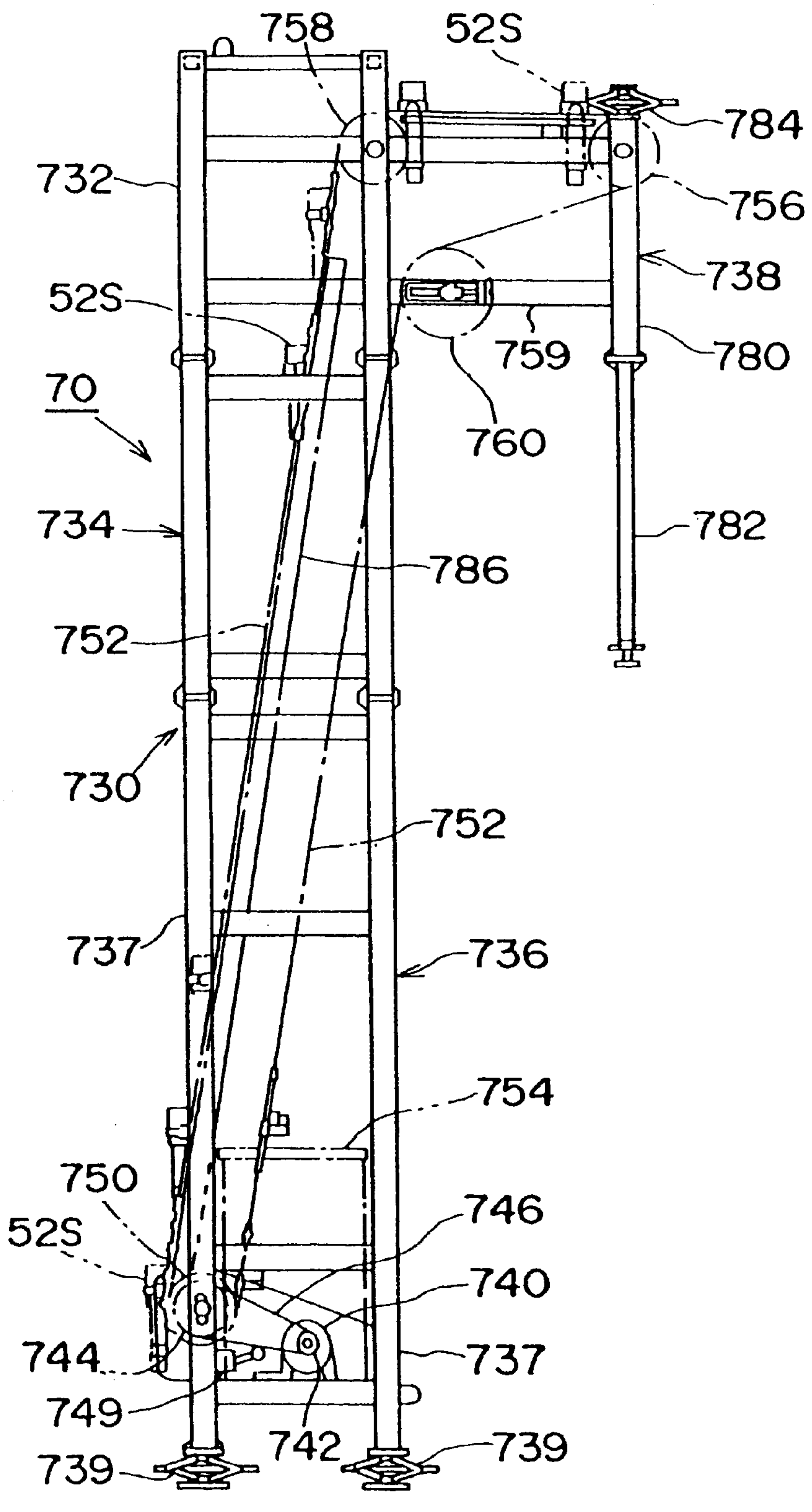
FIG. 18 a side elevational view of a rod conveyor device according to the preferred embodiment.
Figure 19:
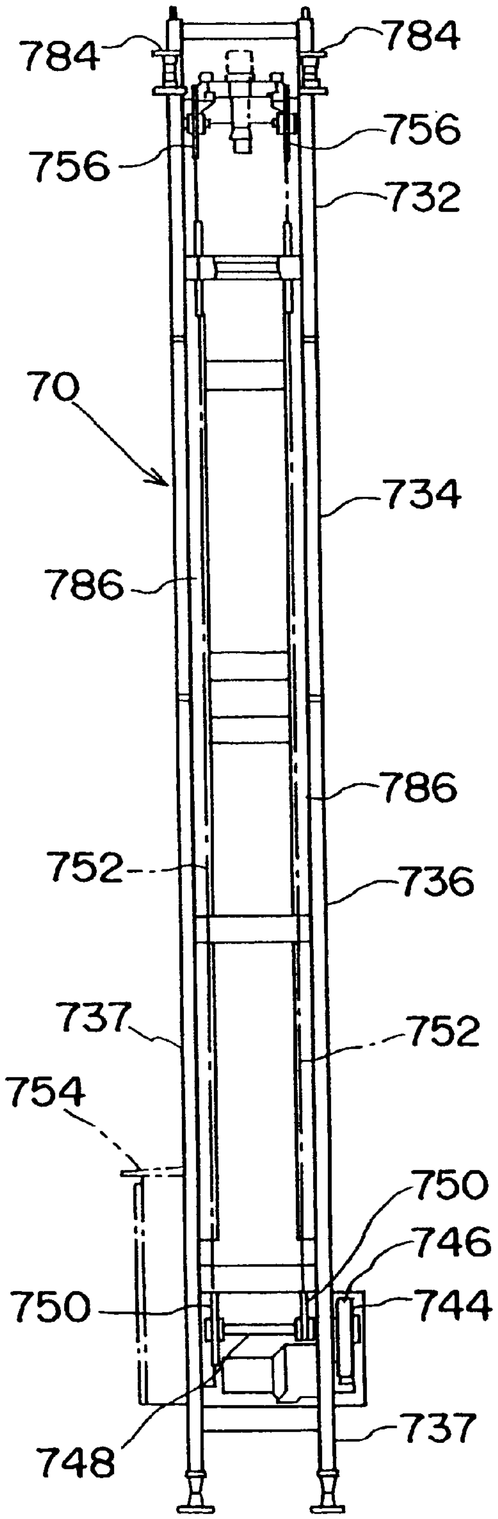
FIG. 19 is a back elevational view of the rod conveyor device according t o the preferred embodiment.

The rod conveyor device 70, as shown in FIG. 18 and FIG. 19, consists of a conveying frame 730 which is assembled with modules of an upper frame 732, an intermediate frame 734 and a lower frame 736. In addition, an inverted L-shaped transverse frame 738 is placed in the middle portion of the upper frame 732 in the vertical direction to extend toward the rod attaching/detaching device 68 (not shown) so that the end portion of the transverse frame 738 is located under the rod attaching/detaching device 68. In the conveying frame 730, the upper frame 732, the intermediate frame 734 and the lower frame 736 are screwed to one another vertically, in order from top, so that the assembly and disassembly are smoothly carried out. In addition, the length of the transferring route in the vertical direction can be easily changed by placing the intermediate frame 734, having an any given length, between the upper frame 732 and the lower frame 736 or by changing the number of intermediate frames 734. The length of transferring route in the transverse direction (the horizontal direction) can be easily changed also by adding frame members to the end of the transverse frame 738.

In the conveying frame 730, the lower frame 736 is located on the working floor 42 as the storage place of the suspending rods as shown in FIG. 1. The transverse frame 738 is placed under the main frame 266 of the rod attaching/detaching device 68, in which the upper end potion of the transverse frame 738 (the right side of FIG. 18) is a delivery position for the rod. A manual jack 739 is placed at the bottom of each vertical member 737 of the lower frame 736 to adjust the height of the conveying frame 730.

In the lower portion of the lower frame 736, a transfer drive motor 740 capable of rotating in both directions is provided. A drive pulley 742 is secured to a drive shaft of the motor 740 which is extended toward the conveying frame 730. A drive belt 746 is wound on the pulley 742 and a pulley 744 which is rotatably provided to the side portion of the vertical member 737 of the lower frame 736. Under the pulley 744, a belt tension 749 for adjusting the tension of the drive belt 746 is placed to the vertical member 737 which supports to rotate the pulley 744 with a rotating shaft 748. As shown in FIG. 19, the rotating shaft 748 attached with the pulley 744 spans across a pair of the vertical members 737 and is thereto secured with a pair of drive sprockets 750 as a changing direction portion, the sprockets 750 combinedly rotating with the pulley 744. As will be described in detail later, a conveying chain 752 for transferring the rod 52S as a transferred object is wound on each drive sprocket 750. On the other side portion of the lower frame 736 which is opposite the side portion provided with the pulley 744, a control panel 754 having a controller for controlling the conveyor device 70.

A pair of driven sprockets 756 as a changing direction portions are rotatably attached to the upper end of the transverse frame 738 of the upper frame 732. A pair of idle sprockets 758 are rotatably attached to the upper base end supported portion of the transverse frame 738. And also, a pair of tension sprockets 760 are rotatably attached on the periphery of the base end supported portion of a lower transverse frame 759 of the transverse frame 738. The conveying chain 752 wound on the drive sprocket 750 circulates between the working floor 42 as the rod storage place and the delivery position placed in the end portion of the transverse frame 738 through the sprockets 758, 756, and 760. Incidentally, the idle sprockets 758 are located in the loop formed by the conveying chain 752 and the tension sprockets 760 are out of the loop.

Figure 20:
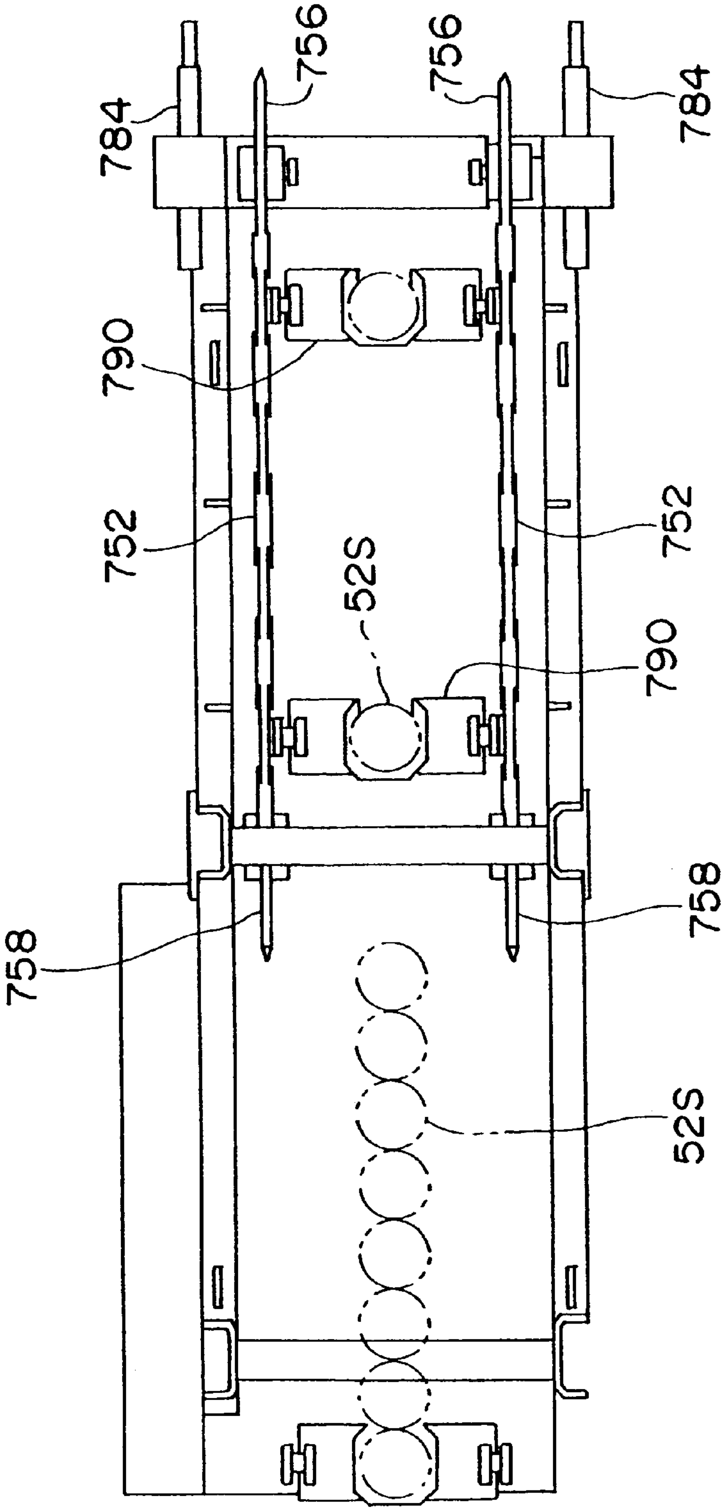
FIG. 20 is a plane view of the rod conveyor device according to the preferred embodiment.

As shown in FIG. 20, rod carrying members 790 for transferring the rods 52S are slidably bridged across a pair of the transferring chains 752 with appropriate spaces from each other along the chain 752.

As shown in FIG. 18, a point vertical member 780 composing the transverse frame 738 is detachably attached with a post 782 and is provided with a manual jack 784 on the top thereof, so that the end portion of the transverse frame 738 is extendedly fixed between a supporting floor (not shown) and the main frame 266 of the rod attaching/detaching device 68. The drive sprocket 750 and the idle sprocket 758 are located on an approximately diagonal line of the vertical direction of the conveying frame 730. Under the conveying chain 752 running between the sprockets 750 and 758, a guide rail 786 is oriented along the chain 752. The guide rail 786 prevents the conveying chain 752 from sagging when the rod 52S as a transferred object is held in the rod holding member 790 attached on the transferring chains 752. The rod holding member 790 holding the rod 52S is driven to be transferred at any time by the transferring chains 752 positioning in the upper side of FIG. 18. In other words, when the rod 52S removed from the suspending rod 52 is transferred to the working floor 42 where the rod container 54 is placed, the conveying chain 752 is driven to circulate in a counterclockwise direction of FIG. 18. On the other hand, when the rod 52S is transferred to the rod attaching/detaching device 68, the conveying chain 752 is driven to circulate in a clockwise direction of FIG. 18.

Figure 21:
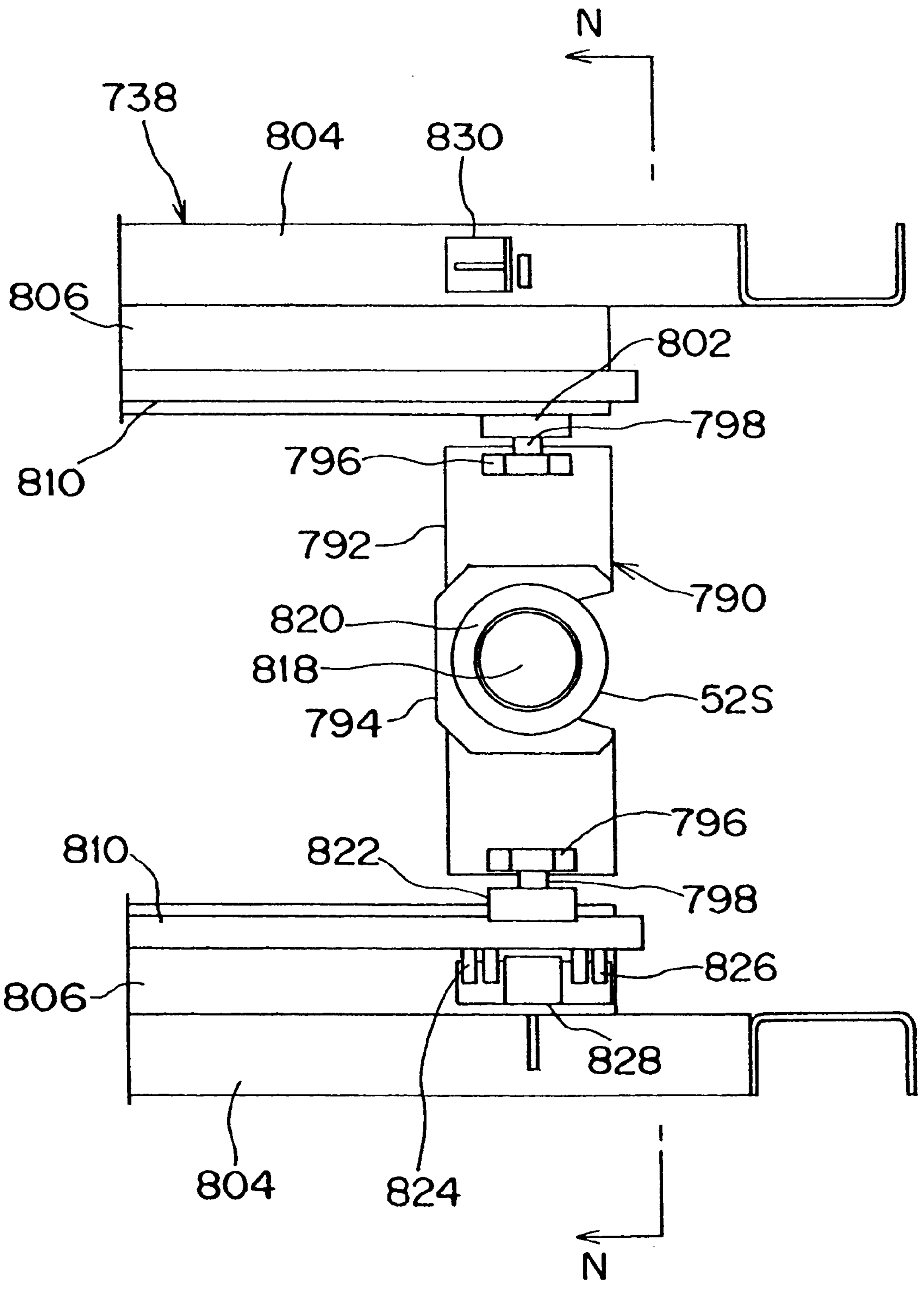
FIG. 21 is an enlarged plane view showing a delivering portion of the rod conveyor device in detail, according to the preferred embodiment.
Figure 22:
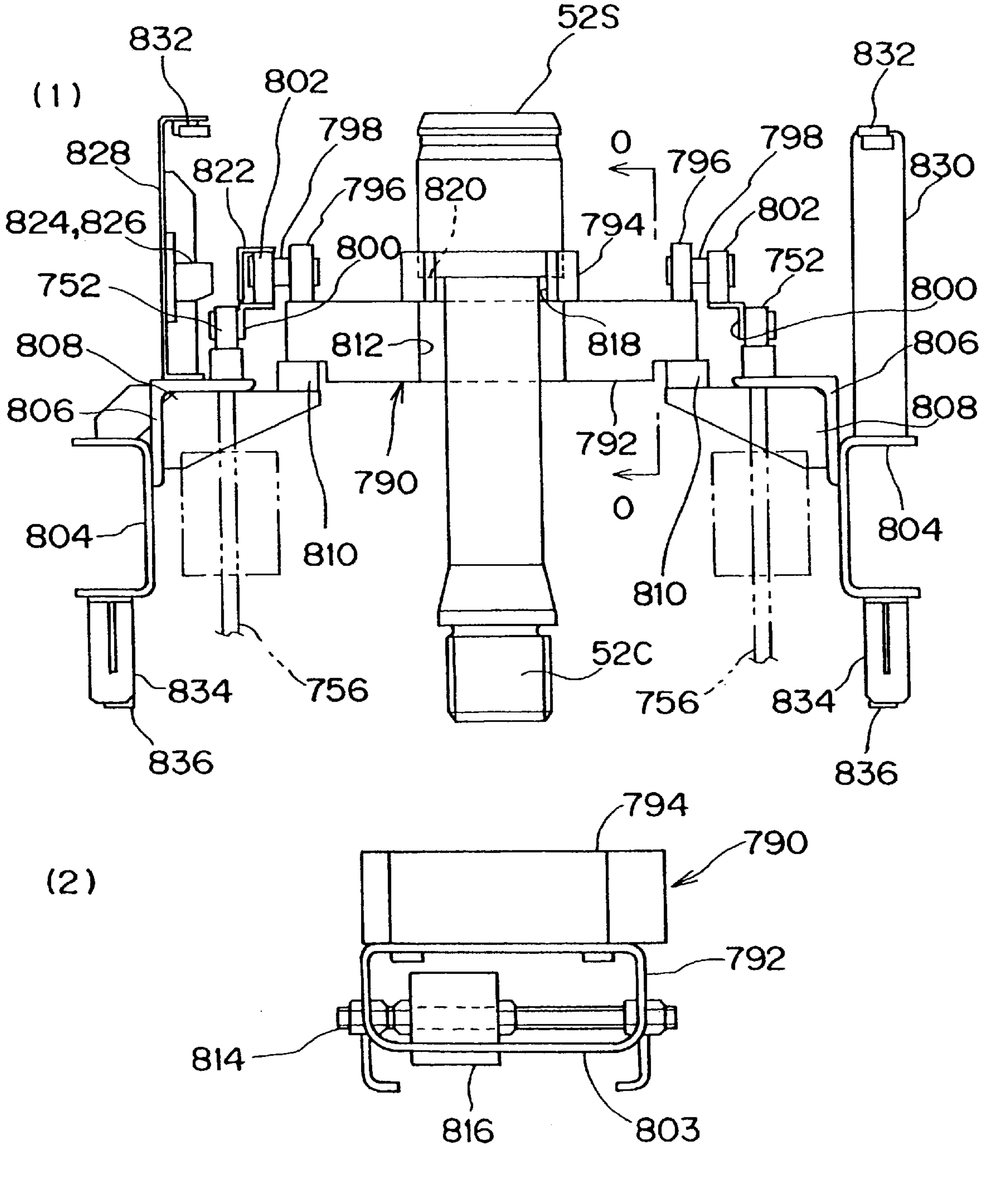
FIG. 22 are fragmentary sectional views (taken along the N—N line and the O—O line) of the rod conveyor device.

As shown in FIG. 21, the rod holding member 790 has a rod hanger 792 supported by a pair of the transferring chains 752 and a rod retaining seat 794 secured on the central upper face of the hanger 792. A bearing 796 is secured on each upper face of the ends of the rod hanger 792 to pivotally support an end of a pin 798. The other end of the pin 798 is supported in a hanger bracket 802 attached to the conveying chain 752 with a hook 800 as shown in FIG. 22(1) as a sectional view taken along the N—N line of FIG. 21. In consequence, the rod hanger 792 is slidably supported by the pin 798 via the bearing 796, so that the rod retaining seat 794 is positioned in the upper portion of the rod hanger 792 at every position on the convey route.

As shown in FIG. 22(2), both end potions of the rod hanger 792 are formed to have a vertically-flat quadrate cylinder shape, in which the side bottom portion of each end portion is a higher step than the central bottom face of each end portion. Each step bottom face 803 is in contact with an upper face of a guide plate 810 shown in FIG. 21 and FIG. 22, and is guided in the direction, in which the conveying chain 752 circulates, by the guide plate 810. Each guide plate 810 is secured on the top face of an end of a supporting member 808 horizontally provided on each opposed face of an upper transverse member 804 of the transverse frame 738 with a bracket 806. An opening 812 is formed to receive the rod 52S at the central portion of the side face of the rod hanger 792. In each side of the opening 812, a screw bolt 814 is passed and screwed in the horizontal direction. A weight 816 is screwed to the screw bolt 814 in order to adjust the balance when the rod 52S is held in the rod holding member 790. The rod retaining seat 794 has an opening 818 to receive the rod part 52A of the rod 52S at a position corresponding to the opening 812 of the rod hanger 792, and a seat 820 to place the rod head 52B of the rod 52S on the periphery of the central portion of the vertical direction of the opening 818.

On one of the hanger brackets 802 (in the left side of FIG. 22), an inverted L-shaped striker 822 is secured toward the outside. A pair of holding member sensors 824 and 826 for detecting the approach of the striker 822 moved by the conveying chain 752 are provided (see FIG. 21). The sensors 824 and 826, each having a light emitting portion and a light receiving portion, are structured with a reflection type photosensor which detects light reflected from the striker 822, and secured on a sensor bracket 828 standing up on the bracket 806. The holding member sensor 826 is positioned on the side of the sensor bracket 828 which is located nearer to the transverse frame 738 than the other side of the sensor bracket 828 on which the holding member sensor 824 is positioned, and detects that the rod 52S delivered from the rod container 54 reaches the delivery position to the attaching/detaching device 68. On the other hand, the holding member sensor 824 detects that the rod holding member 790 reaches the delivery position for receiving the rod 52S from the rod attaching/detaching device 68 when the rod 52S removed from the attaching/detaching device 68 is delivered to the rod container 54. The rod holding member 790 stops at the delivery position, whereupon another rod holding member 790 also stops at a rod removing position provided under the rod conveyor device 70.

From the sensor bracket 822 on the opposite side of the rod holding member 790, a sensor bracket 830 standing up on one of the upper transverse embers 804 is provided. In the upper portion of the sensor brackets 828 and 830, a delivery sensor 832 is attached to place a light emitting portion and a light receiving portion to confront each other, so as to detect that the rod attaching/detaching device 68 receives the rod 52S from the rod conveyor device 70. On each bottom portion of a pair of the upper transverse members 804, a sensor bracket 834 is oriented downward, and a receiving sensor 836 is provided on the lower portion of the sensor bracket 834. The receiving sensor 836 consists of a light emitting portion and a light receiving portion, in which the horizontal line created in the receiving sensor 836 is positioned to correspond to that in the delivery sensor 832. Therefore, the lower portion of the male screw part 52C of the rod 52S obstructs the light when the rod attaching/detaching device 68 places the rod 52S, removed from the suspending rod 52, on the rod holding member 790, whereby the fact that the rod 52S is placed on the rod holding member 790 is detected.

Figure 23:
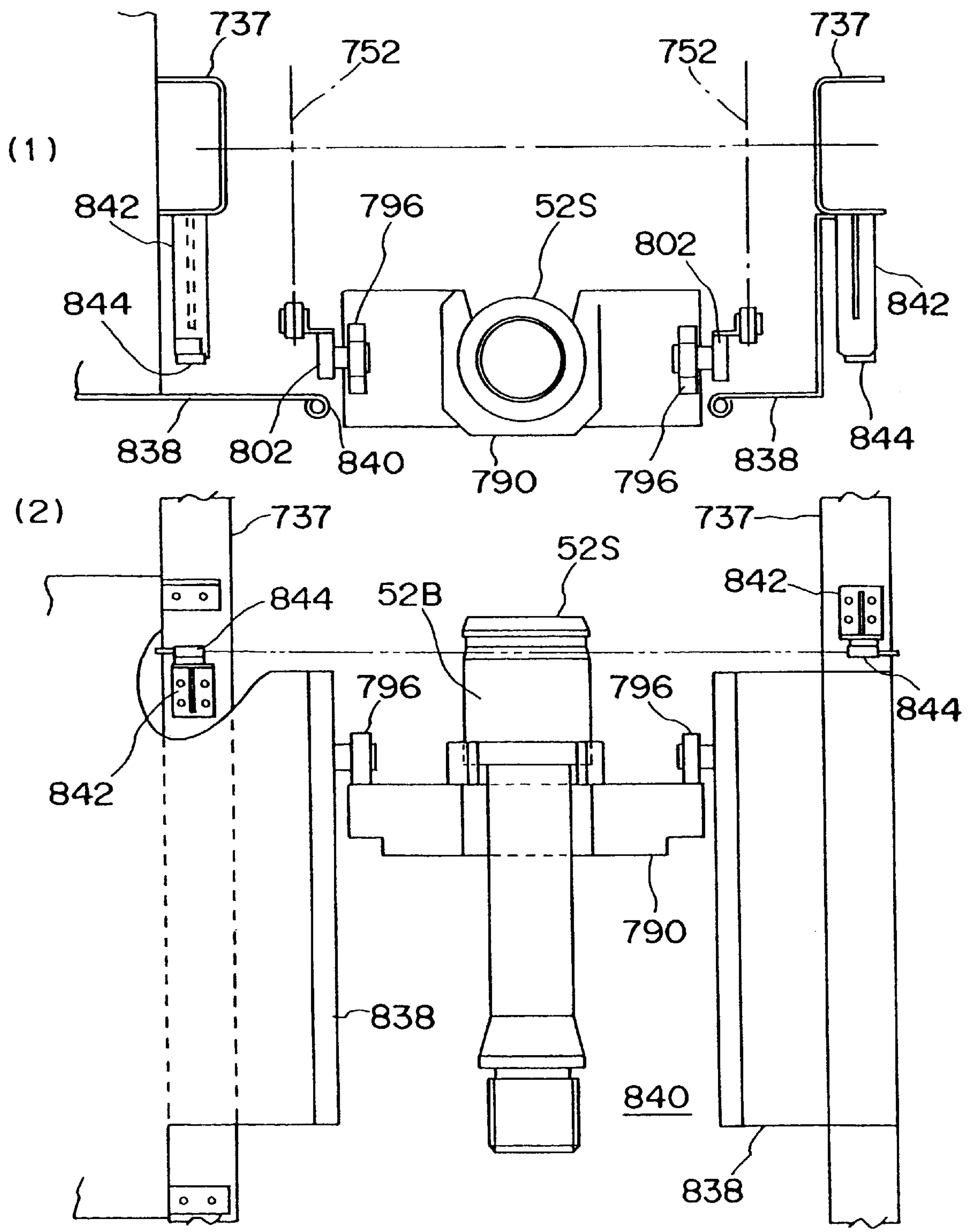
FIG. 23 are a plane view and a front view showing an attaching state of a rod detecting sensor located at a rod removing port in the rod conveyor device of the preferred embodiment.

In the lower portion of the rod conveyor device 70, a rod removing port is provided in order to remove the rod 52S from the conveyor device 70 or to furnish the rod 52S to the conveyor device 70. The rod removing port is formed, for example, in the side of the drive sprocket 750 and in the front side of the conveyor device 70 which is in the left side of FIG. 18. As shown in FIG. 23, protection covers 838 are attached to a pair of the vertical members 737, and has a gap 840 so that the rod holding member 790 moves between the protection covers 838. Above the protection covers 838 on the vertical members 737, sensor brackets 842 are provided to protrude forward. A rod detecting sensor 844 consisting of a light emitting portion and a light receiving portion is attached to the end portions of the sensor brackets 842 for detecting the rod head 52B of the rod 52S (see FIG. 23(2)), whereby it is detected that the rod 52S is delivered to the rod removing position.

Figure 24:
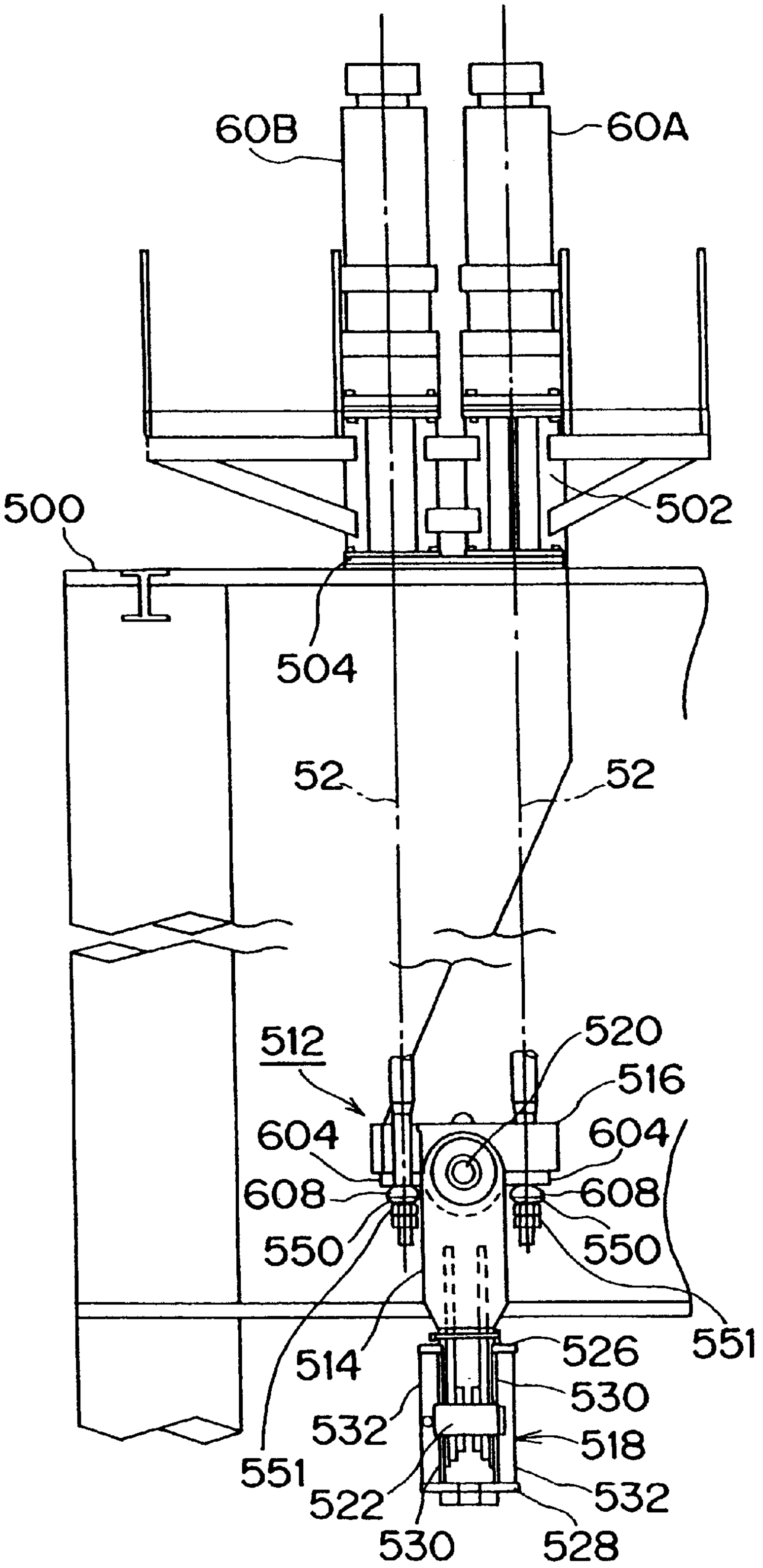
FIG. 24 is a side elevational view of a balance device supporting a lifted structure, according to the preferred embodiment of the present invention.
Figure 25:
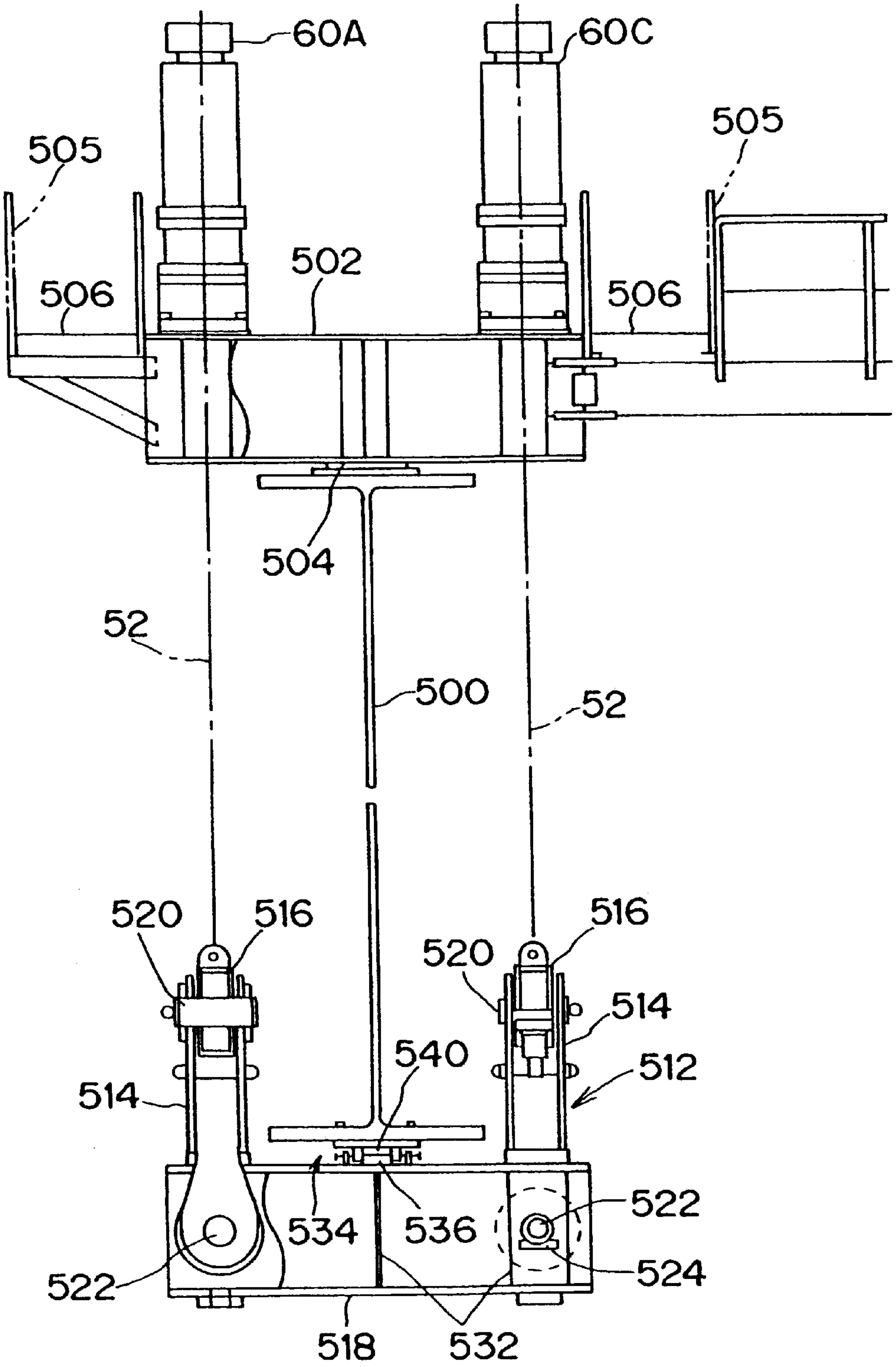
FIG. 25 is a front view of the balance device supporting the lifted structure, according to the preferred embodiment.
Figure 26:
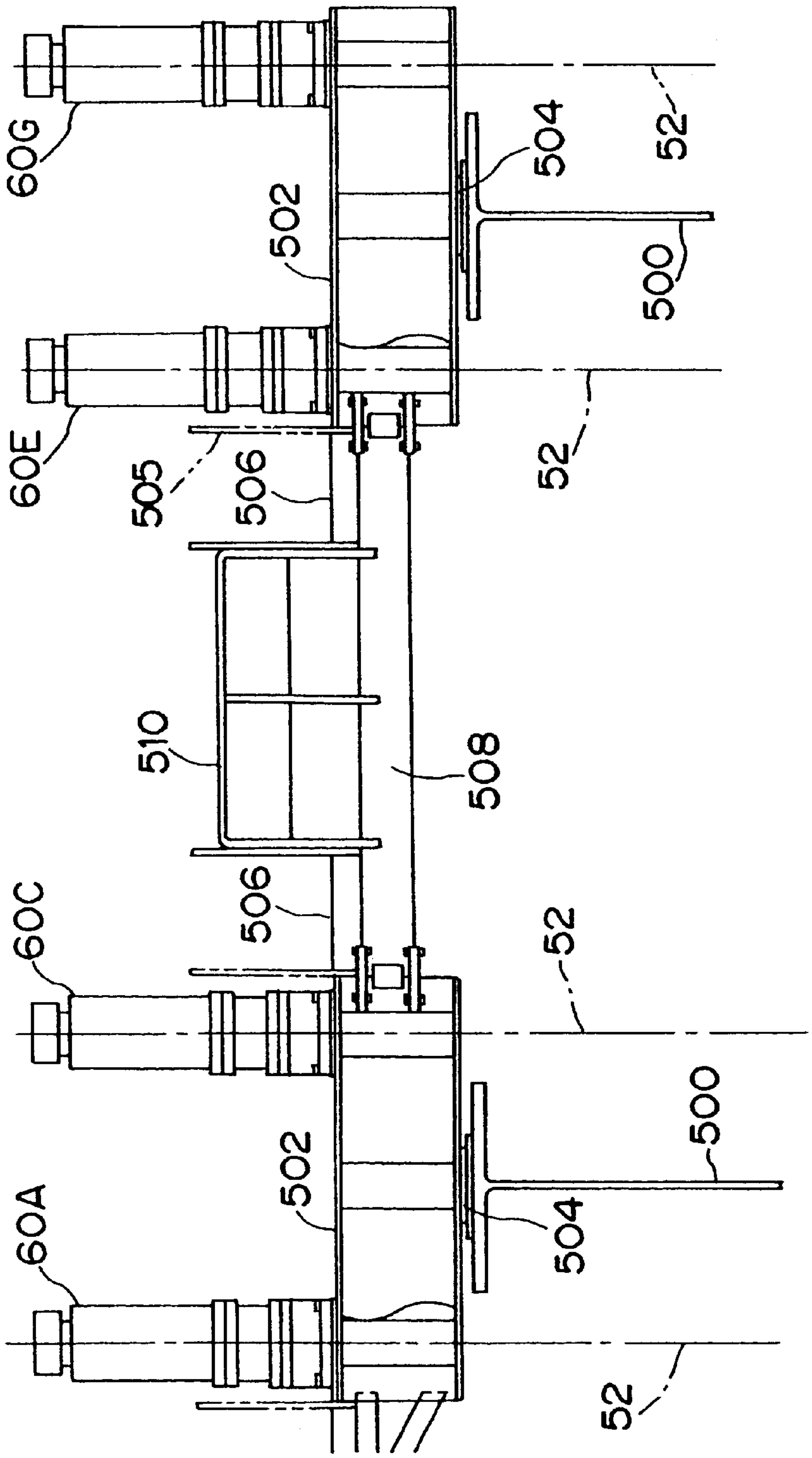
FIG. 26 is a diagram showing an arranging state of the jack for the boiler when the lifting jack apparatus is seen from the front, according to the preferred embodiment.

In the embodiment, the boiler module 56 is secured on the bottom of a girder 500 which is composed of I-steel, shown in FIG. 24 to FIG. 26, supported by a number of boiler jacks 60. As shown in FIG. 26, for example, a pair of the girders 500 is placed parallel and lifted up to a predetermined height by the boiler jacks 60 with the suspending rods 52, and then it is secured to lower faces of jack installing beams 502, as temporary beams on which the boiler jacks 60 are fixedly placed, with girder upper seats 504 while suspending the boiler module 56. Each jack installing beam 502 which is secured with the girder 500 has a working floor 506 having a hand-rail 505 at the side portion thereof. In addition, a joint floor 508 links the jack installing beam 502 secured thereunder with one of the girder 500 to the jack installing beam 502 secured thereunder with the other girder 500, so that the passage between the jack installing beams 502 can be freely carried out. A hand-rail 510 is provided on the side portion of the join floor 508 in order to prevent the workers from having a fall or the like.

When the boiler module 56 secured under the girder 500 is lifted up and down, each end of the girder 500 is supported by a balancing device 512 which is provided at the lower portion of the suspending rod 52 supported by the boiler jack 60. In the embodiment, the balancing device 512 is placed to each end portion of each girder 500, and the boiler module 56 is lifted up and down. Each balancing device 512 has an upper balance beam 516, as a pair of secondary balance beams, pivotally provided to a suspension-exchanging plate 514 and a lower balance beam 518 located under the upper balance beam 516.

The upper balance beam 516 and the lower balance beam 518 are arranged on a perpendicular line to each other. A pair of the suspension-exchanging plates 514 for supporting both ends of the lower balance beam 518 are placed in both sides of the girder 500. The lower balance beam 518 is pivotally provided to the lower portion of the suspension-exchanging plate 514 with a pin 522 and is positioned under the girder 500. A pair of the upper balance beams 516 are pivotally provided in the upper portion of the suspension-exchanging plate 514 with a pin 520 and are positioned at both sides of the girder 500. As shown in FIG. 24, both ends of the longitudinal direction of each upper balance beam 516 are swingingly supported to the lower portions of the suspending rods 52 which are located along the longitudinal direction of the girder 500 to be supported by a pair of boiler jacks 60 (e.g., the boiler jacks 60A and 60B). The pins 520 and 522, which respectively and pivotally attach the balance beams 516 and 518 to the suspension-exchanging plate 514, is prevented from sliding out of the balance beam by a key plate 524, for example, as shown in the pin 522 of FIG. 25.

As shown in FIG. 24, the lower balance beam 518 has a top plate 526, a bottom plate 528 and a pair of side plates 530 linking the top plate 526 to the bottom plate 528. The lower portion of the suspension-exchanging plate 514 is inserted between a pair of the side plates 530, and the side plates 530 and the suspension-exchanging plate 514 are coupled by the pin 522. A number of reinforcing plates 532 provided between the top plate 526 and the bottom plate 528 are placed at strategic points in the longitudinal direction of the side plates 530. On the central upper face of the lower balance beam 518, a load receiving system 534 for supporting a load of the boiler module 56 which acts through the girder 500 is provided (see FIG. 25).

Figure 27:
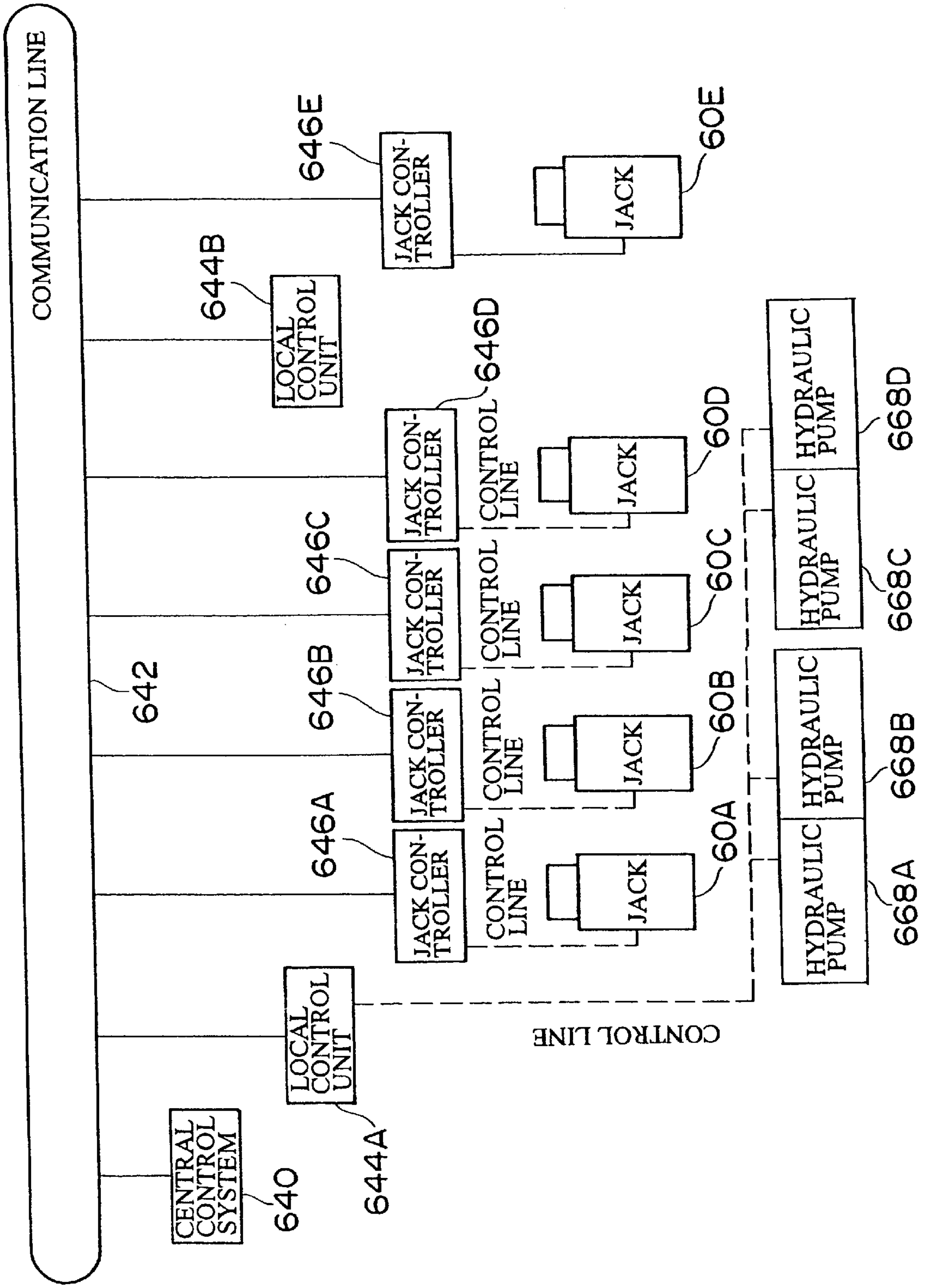
FIG. 27 is an explanatory view of a synchronism controller for the lifting jack according to the preferred embodiment.

The control panel 44 shown in FIG. 1 has a central control system 640 shown in FIG. 27. The central control system 640 connects to a number of (e.g., six) local control units 644A, 644B, . . . , through a communication line 642, and to jack controllers 646A, 646B, . . . , provided according to the boiler jacks 60A, 60B, 60C, . . . , so that a communication network is formed by the central control system 640, the local control units 644, and the jack controllers 646.

Figure 28:
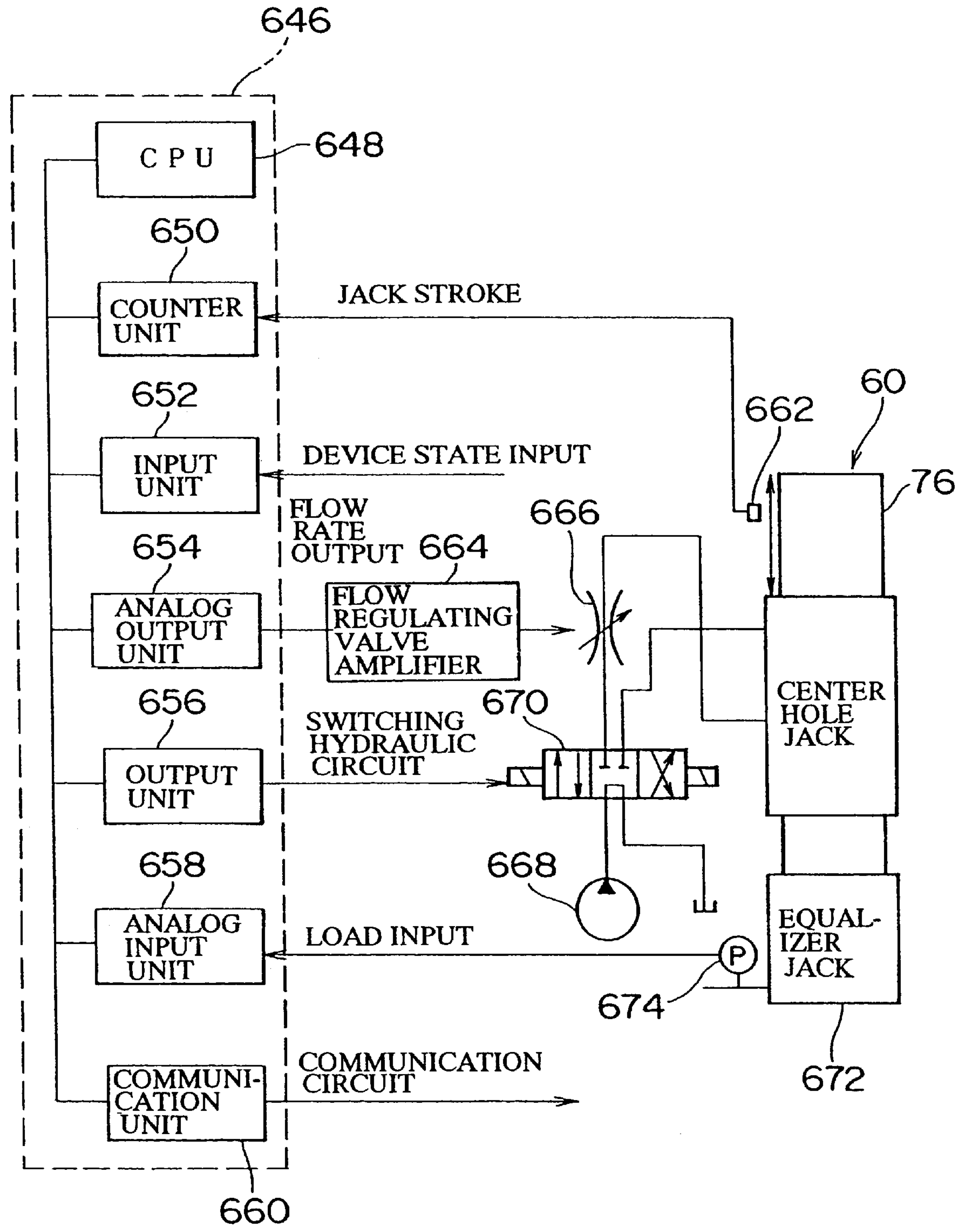
FIG. 28 is a block diagram of a jack controller of the preferred embodiment.

Each jack controller 646 provided according to the boiler jack 60 is structured, for example, as shown in FIG. 28, and has a central processing unit (CPU) 648, a counter unit 650, an input unit 652, an analog output unit 654, an output unit 656, and an analog input unit 658, and also a communication unit 660 which receives an instruction from the central control system 640 or the local control unit 644 through the communication line 642 or outputs data or the like to the control system 640 or the control unit 644 through the communication line 642.

An output pulse is inputted into the counter unit 650 from a stroke sensor 662, composed of a linear encoder or a rotary encoder and placed in the boiler jack 60, and computes the pulse which is outputted from the stroke sensor 662 by the movement of the ram 76 and outputs the obtained coefficient as a stroke value (stroke displacement) to the CPU 648. A signal showing the operating position of the boiler jack 60, a signal showing whether the boiler jack 60 operates normally or not, and so on, are inputted into the input unit 652.

The output side of the analog output unit 654 is connected to a flow controlling valve amplifier 664 through a signal line, and converts a digitized speed of the jack which is outputted from the CPU 648 into an analog signal and outputs the analog signal to the flow controlling valve amplifier 664 to control the degree of opening a flow regulating valve 666, as a flow controlling valve for adjusting the output of the boiler jack 60, through the amplifier 664. The output side of the output unit 656 is connected to the flow regulating valve 664 and a change-over valve 670 placed on the hydraulic circuit connecting the boiler jack 60 and a hydraulic pump 668, and switches the positions of the change-over valve 670 when the movement of the ram 76 of the boiler jack 60 is changed. The analog input unit 658 is connected to a pressure sensor 674 for detecting a load that acts on an equalizer jack 672 provided in the boiler jack 60. The analog input unit 658 converts an analog output from the pressure sensor 674 into a digital signal, and inputs the digital signal as the load that acts on the boiler jack 60 into the CPU 648.

In the embodiment, the local control unit 644A controls, as shown in FIG. 27, the hydraulic pumps 668A to 668D which are respectively provided according to a group of the boiler jacks 60A to 60D supporting one balancing device 512, and allows the hydraulic pumps to carry out a synchronizing control for equating the stroke displacements (the stroke values) of the boiler jacks 60A to 60D. The other local control units 644B . . . carry out the same function. The central control system 640 can perform the synchronizing control for more than five boiler jacks 60, and is connected through the communication line 642 to a control unit for the attaching/detaching device, a control unit for the conveyor device and so on to control the entire system.

Figure 29:
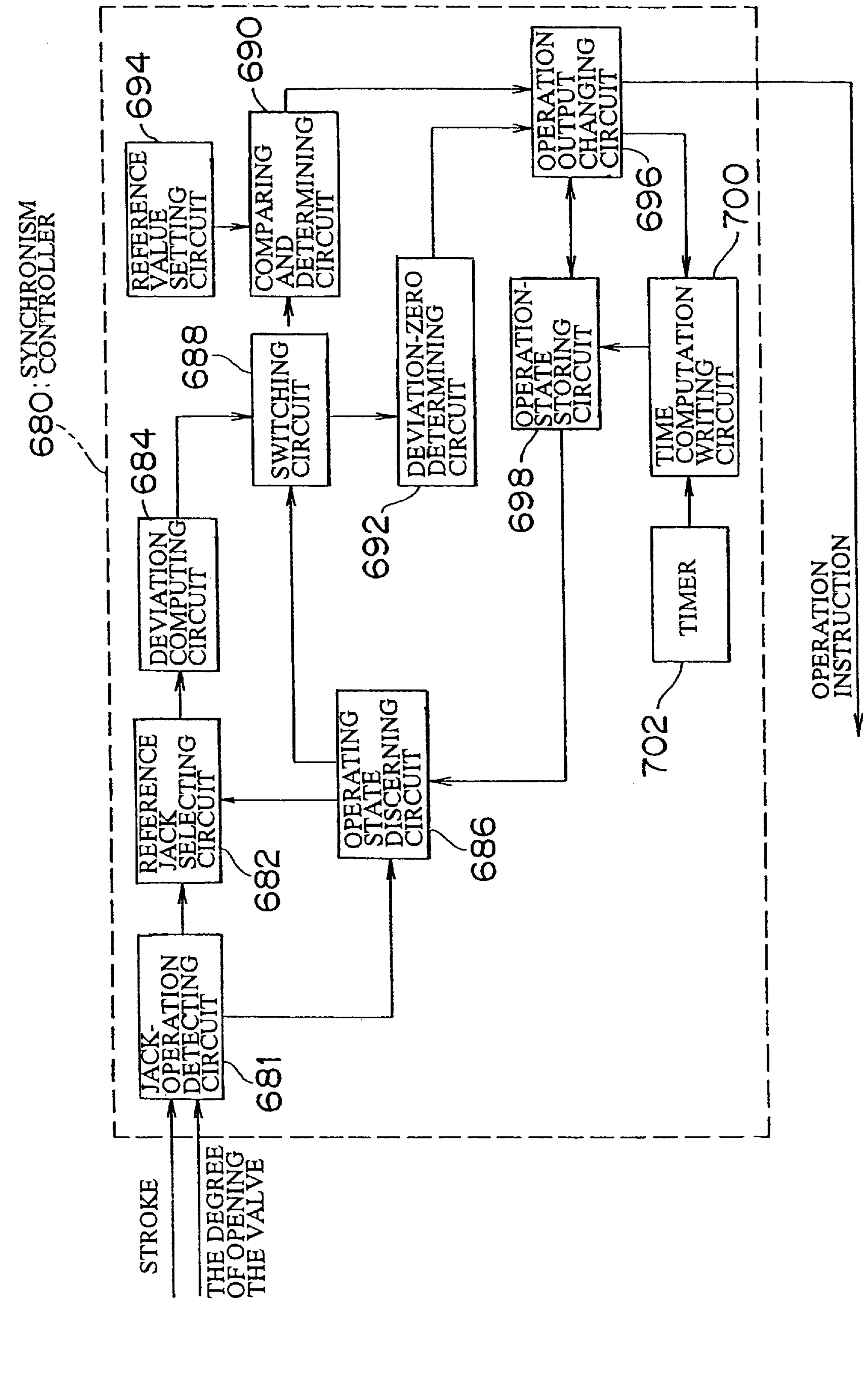
FIG. 29 is a fragmentary block diagram of the synchronism controller for the lifting jack of the preferred embodiment.

That is, the central control system 640 and each of the local control units 644 structure a controlling means for carrying out the synchronizing control for the boiler jacks 60, and have a synchronism controller 680 shown in FIG. 29. The synchronism controller 680 has a jack-operation detecting circuit 681, a reference jack selecting circuit 682 which is connected to the output side of the jack-operation detecting circuit 681, and an operating state discerning circuit 686. Into the jack-operation detecting circuit 681, the stroke displacement (the stroke value) of the ram 76 which is obtained on the basis of the output signal of the stroke sensor 662 by the jack controller 646 provided according to each of the boiler jacks 60, and also the signal of the degree of opening of the valve for determining whether the jack is operated or not, and the like, are inputted. The jack-operation detecting circuit 681 sends the jack number of the jack of which the data has been read, and the stroke data, to the reference jack selecting circuit 682, and inputs the jack number into the operating state discerning circuit 686.

The reference jack selecting circuit 682 selects the jack having the minimum displacement of stroke as a reference jack on the basis of the information from the jack-operation detecting circuit 681 and the operating state discerning circuit 686, and inputs each stroke displacement of the jacks into a deviation computing circuit 684 oriented toward the output side thereof. The deviation computing circuit 684 finds and outputs the deviation between the stroke displacement of the reference jack and the stroke displacement of the rest of the jacks. The operating state discerning circuit 686 determines whether or not the jack of the input jack number is in a rated operation or the like; switches a switching circuit 688 connected to the output side of the deviation computing circuit 684; and inputs the stroke deviation output from the deviation computing circuit 684 into a comparing and determining circuit 690 or a deviation-zero determining circuit 692.

The comparing and determining circuit 690 is connected to a reference value setting circuit 694, and sends an instruction signal to decrease the output of the jack of which the deviation exceeds a reference value, to an operation output changing circuit 696 when the deviation output from the deviation computing circuit 684 is higher than a reference value (a maximum value) evaluated in the reference value setting circuit 694. The operation output changing circuit 696 outputs a signal to decrease the degree of opening of the flow regulating valve 666 assigned to the jack which is controlled to decrease the output, to the jack controller 646 assigned with the jack which is controlled, when receiving a signal from comparing and determining circuit 690. The operation output changing circuit 696 writes the jack number of the jack, of which the operation state is changed, and the operation state on an operation-state storing circuit 698, and sends a signal to start the computing of time to a time computation writing circuit 700.

The time computation writing circuit 700 finds the time that elapsed since the signal was received from the operation output changing circuit 696, from the output of a timer 702 connected to the circuit 700, and writes the obtained time on the operation-state storing circuit 698 in correspondence to the jack number written on the operation-state storing circuit 698 by the operation output changing circuit 696. The data written on the operation-state storing circuit 698 are used for discriminating the operation state in the operating state discerning circuit 686, and are read by the operation output changing circuit 696. The operation output changing circuit 696 outputs a command signal to recover the output of the controlled jack when the deviation-zero determining circuit 692 determines that the deviation found by the deviation computing circuit 684 is zero. When the deviation is not zero, the operation output changing circuit 696 reads the time written on the operating-state storing circuit 698, and outputs the command signal to further decrease the output when the read time is longer than a predetermined time period.

Figure 30:
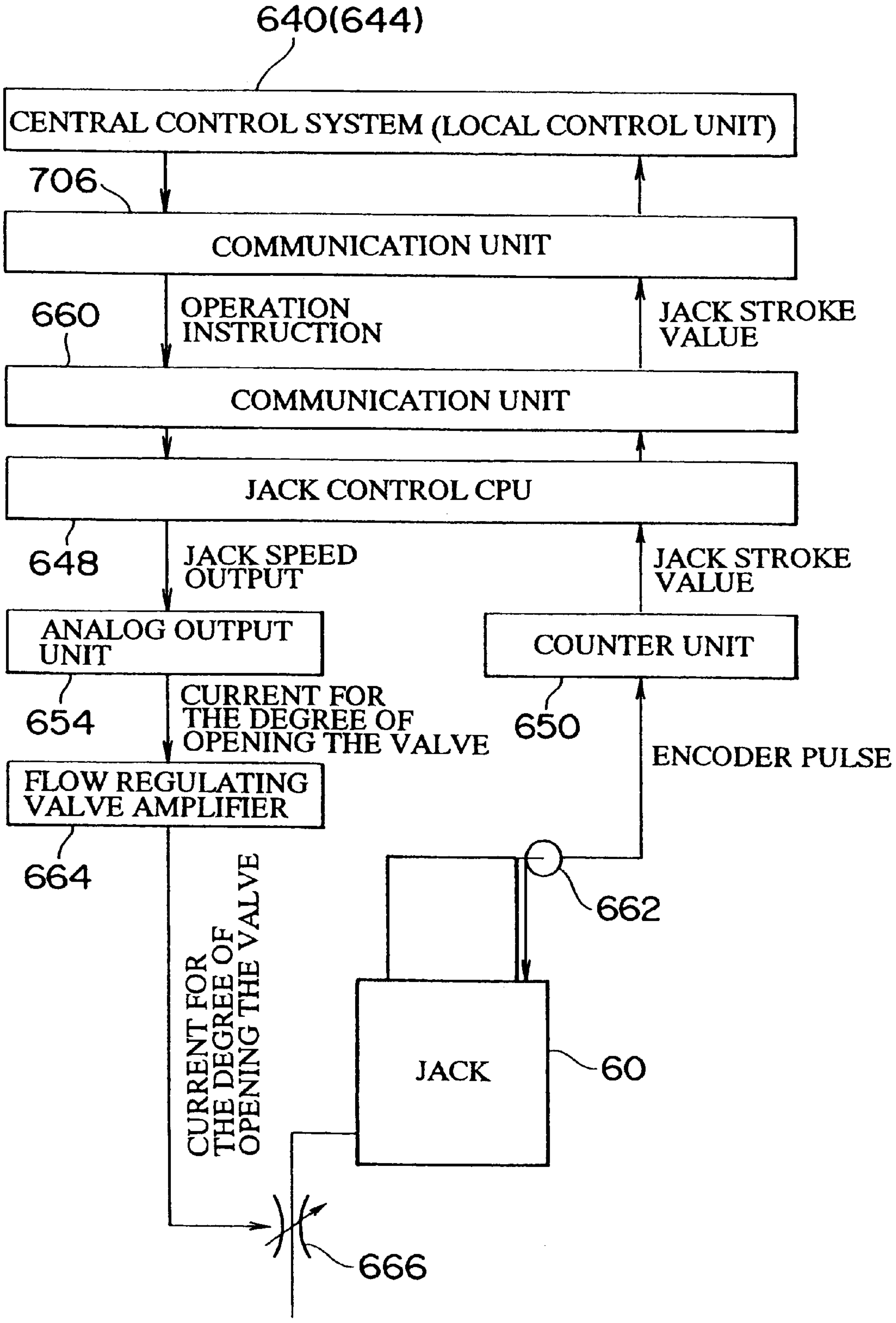
FIG. 30 is a flow chart for explaining the flow of signals of the synchronism controller for the lifting jack according to the preferred embodiment.

As shown in FIG. 30, the operation instruction signal output from the operation output changing circuit 696 is sent out through a communication unit 706 in the side of the central control system 640 (or the local control unit 644) to the communication line 642. The operation instruction signal is read by the CPU 648 of the jack controller 646 through the communication unit 660 of the jack controller 646 assigned with the jack controlled. The CPU 648 outputs a jack speed signal responding to the operation instruction to the flow controlling valve amplifier 664 through the analog output unit 654 to adjust the degree of opening of the flow regulating valve 666 in order to control the output of the boiler jack 60. A jack stroke value output from the counter unit 650 is read by the CPU 648. The CPU 648 inputs the jack stroke value through the communication unit 660, the communication line 642 and the communication unit 706 into the synchronism controller 680 of the central control system 640 and the local control unit 644.

The following is the operation of the lifting jack system, structured as described thus far, according to the embodiment.

Lifting-up of the suspending rod and Detaching of the rod

Figure 31:
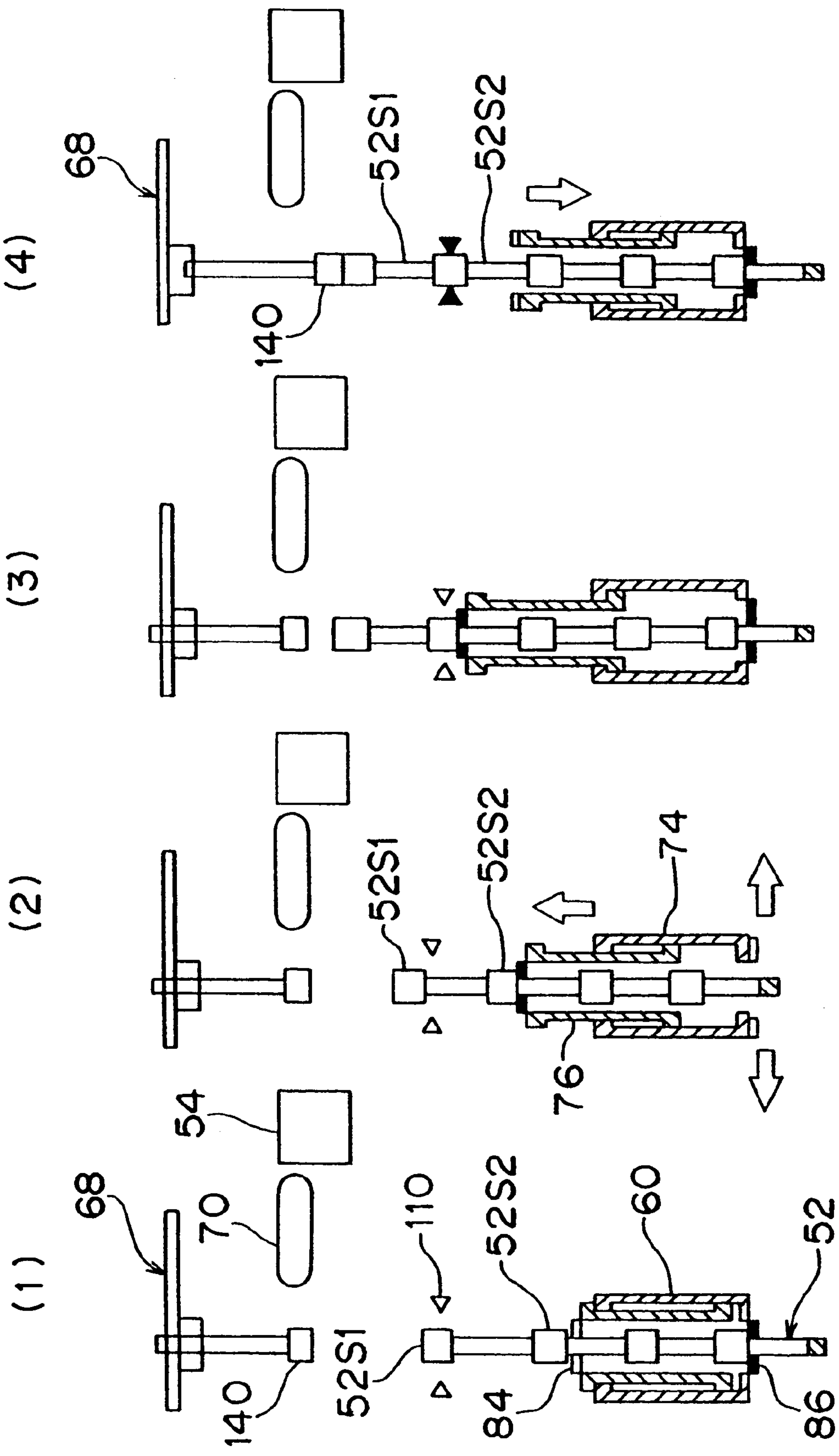
FIG. 31 are schematic views for explaining a part of processes for detaching a rod according to the preferred embodiment.

The ascending mode for lifting up the boiler module 56 will be described with reference to schematic views of FIG. 31 to FIG. 33 and flow charts of FIG. 34 and FIG. 35. As shown in FIG. 31(1), in the initial state, the lower chuck unit 86 of the boiler jack 60 is in a closing state, so that the suspending rod 52 suspending the boiler module 56 as a lifted body is supported by the lower chuck unit 86. When the boiler module 56 is lifted up, the upper chuck unit 84 is closed, and at the same time, the lower chuck unit 86 is opened, and the neck portion of the rod 52S2, located directly beneath the top rod 52S1 detached, is supported.

That is, the control unit for the attaching/detaching device (not shown) receives a start instruction for the ascending mode, whereupon the control unit operates a pair of the hydraulic cylinders 96 of the upper chuck unit 84 shown in FIG. 3 to retract the cylinder rod. Thereby, the opened chucks 90 and top plates 98 are guided by the slide guides 92 to move toward each other, so that the top plates 98 are moved in beneath the head 52B of the rod 52S2, and the closing of the chucks 90 is detected by ON of the close sensor 104. The control unit closes the chucks 90 of the upper chuck unit 84, and allows the ram 76 to move up to a position in which the top face of the top plate 98 abuts to the head 52B. After that, the control unit operates the lower chuck unit 86 to extend the cylinder rod of the hydraulic cylinder 96. Thereby, the chucks 90 and the top plates 98 of the lower chuck unit 86 are moved to be away from each other, so that the load of the suspending rod 52 shifts to the upper chuck unit 84 by opening the chucks 90 of the lower chuck unit 86. The opening of the chucks 90 of the lower chuck unit 86 is detected by OFF of the open sensor 102.

As shown in FIG. 31(2), after the load of the suspending rod 52 shifts to the upper chuck unit 84, the ram 76 is continuously driven to move up to reach the up-end, whereby the upper chuck unit 84 pushes up the larger diametrical head 52B of the chucked rod 52S2 to an operation position of the detent mechanism 110 (FIG. 31(3)). After the ram 76 reaches the up-end, the load of the suspending rod 52 is shifted to the lower chuck unit 86 by closing the lower chuck unit 86 and moving down the ram 76. The above action is checked by detecting the down-movement of the ram 76 of a little more than 10 mm. The detent mechanism 110 is actuated with the shifting of load, to control the rod 52S2 located beneath the top as shown in FIG. 31(4).

More specifically, when the head 52B of the rod 52S2 reaches the operation position of the detent mechanism 110, the control unit operates the hydraulic cylinder 114 shown in FIG. 6 to extend the cylinder rod; turns the end portions of the turnable arms 112 toward each other; stops (brakes) the rotation of the rod 52S2 to clamp the head 52B with the pressuring blocks 116 respectively located to the ends of the turnable arms 112. The rear side of the turnable arms 112 move above a clamping sensor 132, and the clamping sensor 132 changes into the ON position, whereby it is detected that the pressuring blocks 116 clamps the head 52B of the rod. Therefore, even when a number of rod coupling portions are between the lower chuck unit 86 as a load receiving part and the rod 52S2 under the braking, the rotation of the rods is obstructed at the above clamping position.

As shown in FIG. 31(4), the detaching operation for the top rod 52S1 directly on the rod 52S2 under the braking is carried out, and simultaneously, the ram 76 is moved down to return to the starting point for the next moving-up drive. The rod can be detached by hand, but, as shown in FIG. 32(1), the rod 52S1 may be rotated in a direction to release the screwing while being moved up by the aforementioned rod attaching/detaching device 68, and conveyed to the rod container 54 for storing by the conveyor device 70.

Figure 34:
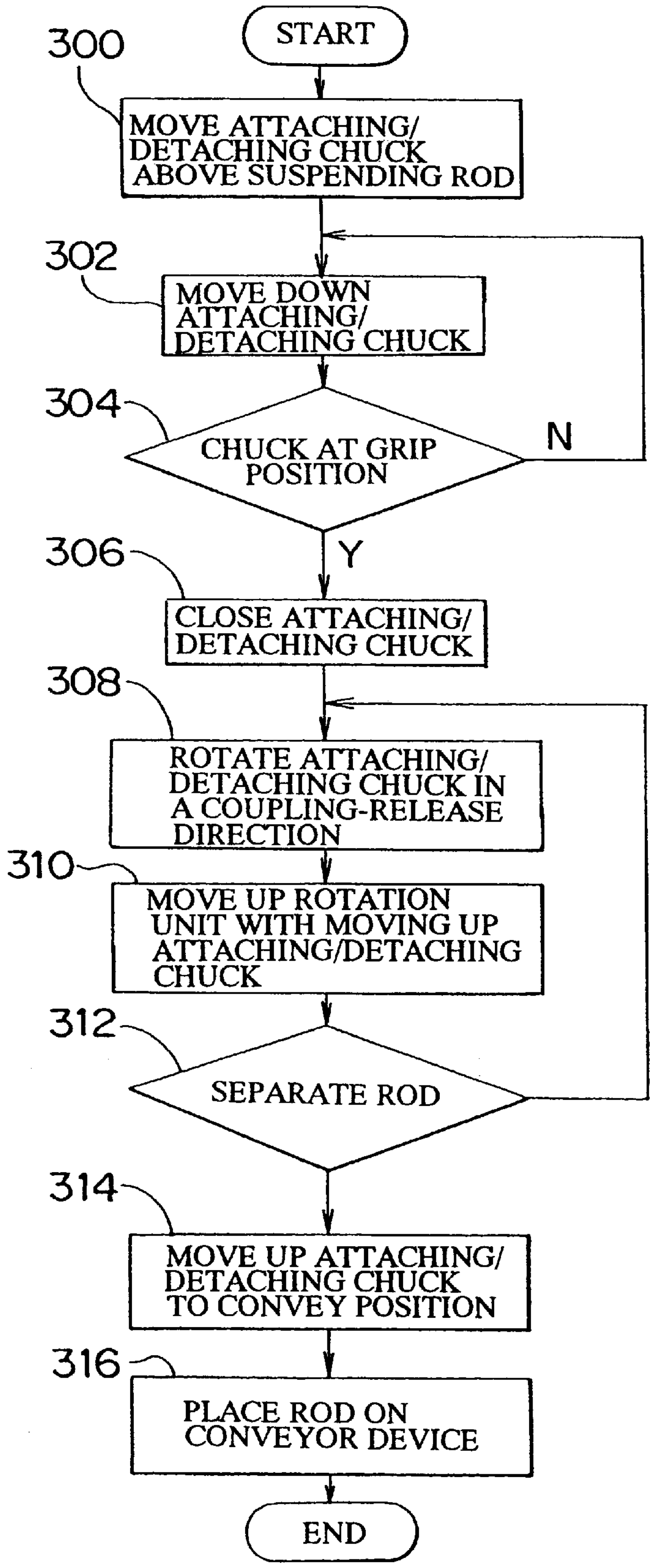
FIG. 34 is a flow chart for explaining the detaching operation of the rod by the rod attaching/detaching device according to the preferred embodiment.

More specifically, the control unit moves up the ram 76 of the boiler jack 60 while driving the transverse drive motor 268; and, as shown in Step 300 of FIG. 34, moves the attaching/detaching chuck 140 of the rod attaching/detaching device 68 to the position above the rod 52S1 to be detached. The detent mechanism 110 carries out the braking for the rod 52S2, whereupon the elevating motor 144 of the attaching/detaching device 68 is driven to move down the rotation unit 138. At this time, the control unit drives the rotating motor 142 so that one of the reference hole of home positions 194 is moved directly onto the home position detecting sensor 198. The rotation unit 138 is moved down in the guide frame 242 along the guide rail 248 by the driving of the elevating motor 144. When the attaching/detaching chuck 140 is moved down with the down-movement of the rotation unit 138 and the head 52B is moved into the three grip claws 172, the head detecting sensor 227, which is fixedly placed in the sensor mounting ring 214 provided in the lower portion of the steady guide 208 secured in the attaching/detaching chuck 140, is in the OFF position and inputs the head detecting signal into the control unit. The control unit receives the detecting signal of the head detecting sensor 227, whereupon the control unit decreases the descending speed of the attaching/detaching chuck 140. The tight sensor 230 changes into the OFF position, thereby it is determined that the attaching/detaching chuck 140 is moved down to the grip position for the rod 52S1. And the rotation unit 138 is stopped moving down (steps 302 and 304 in FIG. 34). After that, the control unit operates the pneumatic driven part 174 of the attaching/detaching chuck 140 to close the three grip claws 172 for gripping the head 52B (step 306). The grip sensor 220 placed in the upper portion of the sensor mounting ring 214 changes into the ON position, whereby the completion of the gripping process is detected. At this time, the projection 176 formed on the grip claw 172 is engaged with the groove 52E of the head 52B to prevent the rod 52S1 from dropping when the rod 52S is separated and suspended by the attaching/detaching chuck 140 (see FIG. 8).

Figure 32:
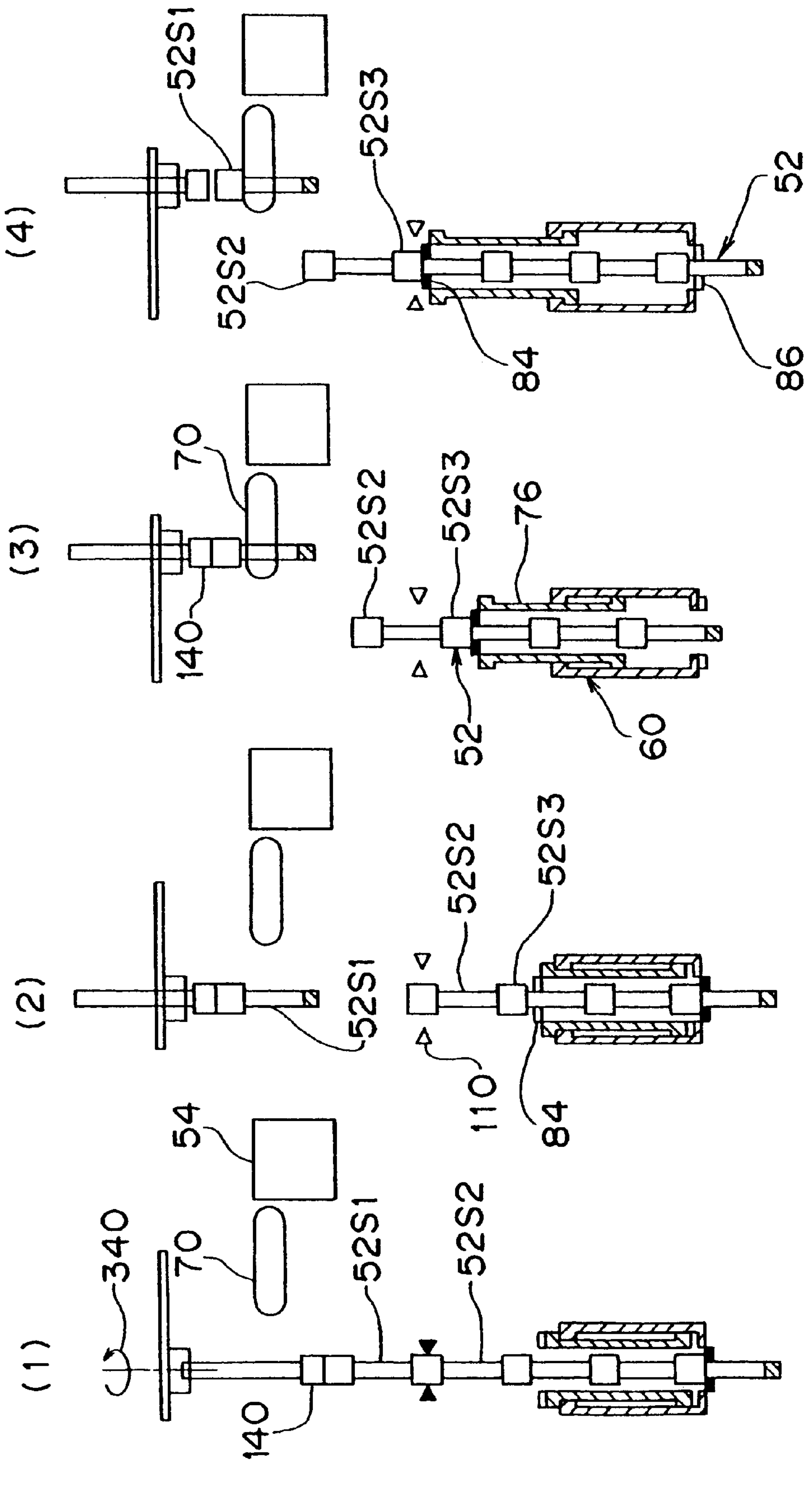
FIG. 32 are schematic views for explaining a part of the processes for detaching the rod in succession to the processes in FIG. 31.

After the completion of the gripping process of the attaching/detaching chuck 140 for the rod 52S1, as indicated with an arrow 340 in FIG. 32(1), the attaching/detaching chuck 140 is rotated in a direction to release the screwing between the top rod 52S1 and the rod 52S2 clamped by the detent mechanism 110, and simultaneously, the elevating motor 144 is rotated in reverse to synchronize with the rotation of the attaching/detaching chuck 140. That is, the rotation unit 138 is moved up at a speed corresponding to the speed at which the rod 52S1 is unscrewed (step 310). In step 12, the control unit determines whether the rod 52S1 is separated from the rod 52S2 located directly beneath the rod 52S1 or not.

More specifically, the control unit reads the output signal from the attaching/detaching sensor 124 (see FIG. 6) located on the side portion of the detent mechanism 110; watches whether the attaching/detaching sensor 124 is in the ON position or not; and determines whether the rod 52S1 is separated from the next rod 52S2. When the attaching/detaching sensor 124 is not in the ON position, the control unit returns to step 308 due to the determination that the rod 52S1 is not still separated, and repeats the processes in steps 308 and 310. When the sensors 124A to 124C are ON and also the sensor 124D is ON, it is determined that the rod 52S1 is completely separated from the next rod 52S2, so that the attaching/detaching chuck 140 is moved up to the convey position as shown in FIG. 32(2) (step 314), and then, in step 316, the detached rod 52S1 is delivered to the rod conveyor device 70 (see FIGS. 32(3) and (4)).

After the rod 52S1 is separated from the rod 52S2, the hydraulic cylinder 114 of the detent mechanism 110 is actuated, so that the cylinder rod is retracted and the turnable arm 112 is turned in a direction to release the braking, thereby the clamping and braking for the rod 52S2 is released as shown in FIG. 32(2). The rear portion of the turnable arm 112 is turnably moved above a braking release sensor 130, so that the release of the braking is detected by the braking release sensor 130. During the release of the braking by the detent mechanism 110, the upper chuck unit 84 is closed, and additionally, the load of the suspending rod 52 is shifted to the upper chuck unit 84 in the same way as described above, so that the ram 76 of the boiler jack 60 supports the suspending rod 52 through the upper chuck unit 84.

After that, the ram 76 pushes up the suspending rod 52 to move up the head 52B of the rod 52S2 to the operation position of the detent mechanism 110 (FIG. 32(4)). When the ram 76 reaches the top end, as described above, the control unit closes the lower chuck unit 86, and moves down the ram 76 slightly to shift the load of the suspending rod 52 to the lower chuck unit 86 (FIG. 33(1)). After the load of the suspending rod 52 is supported by the lower chuck unit 86, the upper chuck unit 84 is opened, and then the detent mechanism 110 is operated again to clamp the head 52B of the rod 52S in order to carry out the braking for the rod 52S3 (FIG. 33(2)).

Figure 33:
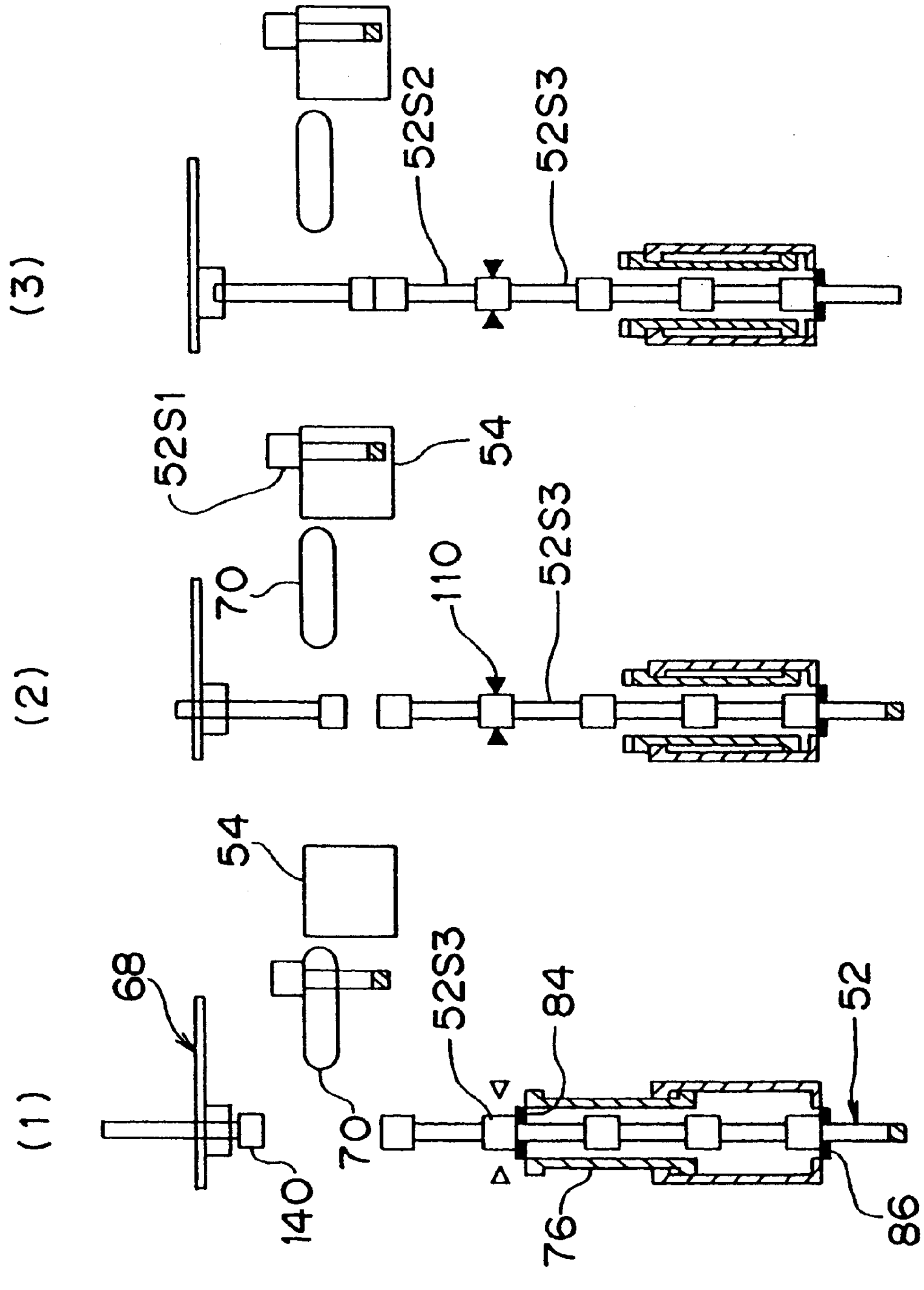
FIG. 33 are schematic views for explaining a part of theprocesses for detaching the rod in succession to the processes in FIG. 32.

On the other hand, after the rod attaching/detaching device 68 completes to deliver the rod 52S1 to the rod conveyor device 70, as shown in FIG. 33(1), the rod attaching/detaching device 68 is moved to above the next rod 52S2 for detaching the rod 52S2. The conveyor device 70 delivers the rod 51S1, received from the rod attaching/detaching device 68, to a place where the rod container 54 is located to store the rod 51S1 as shown in FIG. 33(2). In the attaching/detaching device 68, as described above, the rotation unit 138 is moved down, and the attaching/detaching chuck 140 grips the head 52B of the rod 52S2 (FIG. 33(3)). After that, the processes beyond FIG. 32(1) are repeated.

Figure 35:
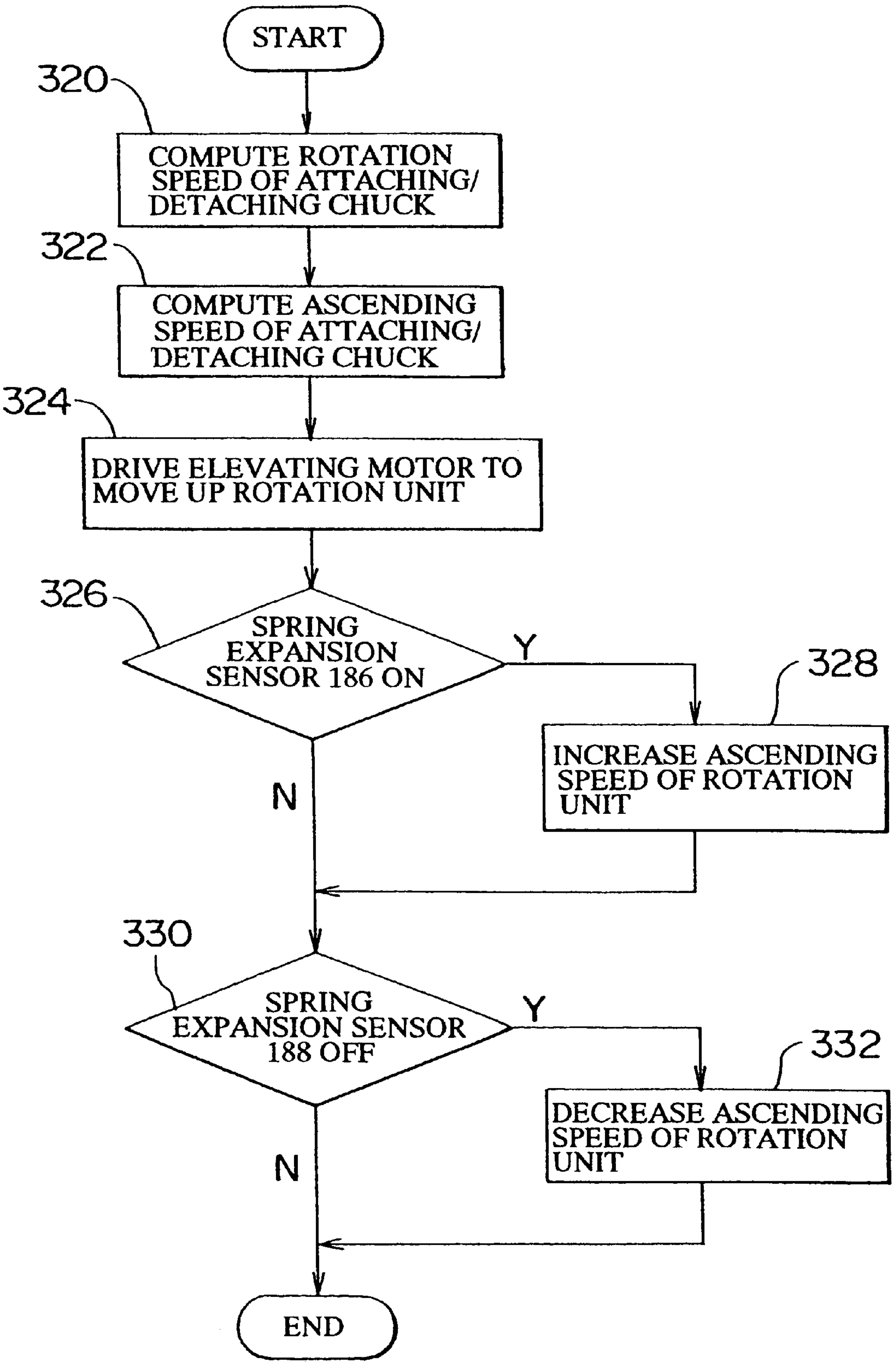
FIG. 35 is a flow chart for explaining an ascending speed control for a rotation unit by the rod attaching/detaching device according to the preferred embodiment.

The control for the ascending speed of the rotation unit 138 in step 310 of FIG. 34 is carried out as shown in FIG. 35.

As shown in step 320, the control unit reads an output signal of the rotation detecting sensor 196; obtains the rotational speed of the attaching/detaching chuck 140 (step 320); and computes the ascending speed of the attaching/detaching chuck 140 from screw pitch of the screw part formed on the rod 52S (step 322). The control unit drives the elevating motor 144 on basis of the ascending speed of the attaching/detaching chuck 140, computed above; receives a detection signal from the rotary encoder 262; and controls the rotational speed of the elevating motor 144 to move up the entire rotation unit 138 at a speed coordinating with the ascending speed of the attaching/detaching chuck 140 (step 324). At this time, the deviation between the ascending speed of the attaching/detaching chuck 140 when the rod 52S1 is rotated and detached from the rod 52S2, and the ascending speed of the rotation unit 138 by the elevating motor 144 is absorbed by the expansion and contraction of the compression spring 160 constituting a shaft direction displacement absorbing means. The control unit reads an output signal of the spring expansion sensor 186 (see FIG. 9), and determines whether the sensor 186 is in the ON position or not (step 326). When the spring expansion sensor 186 is ON, the control unit determines that the distance between the distance detecting plate 180 and the spring expansion sensor 186 is less than $d_0$, since the ascending speed of the attaching/detaching chuck 140 is higher than the ascending speed of the rotation unit 138, so that the compression spring 160 is extremely compressed. Accordingly, after the rotational speed of the elevating motor 144 is increased for a predetermined amount to increase the ascending speed of the rotation unit 138 (step 328), the control unit goes to step 330. When the spring expansion sensor 186 is not in the ON position, the control unit goes from step 326 to step 330.

In step 330, the control unit reads an output signal of the spring expansion sensor 188, and checks whether the sensor 188 is in the OFF position or not. When the spring expansion sensor 188 is OFF, the control unit determines that the distance detecting plate 180 is more than distance $d_1$+5 mm distance from the spring expansion sensor 188 since the ascending speed of the attaching/detaching chuck 140 is significantly slower than the ascending speed of the rotation unit 138, so that the compression spring 160 is stretched out. In consequence, the ascending speed of the rotation unit 138 is decreased for a predetermined amount, and then the process for speed control is completed. In step 330, when the spring expansion sensor 188 is not in the OFF position, it is determined that the ascending speed of the rotation unit 138 is within the proper range, and the process for speed control is completed and the control unit goes to step 312 in FIG. 34.

Coupling the rods and Lifting down the suspending rod

When the suspending rod 52 is lifted down while the rod 52S is coupled to the top of the suspending rod 52, the operation is carried out as follows.

Figure 36:
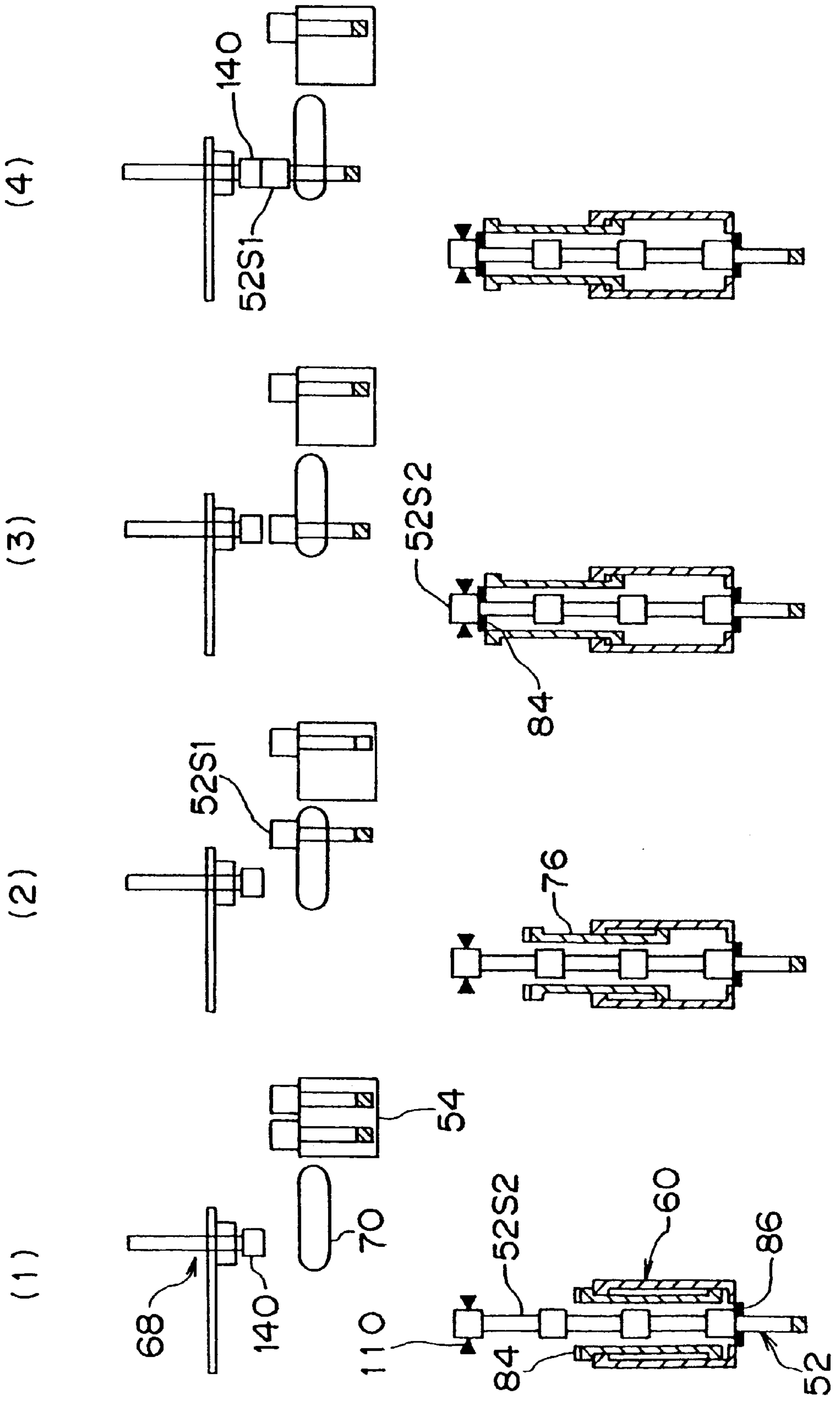
FIG. 36 are schematic views for explaining a part of processes for attaching the rods by the rod attaching/detaching device according to the preferred embodiment.

In the initial stage when the rods 52S are coupled, as shown in FIG. 36(1), the attaching/detaching chuck 140 of the rod attaching/detaching device 68 is positioned at a rod delivery position of the rod conveyor device 70. The upper chuck unit 84 is opened, and the lower chuck unit 86 is closed and supports the load of the suspending rod 52. The rod 52S2 located at the top of the suspending rod 52 is clamped at the head 52B thereof by the pressuring block 116 of the detent mechanism 110 so as to be under the braking.

Figure 39:
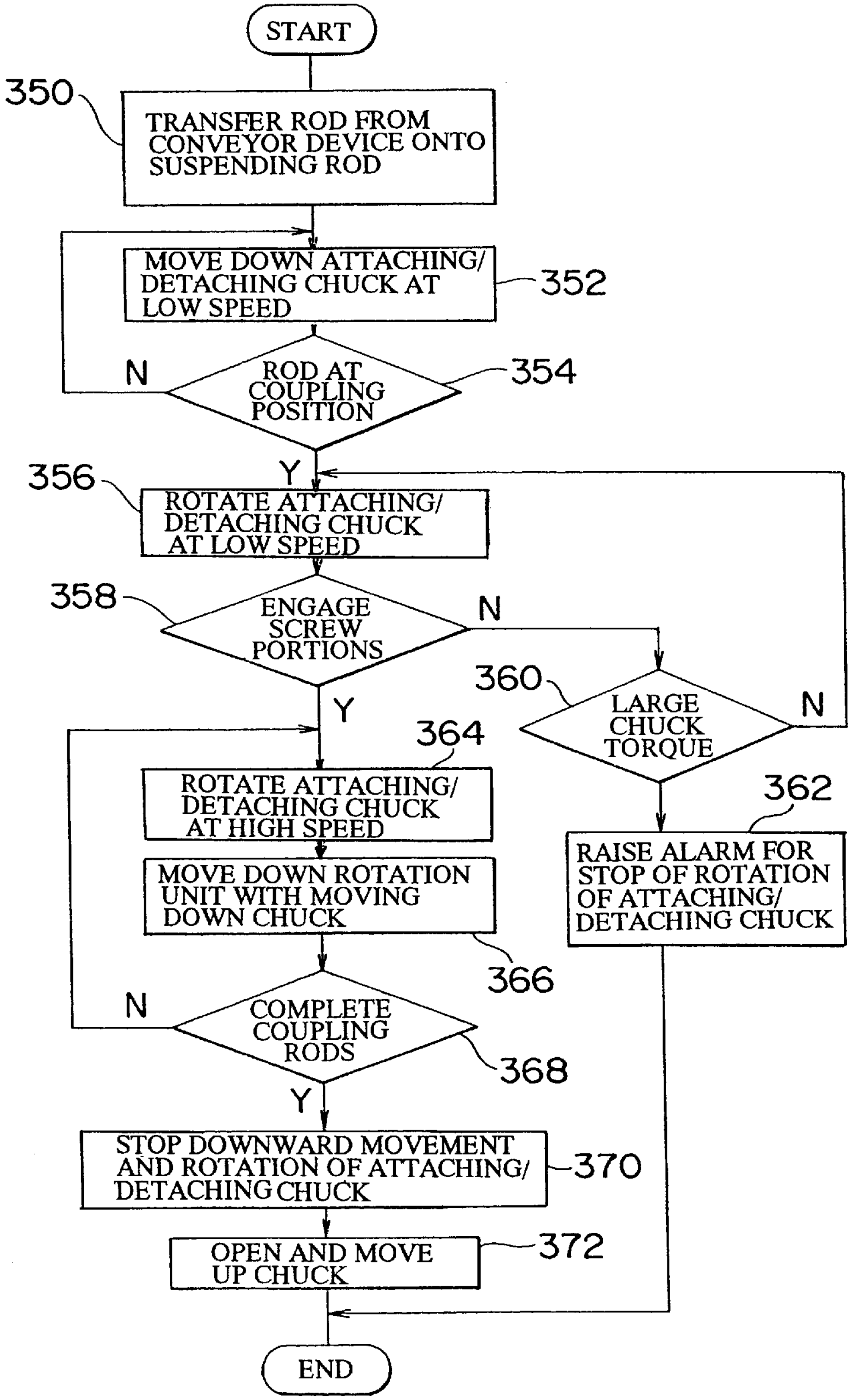
FIG. 39 is a flow chart for explaining the attaching operation of the rod by the rod attaching/detaching device according to the preferred embodiment.

In the above state, the rod 52S1 which is to be coupled onto the rod 52S2 is transferred onto the rod conveyor device 70 from the rod container 54 to be conveyed under the attaching/detaching chuck 140 (FIGS. 36(2) and (3)). The control unit moves up the ram 76 of the boiler jack 60; moves the upper chuck unit 84 to the neck portion of the rod 52S2; and closes the upper chuck unit 84 in order to be in preparation for receiving the load of the suspending rod 52. After the control unit allows the attaching/detaching chuck 140 of the attaching/detaching device 68 to grip the head 52B of the rod 52S1 (FIG. 36(4)), the control unit drives the transverse drive motor 268 to transfer the rod 52S1 to above the suspending rod 52 as shown in FIG. 37(1) (step 350 in FIG. 39).

After that the control unit drives the elevating motor 144 to move down the attaching/detaching chuck 140 through the rotation unit 138 at a low pace (step 352). As shown in FIG. 37(2), the attaching/detaching chuck 140 is moved down to until the (lower) end of the male screw part 52C of the rod 52S1, gripped by the chuck 140, confronts the female screw part 52D of the rod 52S2, and the rod 52S1 is set on the rod 52S2. That is, the control unit watches an output signal from the attaching/detaching sensor 124C. The output of the sensor 124C changes to OFF, whereby the control unit detects that the male screw part 52C of the rod 52S1 is faced to the female screw part 52D of the rod 52S2 and the rod 52S1 is moved down to the coupling position and set on the rod 52S2, and stops the downward movement of the rotation unit 138 (step 354).

Figure 37:
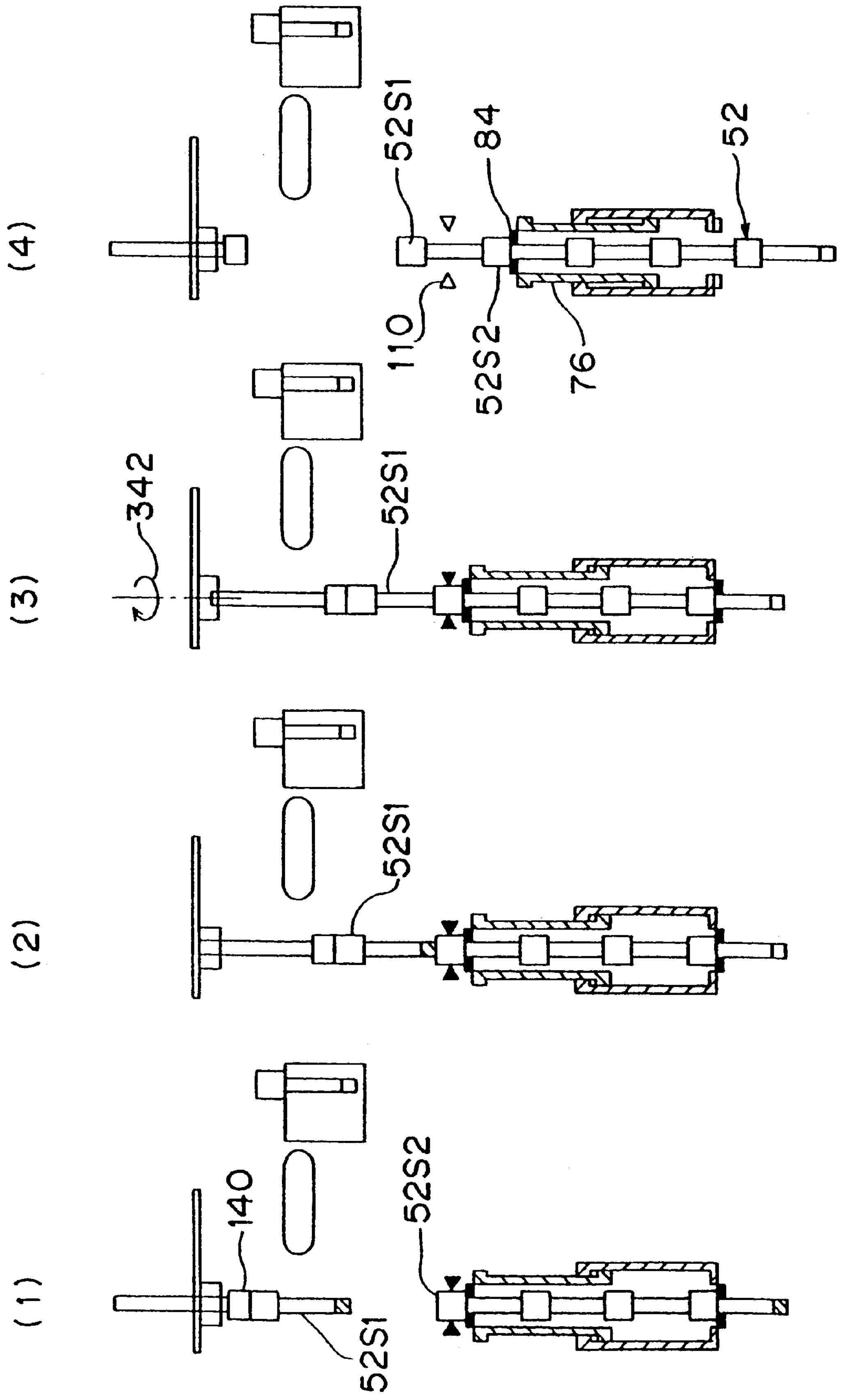
FIG. 37 are schematic views for explaining a part of the processes for attaching the rods in succession to the processes in FIG. 36.

Next, while the downward movement of the rotation unit 138 is stopped, as indicated with an arrow 342 of FIG. 37(3), the control unit rotates the rotating motor 142 in a direction to screw the rods 52S1 and 52S2 to each other at a low speed (e.g., 50 rpm when screw pitch is 12 mm) to rotate the attaching/detaching chuck 140 one turn (step 356). The control unit finds load torque of the rotating motor 142 from a drive current of the rotating motor 142; watches an output signal of the spring expansion sensor 188; and determines whether the screw parts of both of the rods 52S1 and 52S2 are engaged with each other or not (step 358).

More specifically, the rod 52S1 screws downward as the screw part of the rod 52S2 is being engaged. Therefore, the attaching/detaching chuck 140 has a displacement in the shaft direction with the movement of the rod 52S1, and is being moved down while stretching out the compression spring 160 through the slide shaft 156. In consequence, the distance detecting plate 180 secured to the slide shaft 156 is moved together with the slide shaft 156, and the output of the spring expansion sensor 188 changes to OFF when the distance between the spring expansion sensor 188 and the distance detecting plate 180 exceeds the $d_1$+5 mm. The expansion sensor 188 changes into the OFF position, whereby the control unit determines that the screw parts of both of the rods 52S1 and 52S2 are engaged (screwed) with each other. Since the rods 52S1 and 52S2 are moved down in the state that the rod 52S1 is pulled upward by the compression spring 160, both of the screw parts of the rods are screwed with each other by using back-lash of the screw faces.

When the control unit determines that the screw parts of both of the rods are not engaged, the control unit goes to step 360 to detect whether the obtained load torque of the rotating motor 142 is less than a predetermined value or not. When the torque is less than the predetermined value, returning to step 356, the attaching/detaching chuck 140 is continued to be rotated at a low speed. In step 360, when the load torque of the rotating motor 142 is more than the predetermined value, the control unit determines that the screw parts of both the rods 52S1 and 52S2 are not engaged and drag is occurring, and stops the drive of the rotating motor 142, and alerts an operator to the irregularity by an alarm (step 362).

It should be mentioned that even when the rod 52S1 is set on the rod 52S2 with its axis being slightly deviated, the attaching/detaching chuck 140 is supported in an oscillating state by the spring coupling 170, so that the deviation of the rotation shaft is absorbed by the spring coupling 170, thereby the screw parts of the rods 52S1 and 52S2 can be smoothly engaged. Where both axes of the rods 52S1 and 52S2 are deviating from each other when the rod 52S1 is set on the rod 52S2, both axes can be easily aligned by slowly rotating the rod 52S1 (the attaching/detaching chuck 140). More specifically, an end of a screw has a taper shape for smooth engagement. Therefore, the attaching/detaching chuck 140 gripping the rod 52S1 is supported in an oscillating state by the spring coupling 170, so that when the attaching/detaching chuck 140 is rotated at a slow speed, a lower taper face of the male screw part of the rod 52S1 is slipped into a upper taper face of the female screw part of the rod 52S2, thereby both of the axes are naturally aligned.

Confirming that the screw parts of the rods 52S1 and 52S2 are engaged with each other in step 358, the control unit rotates the attaching/detaching chuck 140 at a predetermined speed in a direction of screwing (step 364). The elevating motor 144 is driven in correspondence to the descending speed of the attaching/detaching chuck 140 by screwing the rod 52S1 downward, and the descending speed of the rotation unit 138 is controlled (step 366). Whether or not the rods 52S1 and 52S2 are completely coupled to each other is determined (step 368).

Where screw pitch is, for example, 12 mm, the rotational speed of the attaching/detaching chuck 140 has a speed at which the descending speed of the attaching/detaching chuck 140 is approximately 600 mm/min. Whether the rods are completely coupled or not is determined, when the attaching/detaching sensors 124A and 124C (see FIG. 6) are in the OFF position and the load torque of the rotating motor 142 exceeding a set value is detected. In the embodiment, the coupling state is detected by two sensors 124A and 124C, so that even when any one of the sensors 124A and 124C is in the OFF position by reason of vibration, oscillation or the like, the completion of the coupling is not determined, resulting in the improved reliability of the apparatus.

In step 368, when the coupling of the rods 52S1 and 52S2 is not completed, the control unit returns to step 364 to control the rotation and the downward movement of the attaching/detaching chuck 140. When the coupling is completed, the control unit goes to step 370 to stop the rotation of the attaching/detaching chuck 140 and the downward movement of the rotating unit 138. After that, as shown in FIG. 37(4), the control unit opens the attaching/detaching chuck 140, and moves up the chuck 140 to the convey position for the rod 52S (step 372), and then the coupling control for the rod 52S is completed.

Figure 40:
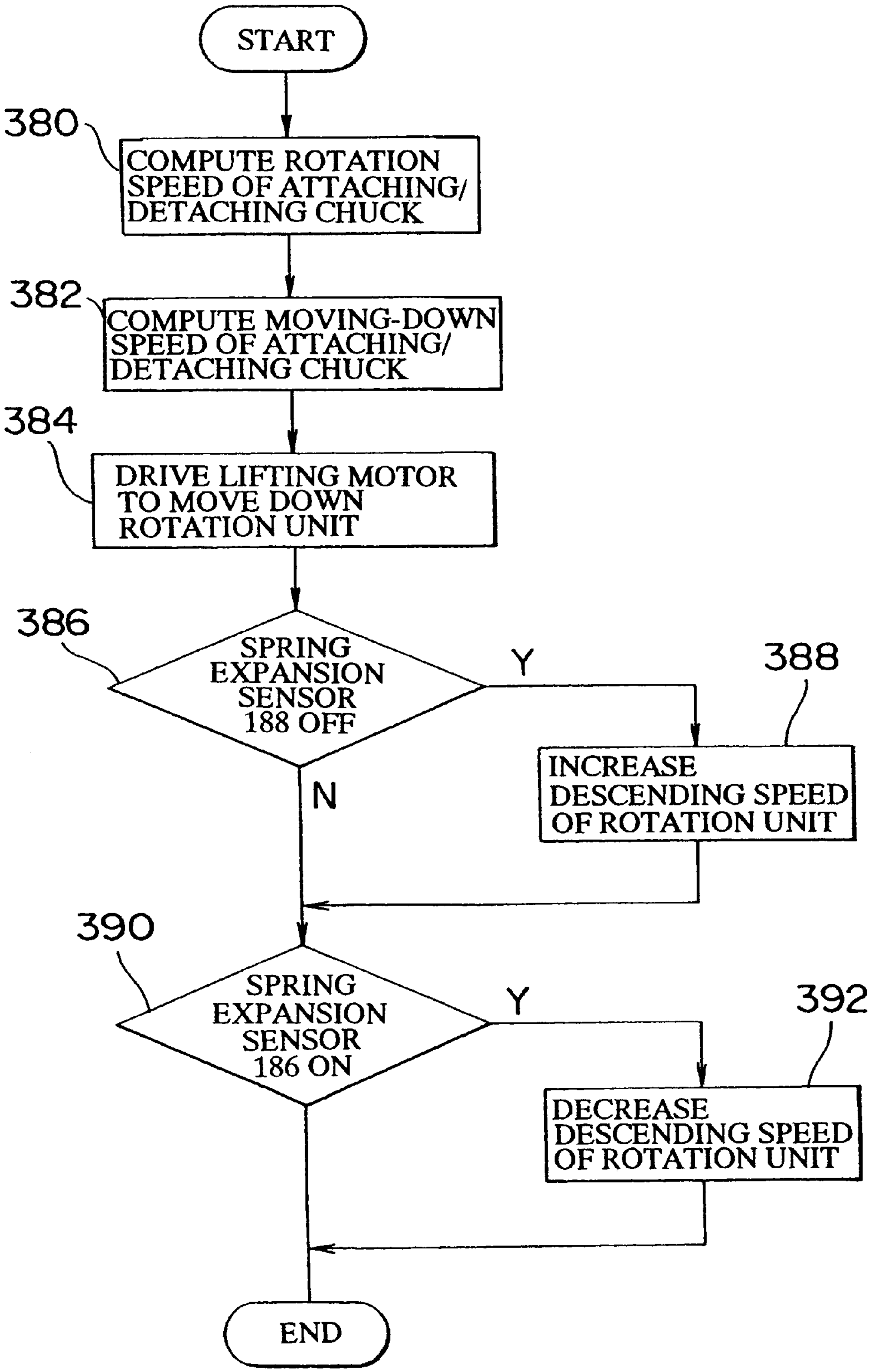
FIG. 40 is a flow chart for explaining a descending speed control of the rotation unit by the rod attaching/detaching device according to the preferred embodiment.

The control for the descending speed of the rotation unit 138 in the coupling of the rods is carried out as shown in FIG. 40. The control unit computes the rotational speed of the attaching/detaching chuck 140 from an output signal form the rotation detecting sensor 196, and computes the descending speed of the attaching/detaching chuck 140 (steps 380 and 382). The control unit drives the elevating motor 144 to move down the rotation unit 138 at a speed commensurate with the descending speed of the attaching/detaching chuck 140. At this time, the control unit watches the output signals from the spring expansion sensors 188 and 186 (see FIG. 9), and controls the descending speed of the rotation unit 138 and the descending speed of the attaching/detaching speed not to differ from each other.

More specifically, as shown in step 386, the control unit checks whether the spring expansion sensor 188 is in the OFF position or not. When the spring expansion sensor 188 is OFF, it is determined that the descending speed of the rotation unit 138 is slower than the descending speed of the attaching/detaching chuck 140, and the compression spring 160 is stretched out. The control unit increases the rotational speed of the elevating motor 144 for a predetermined amount to increase the descending speed of the rotation unit 138 as shown in step 388, and goes to step 390. When it is determined that the spring expansion sensor 188 is not OFF in step 386, the control unit goes to step 390 to check whether the spring expansion sensor 186 is ON or not. When the spring expansion sensor 186 is ON, it is determined that the descending speed of the rotation unit 138 is higher than the descending speed of the attaching/detaching chuck 140, so that the descending speed of the rotation unit 138 is decreased for a predetermined amount (step 392), and the processes for controlling the descending speed is completed. When the spring expansion sensor 186 is not ON in step 390, the control unit determines that the descending speed of the rotation unit 138 is normal, and completes the processes.

The control unit opens and moves up the attaching/detaching chuck 140 to the predetermined position after the coupling of the rod 52S1, and opens the lower chuck unit 86 and shifts the load of the suspending rod 52 to the upper lower chuck unit 84. After that, the control unit activates the hydraulic cylinder 114 of the detent mechanism 110 for releasing the braking applied to the rod 52S2, and moves down the ram 76 of the boiler jack 60 to lift down the suspending rod 52. When the suspending rod 52 is lifted down to a position which the head 52B of the rod 52S1 reaches in the vicinity of the braking position of the detent mechanism 110, the lower chuck unit 86 is closed and the load of the suspending rod 52 is shifted to the lower chuck unit 86. After the shifting of the load of the suspending rod 52, the ram 76 is moved up again (FIGS. 38(1) to (3)).

Figure 38:
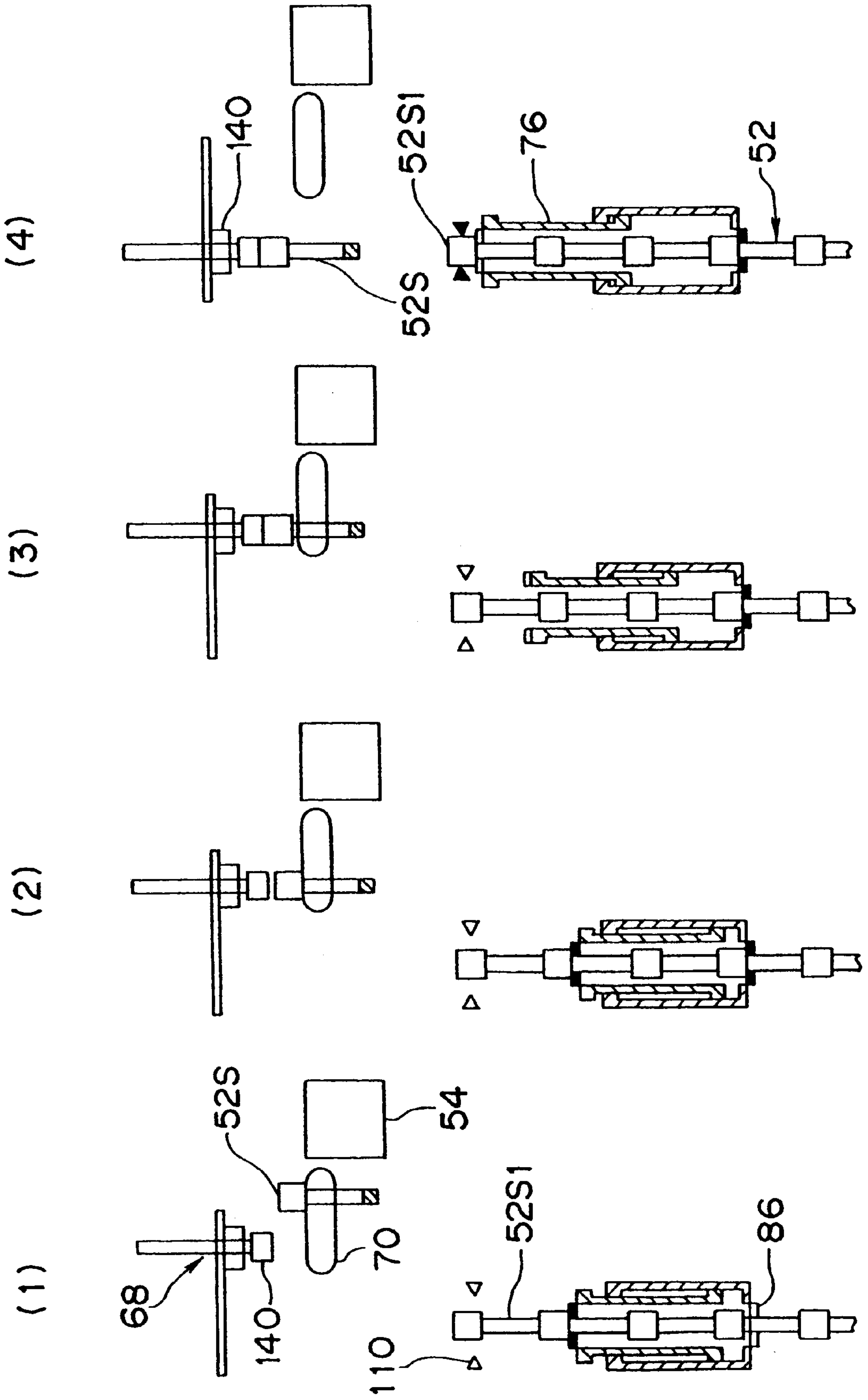
FIG. 38 are schematic views for explaining a part of the processes for attaching the rods in succession to the processes in FIG. 37.

The rod attaching/detaching device 68 is moved to above of the rod conveyor device 70 in order to receive the next rod 52S to be coupled (FIG. 38(1)). The rod conveyor device 70 receives the next rod 52S to be coupled from the rod container 54, and conveys the received rod 52S to the lower portion of the rod attaching/detaching device 68. The conveyed rod 52S is gripped by the attached/detached device 68 and transferred above the suspending rod 52 to be coupled with the conveyed rod 52S (FIG. 38(4)). Simultaneously, the upper chuck unit 84 is moved up to the support position for the rod 52S1 by the ram 76 and closed. After that, the processes beyond FIG. 37(2) are repeated.

Figure 41:
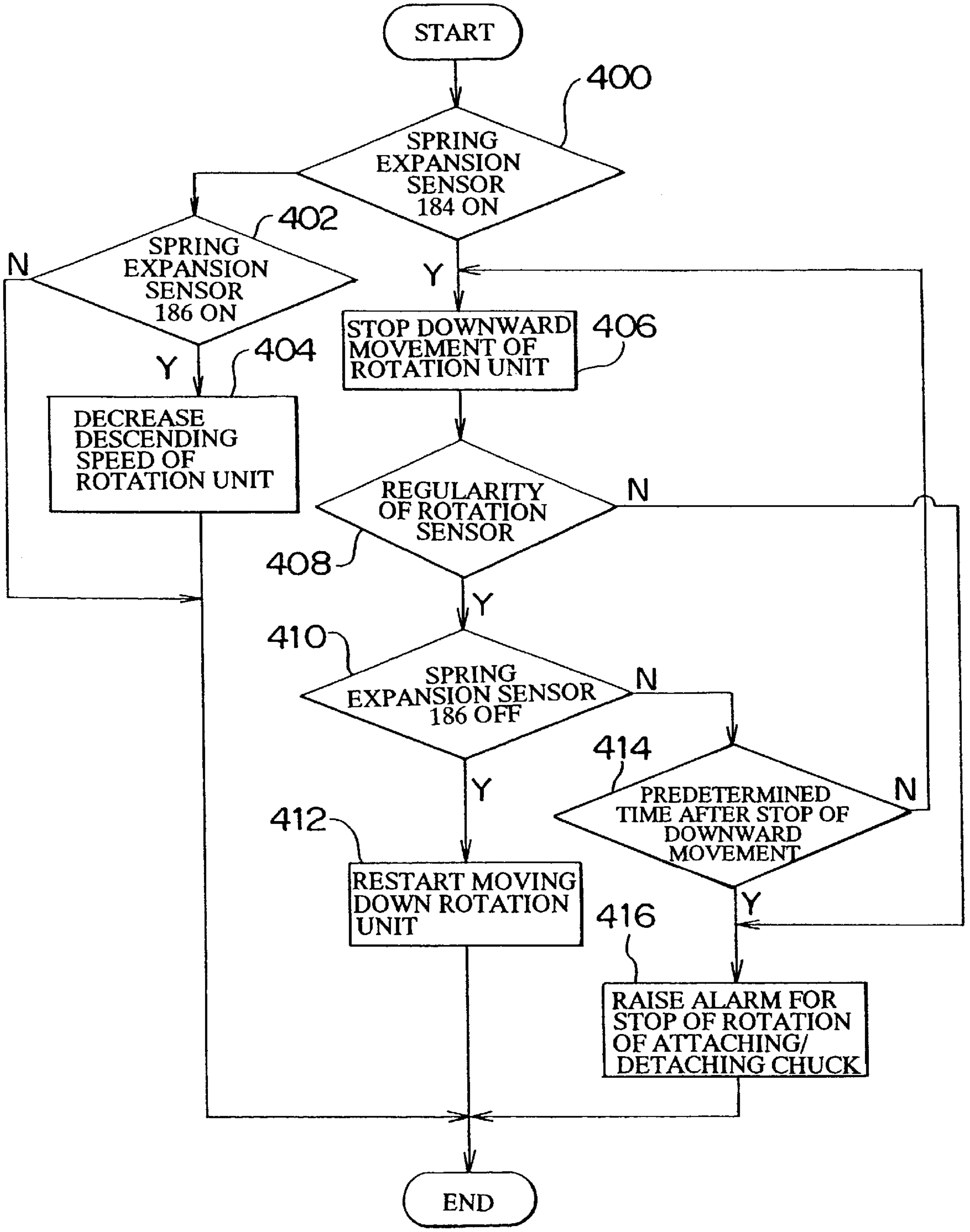
FIG. 41 is a flow chart for explaining an upper-limit position control of a chuck in the attaching state of the rods by the rod attaching/detaching device according to the preferred embodiment.
Figure 42:
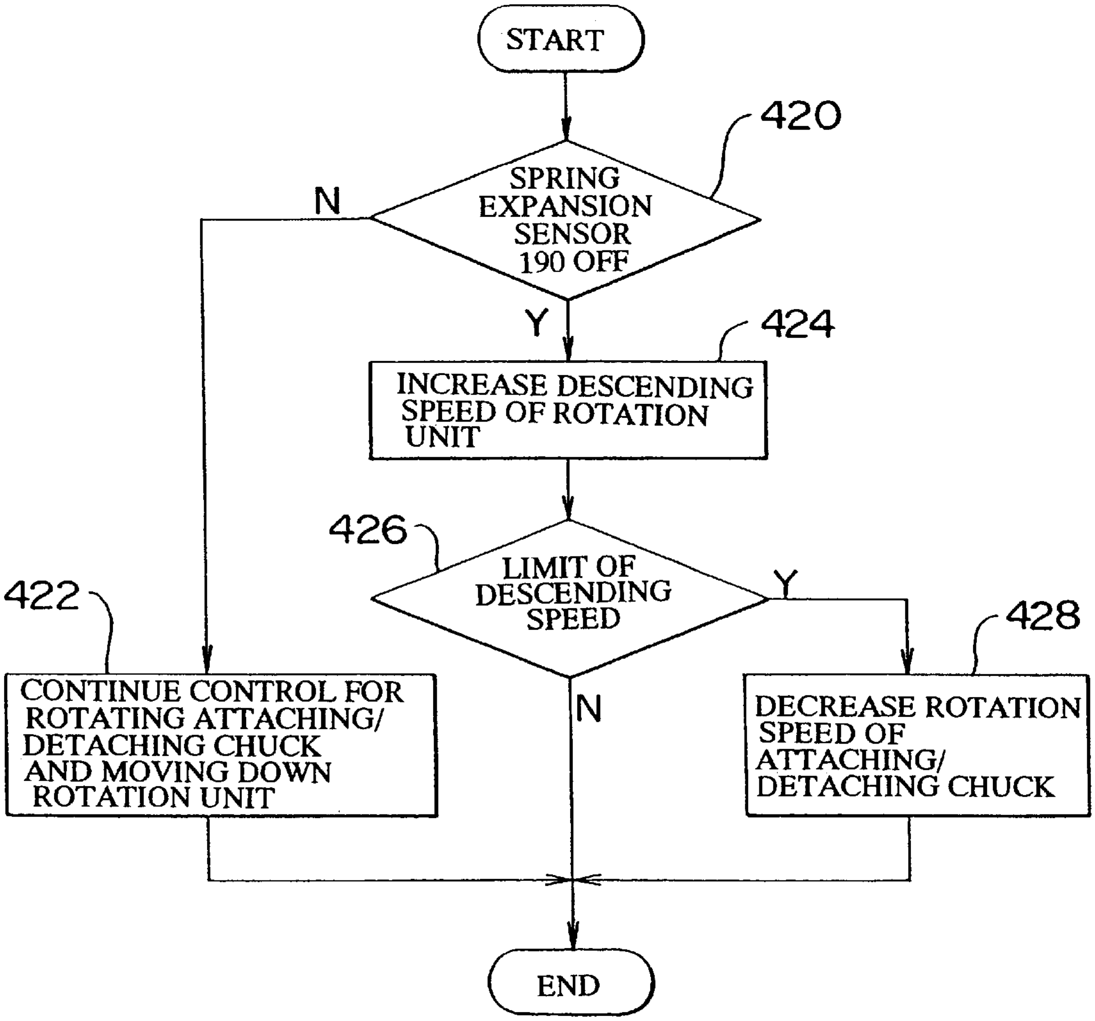
FIG. 42 is a flow chart for explaining a lower-limit position control of a chuck in the attaching state of the rods by the rod attaching/detaching device according to the preferred embodiment.

The control unit watches the outputs from the spring expansion sensors 184 and 190 to carry out a lower-limit position control and an upper-limit position control of the attaching/detaching chuck 140. FIG. 41 is a flow chart of the upper-limit position control of the chuck in the coupling of the rod 52S. FIG. 42 is a flow chart of the lower-limit position control of the chuck in the coupling of the rod 52S.

While the control unit controls the rotation of the attaching/detaching chuck 140 and the downward movement of the rotation unit 138, as shown in step 400 of FIG. 41, the control unit reads the output signal from the spring expansion sensor 184, detecting the limit of the compression of the compression spring 160, at predetermined intervals; and determines whether or not the sensor 184 is ON. When the spring expansion sensor 184 is not ON, but is OFF, the control unit goes to step 402 to determines whether or not the spring expansion sensor 186 is ON. When the spring expansion sensor 186 is not ON, the control unit completes the process in this step. When the spring expansion sensor 186 is ON, it is determined that the descending speed of the attaching/detaching speed is lower than the descending speed of the rotation unit 138, so that the descending speed of the rotation unit 138 is decreased for a predetermined amount, and then the process in this step is completed.

In step 400, when ON of the spring expansion sensor 184 is detected, the descending speed of the attaching/detaching chuck 140 is lower as compared with the descending speed of the rotation unit 138, so that mechanical breakage may occur. In consequence, the control unit goes to step 406 to stop the downward movement of the rotation unit 138 while rotating the attaching/detaching chuck 140. After that, the control unit determines whether the rotation of the attaching/detaching chuck 140 is regular or not (step 408). When the rotation of the attaching/detaching chuck 140 is irregular, the control unit goes to step 416 to stop the rotation of the chuck 140, and rises an alarm, and then completes this process.

Figure 43:
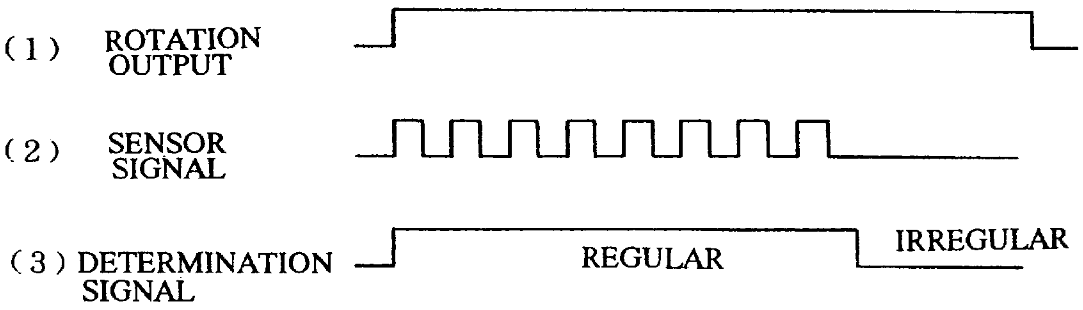
FIG. 43 are explanatory views of a method for detecting irregularities in the rotation of a attaching/detaching chuck of the rod attaching/detaching device according to the preferred embodiment.

The determination whether the rotation of the attaching/detaching chuck 140 is regular or not is carried out as shown in FIG. 43.

A motor driving discriminate device (not shown) outputs a rotation output signal "H" as shown in FIG. 43(1) when electric current or voltage is applied to the rotating motor 142 and the rotating motor 142 is rotationally driven. The rotation detecting sensor 196 changes into the OFF position when the rotation detecting slot 192 of the rotation detecting plate 178 is positioned above the sensor 196. When any part other than the rotation detecting slot 192 is positioned above the sensor 196, the rotation detecting sensor 196 detects reflected light from the rotation detecting plate 178 and changes into the ON position. Therefore, when the rotation output of the motor is produced by rotating the rotating motor 142, and the attaching/detaching chuck 140 is regularly rotated, as shown in FIG. 43(2), the sensor signal having precisely spaced pulses is outputted. When the attaching/detaching chuck 140 is regularly rotated, an attaching/detaching chuck rotation discriminate device (not shown) outputs "H" showing the regular rotation as shown in FIG. 43(3) by using the rotation output signal of the rotating motor 142 and the precisely spaced pulses output from the rotation detecting sensor 194. When the rotation detecting sensor 196 does not output pulse although the rotation output signal is "H", "L" showing that the attaching/detaching chuck 140 is not regularly rotated is outputted. The control unit reads the output signal from the attaching/detaching chuck rotation discriminate device in step 408 of FIG. 41, and determines by the above output signal whether the attaching/detaching chuck 140 is regularly rotated or not.

When the attaching/detaching chuck 140 is regularly rotated, the control unit goes to step 410 to check that the spring expansion sensor 186 is OFF. When the sensor 186 is OFF, the control unit determines that the attaching/detaching chuck 140 is moved down to the regular position; restarts the control for the downward movement of the rotation unit 138; and completes this controlling process (step 412).

When the spring expansion sensor is ON, the control unit goes from step 410 to step 414 to determine whether or not a predetermined time has elapsed since the downward movement of the rotation unit 138 was stopped. When the predetermined time has not elapsed since the downward movement of the rotation unit 138 was stopped, the control unit returns to step 406 to retain the downward movement of the rotation unit 138 in the stopping state. In step 414, when the predetermined time has elapsed since the downward movement of the rotation unit 138 is stopped, the control unit determines that the rotation of the attaching/detaching chuck 140 is not transmitted to the rod 52S for reasons of the looseness of chuck or the like, so that the control unit stops the rotation of the attaching/detaching chuck 140, and alerts an operator to the irregularity by an alarm (step 416), and then completes this process.

Next, the lower-limit position control of the chuck in the coupling of rod 52S is carried out as follows.

While the control unit controls the rotation of the attaching/detaching chuck 138 and the downward movement of the rotation unit 138, as shown in step 420 of FIG. 42, the control unit reads the output signal from the spring expansion sensor 190, detecting the stretching limit of the compression spring 160, at predetermined intervals; and determines whether the sensor 190 is OFF or not. When the spring expansion sensor 190 is not OFF, the control unit continues to control the rotation of the attaching/detaching chuck 140 and the downward movement of the rotation unit 138 (step 422), and then completes this process. When the spring expansion sensor 190 is OFF, the descending speed of the attaching/detaching chuck 140 is higher than that of the entire rotation unit 138, so that mechanical breakage may occur, therefore, the control unit increases the descending speed of the rotation unit 138 for a predetermined amount (step 424). After that, the control unit determines whether or not the descending speed of the rotation unit 138 is within the limit (step 426). When the descending speed of the rotation unit 138 does not reach the upper limit, the control unit complete this process. However, when the descending speed of the rotation unit 138 reaches the upper limit, as shown in step 428, the control unit decreases the rotational speed of the attaching/detaching chuck 140 for a predetermined amount to decrease a speed of screwing of the rods 52S, and then completes this process. Note that the upper-limit position control and the lower-limit position control of the chuck are also carried out when the boiler module 56 is lifted up.

Deliver and convey of a rod

The delivery of the rod 52S between the rod attaching/detaching device 68 and the rod conveyor device 70, and the conveyance of the rod 52S by the rod conveyor device 70 are carried out as follows (see FIG. 18 to FIG. 23).

In a rod storing mode of when the rod 52S is detached, the conveying chain 752 of the rod conveyor device 70 is driven and rotated in a counterclockwise direction of FIG. 18. The holding member sensor 824, which is placed at the end portion of the transverse frame as a delivery position for the rod, changes into the ON position after detecting reflected light from the striker 822 placed to the side portion of the rod holding member 790 moving toward the sensor 824, and sends out the ON signal to the control unit for the conveyor device which is designed on the control panel 754. The control unit detects that the rod holding member 790 reaches the delivery position by using the ON signal from the sensor 824, and stops the drive motor 740 to stop the holding member 790 at the delivery position.

On the other hand, when the rod attaching/detaching device 68 detaches the rod 52S from the suspending rod 52 by using the attaching/detaching chuck 140, the control unit for the attaching/detaching device drives the transverse drive motor 268 to move the rod attaching/detaching device 68 to above the deliver position of the rod conveyor device 70. The control unit for the attaching/detaching device receives the information that the rod holding member 790 is at the delivery position from the central control system 640, and drives the elevating motor 144 of the rod attaching/detaching device 68 to move down the rod 52S, gripped by the attaching/detaching chuck 140, through the rotation unit 138. The rod 52S is moved down and the end portion of the rod 52S changes the receiving sensor 836 into the OFF position. The OFF signal of the sensor 836 is sent to the control unit for the conveyor device and the control unit for the attaching/detaching device through the central control system 640, whereupon the control unit for the attaching/detaching device opens the attaching/detaching chuck 140 of the rod attaching/detaching device 68; moves up the rotation unit 138; and moves the attaching/detaching device 68 to the detaching position for detaching the next rod 52S.

When the rotation unit 138 is moved up, the control unit for the conveyor device drives the drive motor 740 to circulate the conveying chain 752 in a counterclockwise direction of FIG. 18. The rod holding member 790 holding the rod 52S is moved down along the guide rail 786 and reaches the removing position placed in the lower portion of the rod conveyor device 70, whereupon the rod detecting sensor 844 changes into the OFF position and outputs the detection signal. Thereby the control unit for the conveyor device stops the drive motor 740 to stop the rod 52S at the removing position. When it is determined that the rod detecting sensor 844 is in the ON position and the rod 52S is removed from the rod holding member 790 by a worker, the control unit drives the drive motor again and stops the rod holding member 790 at the delivery position.

On the other hand, in a removing mode in which the rod 52S is coupled to the end of the suspending rod 52, when a worker places the rod 52S onto the rod holding member 790 stopping at the removing position, the rod detecting sensor 844 detects the placing of the rod 52S. Thereby, the control unit for the conveyor device drives the drive motor to circulate the conveying chain 752 in a clockwise direction of FIG. 18, and transfers the rod 52S toward the delivery position of the end of the transverse frame 738. The holding member sensor 826 settled at the delivery position detects the striker 822 combinedly moved with the rod holding member 790 and outputs the ON signal. Thereby, the circulation of the conveying chain 752 is stopped, and chuck 140 of the rod attaching/detaching device 68 in the standby state above the delivery position is moved down and grips the head 52B of the rod 52S conveyed to the delivery position. When the attaching/detaching chuck 140 gripping the rod 52S is moved up and the lower end of the rod 52S is moved above the delivery sensor 832, the sensor 832 changes into the ON position. Thereby, the control unit for the conveyor device circulates the conveying chain 752 in the clockwise direction of FIG. 18 again in order to convey the new rod 52S to the delivery position. When the lifting unit 138 of the rod attaching/detaching device 68 is moved up to a predetermined height, the control unit for the attaching/detaching device drives the transverse drive motor 268 to move the rod attaching/detaching device 68 to above the suspending rod 52.

Synchronizing control of the jack

The synchronizing control for lifting up and down the boiler module 56 in parallel is carried out as follows.

Figure 44:
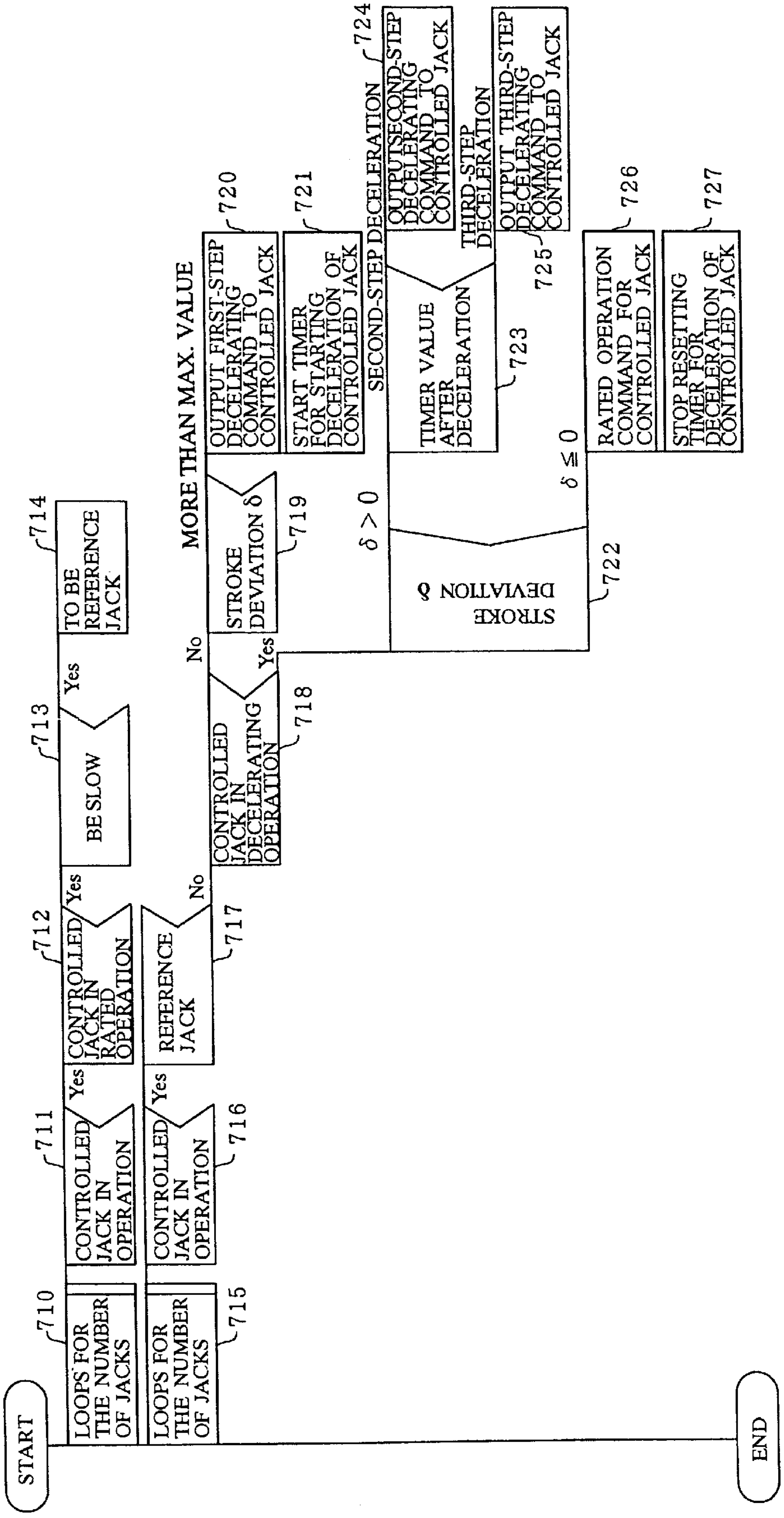
FIG. 44 is a program analysis diagram for explaining a synchronism controlling method of the lifting jack according to the preferred embodiment of the present invention.

FIG. 44 is a program analysis diagram (PDA) for explaining the synchronizing control of the jacks when the boiler module 56 is lifted up. The synchronizing control of the jacks will be described below with reference to FIG. 27 to FIG. 30.

At the start of operating the boiler jacks 60, the central control system 640 or the local control units 644A, 644B, . . . , gives an operation instruction for operating each of the boiler jacks 60 with the equal output, for example, the rated output, to the jack controller 646 assigned with one of the jacks 60. The central control system 640 or the local control unit 644A, 644B, . . . , successively reads the stroke value (the stroke displacement) of the boiler jack 60 to which the jack controller 646 outputs, a signal showing the operating state of the degree of opening of the valve, and so on at predetermined intervals; and gives the information to the jack-operation detecting circuit 681 in the synchronism controller 680 (box 710 in FIG. 44). The jack-operation detecting circuit 681 determines whether or not the jack which is controlled (the controlled jack) is in operation (box 711). When the controlled jack is in operation, the circuit 681 inputs a jack number of the controlled jack into the operating state discerning circuit 686, and sends the jack number and the stroke displacement from the start of the operation to the reference jack selecting circuit 682.

The operating state discerning circuit 686 determines whether the collected jack is in rated operation or not, by using the operation state of the controlled jack which is written on the operation-state storing circuit 698 (box 712), and inputs the result of the determination into the reference jack selecting circuit 682. The reference jack selecting circuit 682 writes the jack number and stroke data, inputted from the jack-operation detecting circuit 681, in the internal memory; compares the stroke values of the jacks in rated operation with each other; selects a jack having the minimum displacement from the initial position; and defines the selected jack as the reference jack (boxes 713 and 714).

As shown in boxes 715 to 717, when the controlled jack judged as being in operation from the jack data is not the reference jack, the reference jack selecting circuit 682 sends the stroke data of the reference jack and the controlled jack to the deviation computing circuit 684 in sequence in order to find deviation δ between the reference jack and the controlled jack. The operating state discerning circuit 686 determines whether the controlled jack is in a decelerating operation or not (box 718). When the controlled jack is not in the decelerating operation, but in the rated operation, the circuit 686 connects the deviation computing circuit 684 with the comparing and determining circuit 690 through the switching circuit 688 to input the stroke deviation δ found by the deviation computing circuit 684 into the comparing and determining circuit 690 with respect to the controlled jack (box 719).

The comparing and determining circuit 690 compares the input deviation δ with a reference value (e.g., 2 mm) as the maximum value set in the reference value setting circuit 694; and outputs a signal to decrease the output to the operation output changing circuit 696 when the deviation δ exceeds the maximum value; but does not output the signal when the deviation δ does not reach the maximum value. The operation output changing circuit 696 continues the rated operation of the controlled jack when the signal is not inputted from the comparing and determining circuit 690, and outputs a first-step decelerating command signal to change the output of the controlled jack into a predetermined output (60% of the rated output in the embodiment) when the signal is inputted from the circuit 690 (box 720). The operation command signal is sent from the central control system 640 or the local control unit 644 through the communication line 642 to the jack controller 646 assigned with the controlled jack. The jack controller 646 receiving the signal decreases the output of the controlled boiler jack 60 to 60% of the rated output through the flow regulating valve 666. As a result, for example, when the boiler jack 60 is operated in the ascending mode, the ascending speed of the ram 76 is decreased to 60% from the rating (100%) at point a shown in FIG. 46.

Upon outputting the first-step decelerating command for the controlled jack, the operation output changing circuit 696 writes that the controlled jack is in the first-step decelerating state on the operation-state storing circuit 698, and sends a time computing start signal to the time computing writing circuit 700. The time computing writing circuit 700 computes the time from time $t_1$ receiving the instruction from the operation output changing circuit 696 on basis of the output of the timer 702, and writes the computed time on the operation-state storing circuit 698 in accordance to the controlled jack (box 721).

Figure 45:
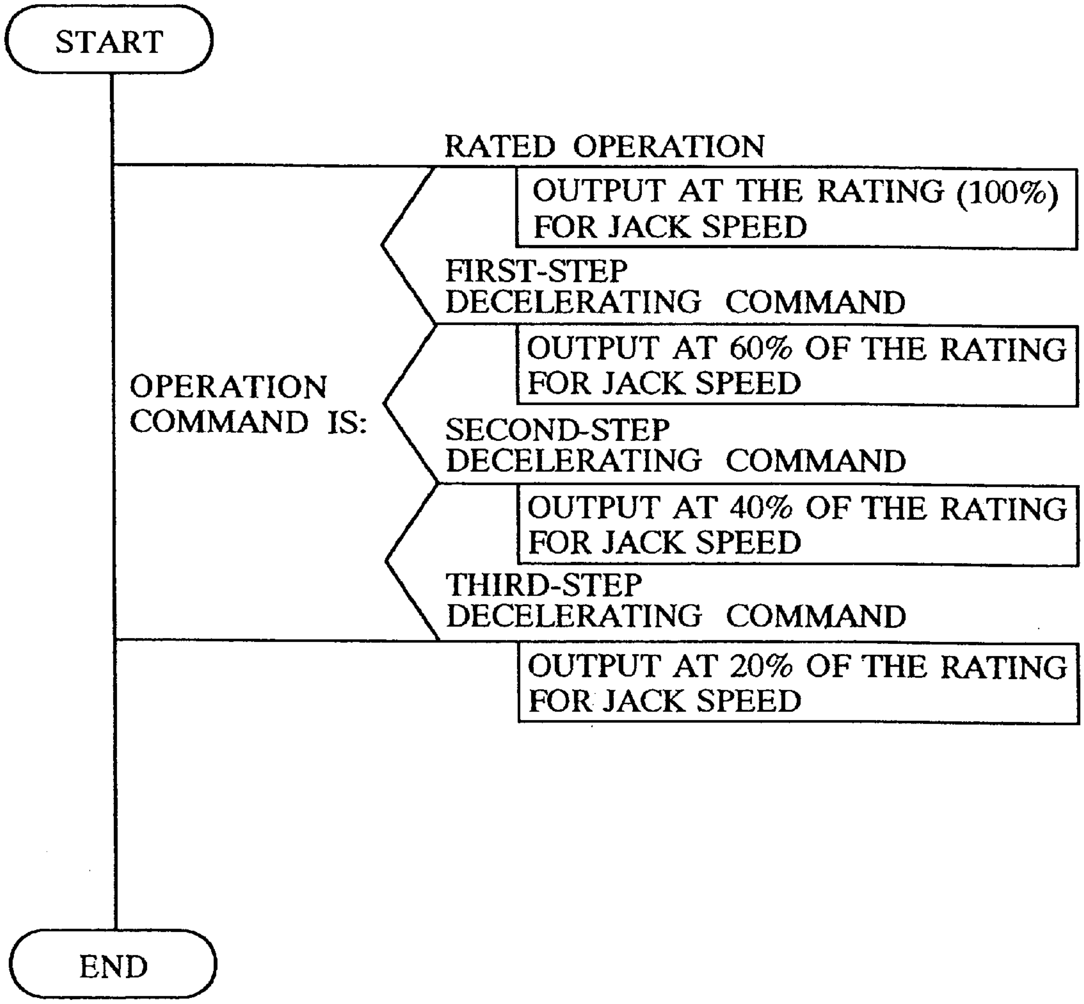
FIG. 45 is a program analysis diagram showing the case in which the operating state of the jack is changed in the synchronism control of the jack, according to the preferred embodiment.

In box 718, from the operation state stored in the operation-state storing circuit 698, the operating state discerning circuit 686 determines that the controlled jack is in the decelerating operation, and connects the deviation computing circuit 684 with the deviation-zero determining circuit 692 by switching the switching circuit 688. Thereby, the deviation δ found by the deviation computing circuit 684 is inputted to the deviation-zero determining circuit 692. The deviation-zero determining circuit 692 determines whether or not the deviation δ between strokes of the controlled jack and the reference jack is more than zero (box 722). When the deviation is $\delta>0$, the deviation-zero determining circuit 692 outputs the deviation $\delta>0$ to the operation output changing circuit 696. Upon inputting a signal showing $\delta>0$ from the deviation-zero determining circuit 692, the operation output changing circuit 696 reads the operation state of the controlled jack, written on the operation-state storing circuit 698, and the time since the first-step decelerating command is outputted; determines the operation state of the jack as shown in FIG. 45; and determines whether the predetermined time has elapsed since the first-step decelerating command was outputted. When the predetermined time has elapsed, the operation output changing circuit 696 outputs a second-step decelerating command signal or a third-step decelerating command signal.

More specifically, when the controlled jack is in the first-step decelerating operation, the operation output changing circuit 696 determines whether or not the predetermined time, for example, eight seconds has elapsed since the first-step decelerating operation was started. When eight seconds has not elapsed since the first-step decelerating operation was started, the first-step decelerating operation is continued. When eight seconds elapsed and the time changes to time $t_2$, the operation output changing circuit 696 outputs the second-step decelerating command signal to further decrease the output of the controlled jack (e.g., the decrease of 40% of the rating), and writes that the controlled jack is in the second-step decelerating operation on the operation-state storing circuit 698. With δ>0 and the controlled jack being in the second-step decelerating operation, when the predetermined time (e.g., three seconds) has elapsed since the second-step decelerating operation was started and the time changes to time $t_3$, the third-step decelerating operation command signal is outputted to operate the controlled jack at, for example, 20% of the rating.

Figure 46:
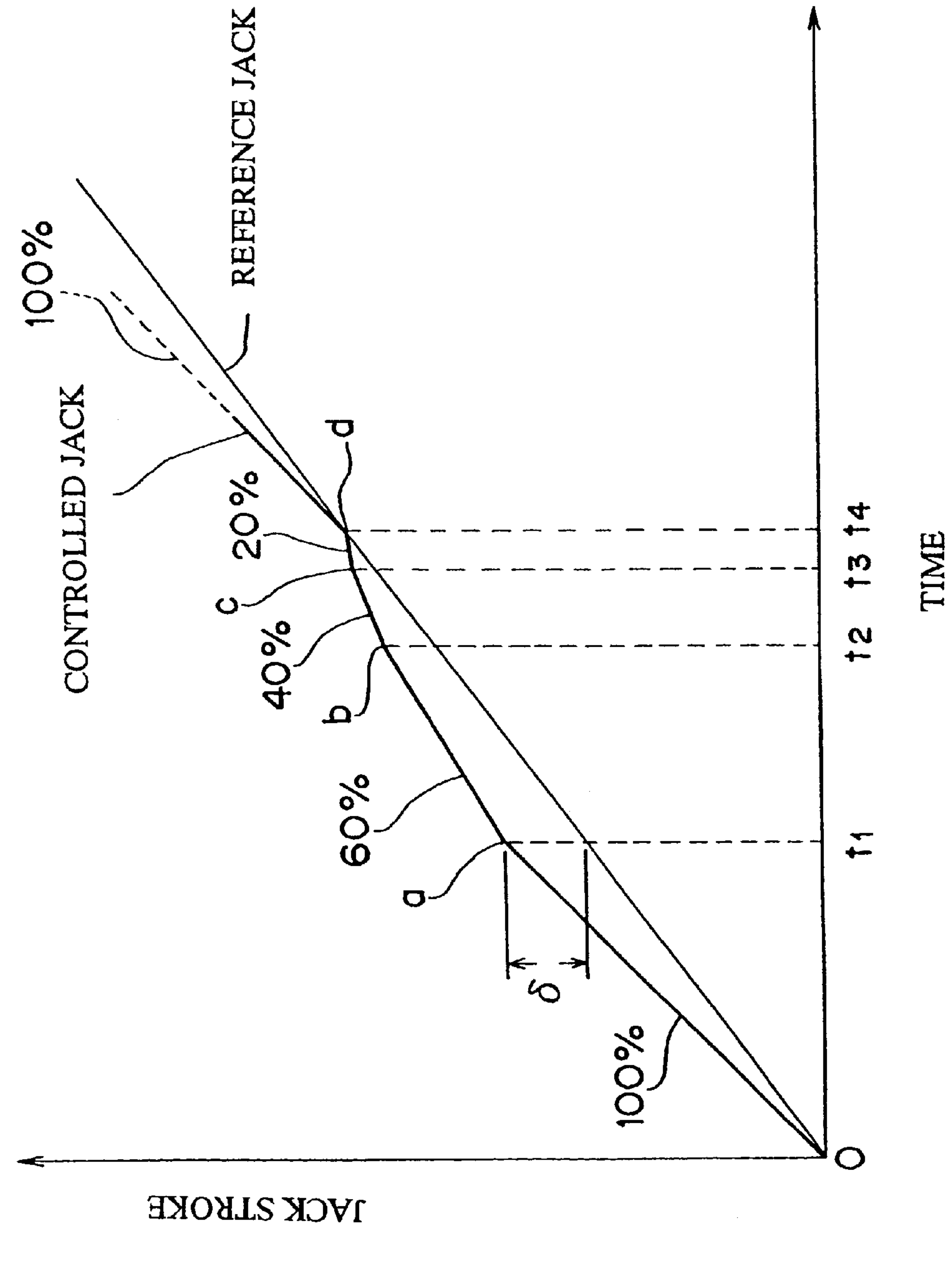
FIG. 46 is a graph for explaining an example of changing stroke of the jack which is controlled by the synchronism controlling method of the lifting jack, according to the preferred embodiment.
Figure 47:
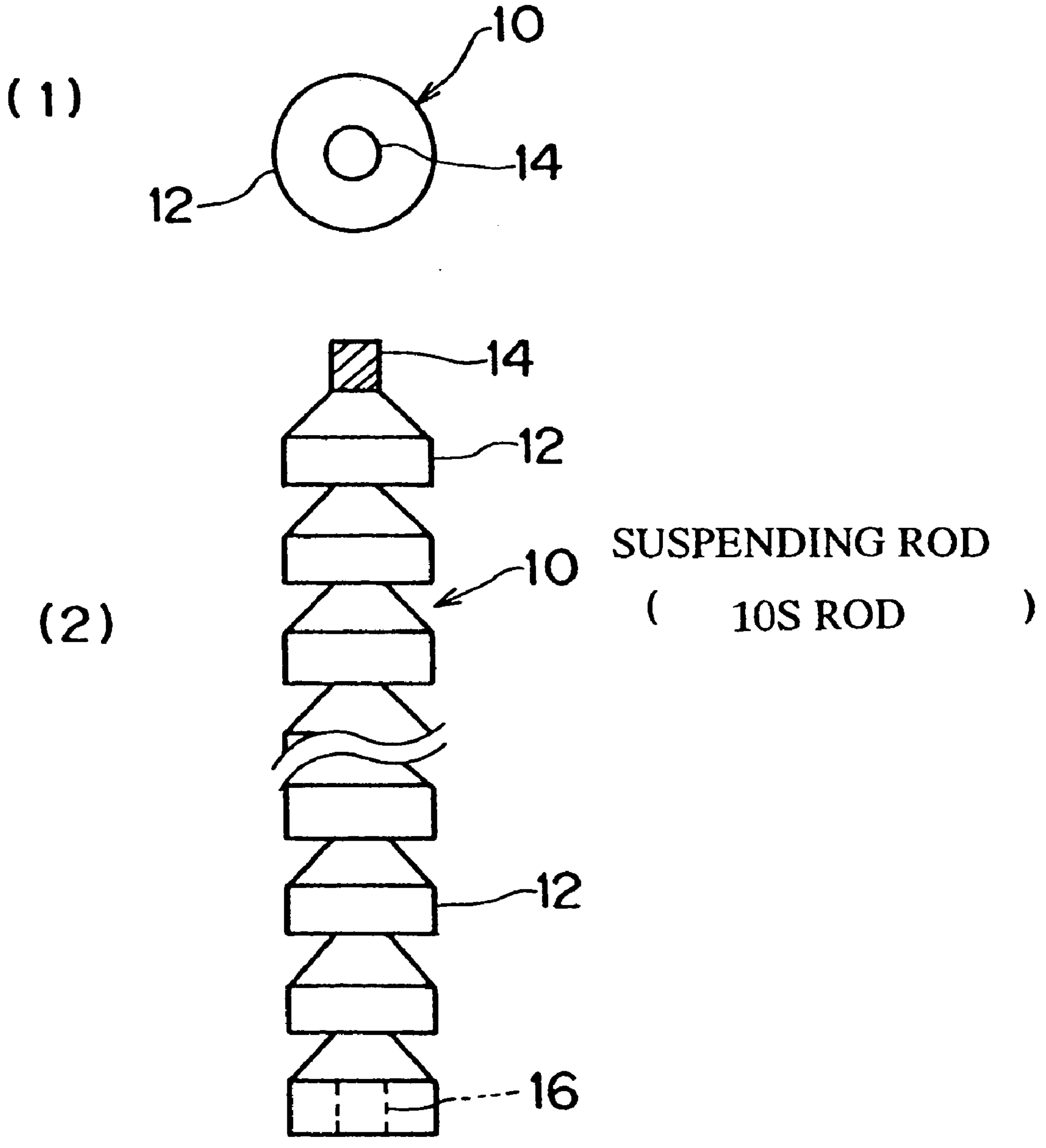
FIG. 47 are a plane view and a front view of a conventional suspending rod.
Figure 48:
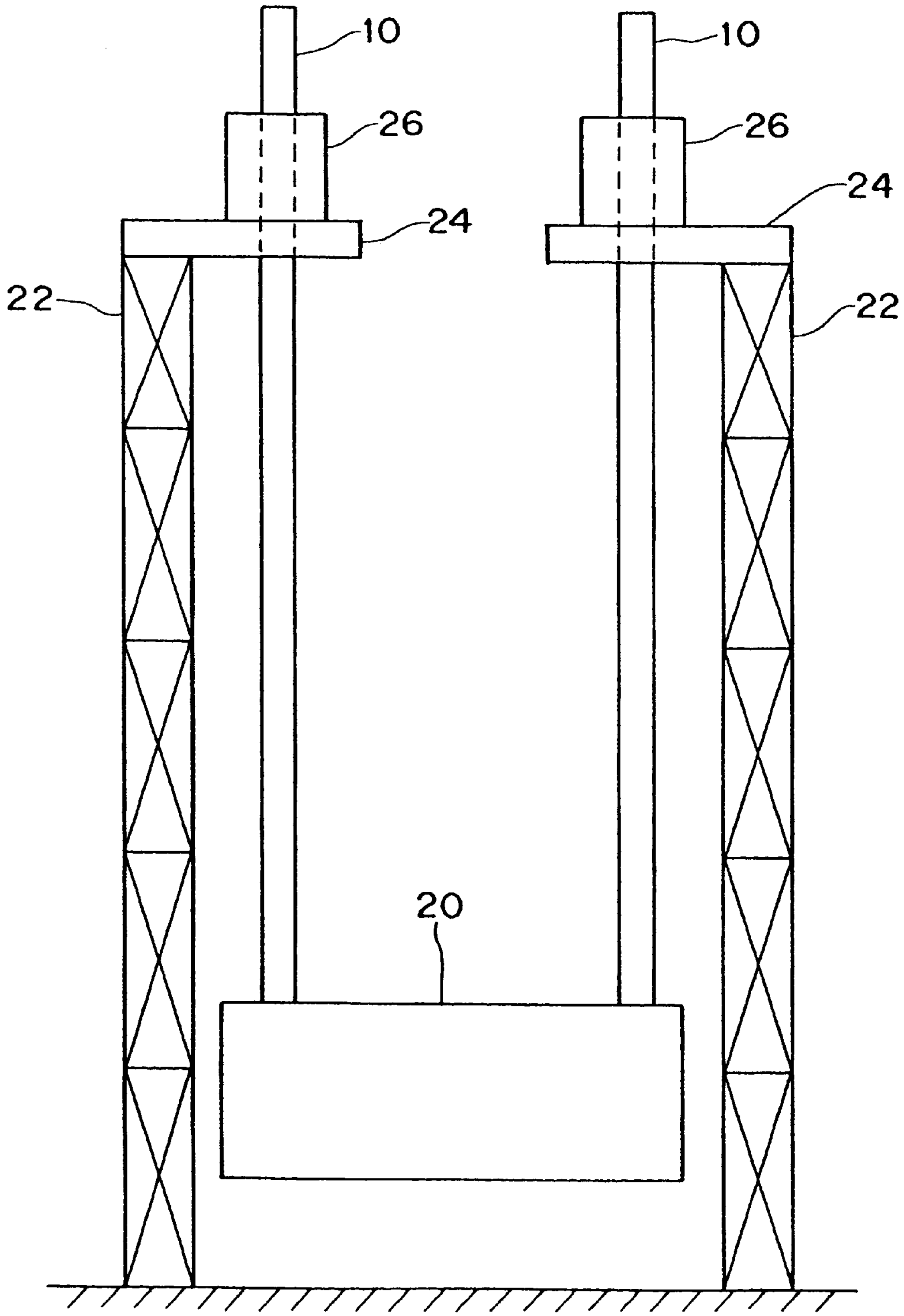
FIG. 48 is an explanatory view of the condition in which the suspending rod is lifting a boiler module.
Figure 49:
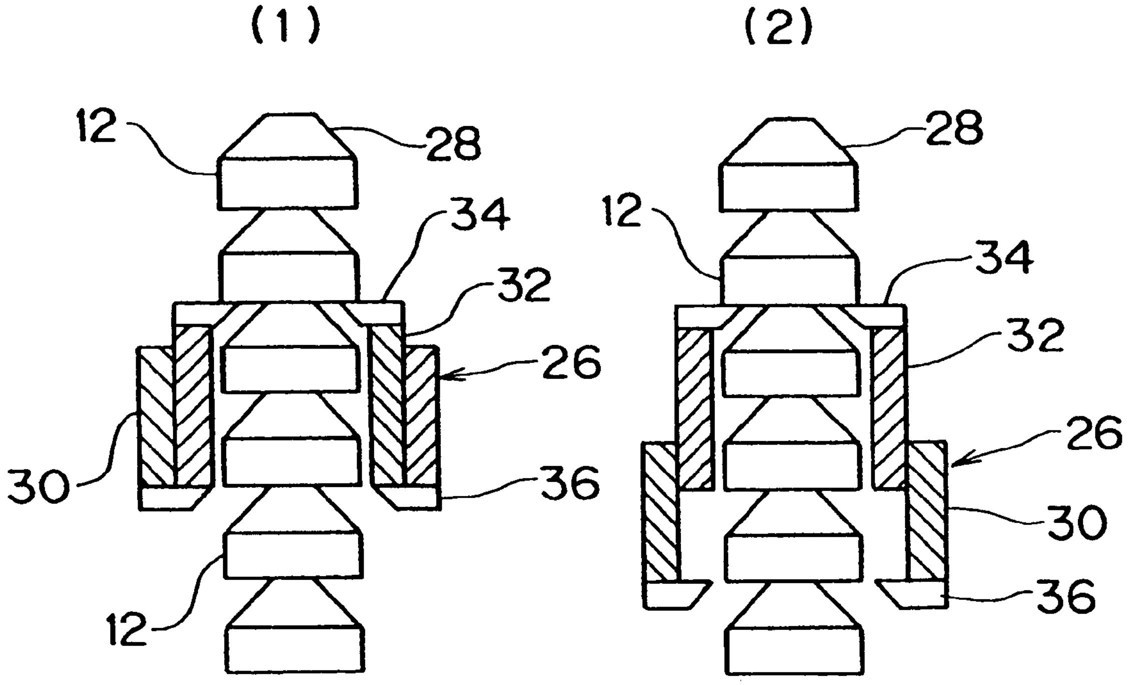
FIG. 49 are explanatory views of a lifting method with the conventional suspending rod.

When the deviation δ found by the deviation computing circuit 684 is changed to less than zero, that is, when $\delta \leqq 0$ is confirmed, the deviation-zero determining circuit 692 inputs the above information into the operation output changing circuit 696. Upon receiving the signal showing $\delta \leqq 0$ after the decelerating operation for the controlled jack is started, the deviation-zero changing circuit 696 converts the decelerating operation of the control jack back into the rated operation (box 726); clears the computing of time in the time computing writing circuit 700; and revises the operation states of the controlled jack, written on the operation-state storing circuit 698, to the rated operation (box 727). After that, the above processes are repeated. FIG. 46 shows the stroke changing of the control in which the third-step decelerating operation is carried out, and the operation output changing circuit 696 receives the signal, showing $\delta \leqq 0$, from the deviation-zero determining circuit 692 at time $t_4$, and the output of the controlled jack is converted back into the rated operation of the early stage. Where a number of jacks have the stroke deviation exceeding the reference value, each jack is controlled in the same way. The synchronizing control for the boiler jacks 60 in the descending mode for lifting down the boiler module 56 is also carried out in the same way.

As described thus far, the output of each jack is decreased on basis of the jack having the minimum stroke displacement, and the stroke displacement of the controlled jack is controlled to be equal to the stroke displacement of the reference jack, so that the boiler module 56 as a massive body can be lifted up and down in approximately horizontal with the simple control. When the output of the controlled jack is controlled, since the output is controlled to be decreased at a predetermined output rate with respect to the rating, the control does not result in a complicated control and any costly sensor or the like is not needed, thereby simplifying the apparatus and reducing the cost. The output is decreased step by step in several times, so that the stroke displacement of the controlled jack is prevented from overshooting under the stroke displacement of the reference jack.

It is should be mentioned that when the deviation is not $\delta \leqq 0$ after the predetermined time, for example, two seconds has elapsed from the input of the third-step decelerating command, a signal to stop the operation until the stroke displacement of the controlled jack agrees to the displacement of the reference jack may be outputted, or alternatively, a stopping operation command instead of the three decelerating operation command may be outputted.

In the above embodiment, the synchronizing control, carried out in operations for lifting up and down the massive body through the suspending rod 52, is described, but the synchronizing control can be carried out in operations for lifting up and down the massive body by synchronizing a number of jacks which are placed under the massive body, such as building construction.

In the synchronizing control for the jacks, when a difference in the stroke displacement between the jacks occurs, the difference is absorbed by the balancing device 512 supporting the girder 500. For example, in the ascending mode, when the difference occurs in the ascending speeds of the rams 76 of the boiler jacks 60A, 60B, shown in FIG. 24, each of which supports the upper balance beam 516 through the suspending rod 52, and the speed of the boiler jack 60B for lifting up the rod exceeds the speed of the boiler jack A, the upper balance beam 516 rotates about the pin 520 in a clockwise direction of FIG. 24. Additionally, the upper balance beam 516 is pivotally provided to a suspension-exchanging plate 514, and a cylindrical seat 550 and a balance receiving seat 608 are placed between a nut 551 of the suspending rod 52 as a coupler and the upper balance beam 516, and also the upper balance beam 516 is supported through the cylindrical seat 550 and the balance receiving seat 608. In consequence, even when the upper balance beam 516 tilts, the tilt is absorbed by the cylindrical seat 550 and the balance receiving seat 608, so that the suspending rod 52 is prevented from receiving a large bending stress. The runout of the shaft of the suspending rod 52 is avoided, and also it is avoided that the detaching process for the rod 52S is complicated or the use of the rod 52S is impossible by reason of the bending of the suspending rod 52. The above description is the same with the descending mode.

Where the difference in the ascending speed occurs between the right and left sides or both ends in the longitudinal direction of the girder 500, that is, where the difference in the ascending speed occurs between the suspending rods 52 under the boiler jack 60A and the boiler jack 60C shown in FIG. 25 or in both sides of FIG. 26 in a direction perpendicular to paper of FIG. 26, the difference of the speed is absorbed by the load receiving system 534 placed between the lower balance beam 518 and the girder 500. For example, when the ascending speed of the rod 52 connected to the boiler jack 60A exceeds the ascending speed of the rod 52 connected to the boiler jack 60C, the lower balance beam 518 rotates about the center of the upper face of a spherical seat 536, supporting the girder 500 through a receiving seat 540, in a clockwise direction of FIG. 25. The lower balance beam 518 is pivotally provided on the suspension-exchanging plate 514, connected to the lower end of the suspending rod 52, through the pin 522, so that it is avoided that the bending stress acting to the suspending rod 52 allows the suspending rod 52 to have the runout of the shaft, thereby preventing the suspending rod 52 from damaging being damaged. The above description is the same with the difference in the ascending speed produced at both end of the girder 500 in the longitudinal direction, and also with the descending mode.

Note that, when the deviation exceeding the predetermined value occurs between the stroke displacement of the boiler jacks, the control unit carries out the aforementioned synchronizing control to decrease the output of the boiler jack having the larger stroke displacement, and control the ascending speed to even the strokes of the boiler jacks.

Industrial Availability

As described thus far, a lifting jack, a method of coupling suspending rods, and a lift control method according to the present invention are appropriate to be used in a connecting and separating operation of a suspending rod and the handling of the suspending rod, and a lifting operation using a group of jacks, when a boiler module of a large scale electric-power plant or the like is lifted with the suspending rod.

We claim:

1. A rod attaching/detaching device for a lifting jack that attaches and detaches rods to and from an end of a suspending rod, when the suspending rod for lifting is formed by screwing and coupling the rods in an axis direction and a top end portion of the suspending rod is lifted up and down by the lifting jack, comprising:

chuck means for chucking a head part of the rod;

a rotation unit having a shaft driving to be rotated by a rotating motor and connected with said chuck means, and having a displacement absorbing means on a path of linking an output shaft of the rotating motor to said chuck means;

elevating means for vertically moving said rotation unit in response to a screw pitch of the rods;

a rotation sensor detecting the rotation of said chuck means; and controlling means for controlling vertical movement of said rotation unit by said elevating means based on and output signal of said rotation sensor, so that the vertical movement coincides with detected rotation of the said chuck means.

2. The rod attaching/detaching device according to claim 1, wherein said displacement absorbing means, placed on the path of linking the output shaft of the rotating motor to said chuck means, has a shaft direction displacement absorbing means and a rotation shaft run-out displacement absorbing means.

3. A method of coupling suspending rods, which is for coupling a rod to an end of a suspending rod used for lifting, the suspending rod being formed by screwing and coupling the rods in an axis direction, comprising the steps of:

opposing a screw part of the rod to a screw part of a top rod of the suspending rod while gripping the rod with a rotation chuck means;

detecting a predetermined shaft direction displacement of the chuck means, caused by rotating the chuck means at a low speed at the opposing position; and rotating the chuck means at a high speed using a rotation unit while moving down the rotation unit in response to a screw pitch of the rod to couple the rods by screwing.

4. The method of coupling suspending rods according to claim 3, wherein the predetermined amount of the shaft direction displacement of the chuck means is a value corresponding to a pitch of a rod coupling screw.

5. A method of coupling suspending rods for coupling a rod to an end of a suspending rod used for lifting, which is formed by screwing and coupling the rods in an axis direction, comprising the steps of:

gripping the rod in a suspending state with a rotation chuck means;

rotating the rotation chuck means at a low speed while the rod is being centered on a screw part of a top rod of the suspending rod;

inserting a screw part of the gripped rod by moving down the rotation chuck means;

detecting a predetermined shaft direction displacement of the rotation chuck means as the rod is rotated at a low speed indicating engagement of the rod with the suspending rod by using back-lash of a screw face; and rotating the rotation chuck means at a high speed while moving down a rotation unit, driven to rotate the chuck means, in response to a screw pitch of the rod to couple the rods by screwing.

6. A lifting jack for lifting an upper portion of a suspending rod that is formed by screwing and coupling rods in an axis direction, comprising:

a jack placed on a supporting frame that lifts the suspending rod;

a rod attaching/detaching means positioned above the jack for gripping the rod and attaching and detaching the rod to and from the suspending rod, the rod attaching/detaching means being rotatable and vertically movable toward and away from an attaching/detaching position; and a rod convey means for conveying the rods to the rod attaching/detaching means, the rod convey means being provided on a moving route of said rod attaching/detaching means, and traversing between a rod storing position and a deliver position that delivers the rods to the rod attaching/detaching means.

7. The lifting jack according to claim 6, wherein said rod convey means has a frame assembled with modules and having a direction changing portion of a sprocket to change directions of a conveyed body, and is changed in a traversing distance thereof according to changing of working positions of the deliver position for the rod to said attaching/detaching means and the rod storing position.

* * * * *